US010700726B2

(12) United States Patent
Zaloom

(10) Patent No.: US 10,700,726 B2
(45) Date of Patent: Jun. 30, 2020

(54) INCONSPICUOUS SUSPENSION SYSTEM FOR SUSPENDING MOBILE COMPUTING DEVICES TO MULTIPLE ANGLES AND ORIENTATIONS WITH RESPECT TO A RESTING SURFACE OR BASE

(71) Applicant: Joseph Anthony Zaloom, Falls Church, VA (US)

(72) Inventor: Joseph Anthony Zaloom, Falls Church, VA (US)

(73) Assignee: Joseph A. Zaloom, Falls Church, VA (US)

( * ) Notice: Subject to any disclaimer, the term of this patent is extended or adjusted under 35 U.S.C. 154(b) by 0 days.

(21) Appl. No.: 16/734,376

(22) Filed: Jan. 5, 2020

(65) Prior Publication Data

US 2020/0153472 A1     May 14, 2020

Related U.S. Application Data

(63) Continuation of application No. 16/358,646, filed on Mar. 19, 2019, which is a continuation-in-part of application No. 16/136,247, filed on Sep. 19, 2018, now Pat. No. 10,305,528, which is a continuation of application No. 15/229,644, filed on Aug. 5, 2016, now Pat. No. 10,135,480.

(60) Provisional application No. 62/779,827, filed on Dec. 14, 2018, provisional application No. 62/753,923, filed on Nov. 1, 2018, provisional application No. 62/263,434, filed on Dec. 4, 2015.

(51) Int. Cl.
*F16M 11/24*     (2006.01)
*H04B 1/3877*    (2015.01)
*H04B 1/3888*    (2015.01)
*F16M 13/00*     (2006.01)
*F16M 11/10*     (2006.01)

(52) U.S. Cl.
CPC ........... *H04B 1/3877* (2013.01); *F16M 11/10* (2013.01); *F16M 11/105* (2013.01); *F16M 11/24* (2013.01); *F16M 13/00* (2013.01); *H04B 1/3888* (2013.01)

(58) Field of Classification Search
None
See application file for complete search history.

(56) References Cited

U.S. PATENT DOCUMENTS

| 5,060,904 | A | * | 10/1991 | Hegarty | ............... | A47B 23/042 |
| | | | | | | 248/447 |
| 5,673,628 | A | * | 10/1997 | Boos | ..................... | B60N 3/001 |
| | | | | | | 108/138 |
| 5,933,996 | A | * | 8/1999 | Chang | ................... | A47G 1/143 |
| | | | | | | 248/456 |
| 6,285,758 | B1 | | 9/2001 | Lu | | |
| 7,568,915 | B1 | * | 8/2009 | Lavoie | ..................... | B43L 1/00 |
| | | | | | | 434/408 |

(Continued)

OTHER PUBLICATIONS

U.S. Appl. No. 13/574,785, filed Nov. 3, 2016, Kinetix AG.

*Primary Examiner* — Monica E Millner

(57) ABSTRACT

An inconspicuous suspension system of angled and straight cavities for latching a support structure, such as a desktop stand, a floor stand, a hook, or a plurality of hooks, to mobile computing devices and its use to suspend these devices to multiple angles and orientations with respect to a resting surface or base.

9 Claims, 54 Drawing Sheets

(56) References Cited

U.S. PATENT DOCUMENTS

| | | | | |
|---|---|---|---|---|
| 7,744,055 B2 * | 6/2010 | Zeng | | F16M 11/10 |
| | | | | 248/447 |
| 7,770,862 B2 * | 8/2010 | Chen | | F16M 11/10 |
| | | | | 248/188.91 |
| 7,836,623 B2 * | 11/2010 | Wang | | A47G 1/142 |
| | | | | 248/458 |
| D664,528 S | 7/2012 | Chen | | |
| 8,382,059 B2 | 2/2013 | Le Gette | | |
| 8,505,790 B2 * | 8/2013 | Yu | | A45F 5/00 |
| | | | | 224/185 |
| D698,543 S | 2/2014 | Le Gette | | |
| 8,960,634 B2 | 2/2015 | Le Gette | | |
| 9,103,492 B2 | 8/2015 | Springer et al. | | |
| 9,179,565 B2 | 11/2015 | Cho | | |
| 9,220,327 B2 * | 12/2015 | Hsu | | A45C 11/00 |
| 9,267,638 B2 | 2/2016 | Le Gette | | |
| 9,267,641 B2 | 2/2016 | Gillespie-Brown et al. | | |
| 9,277,038 B1 * | 3/2016 | Wheatley | | F16M 11/10 |
| 9,402,016 B1 * | 7/2016 | Hidalgo | | H04N 5/2252 |
| 9,470,356 B1 | 10/2016 | Zaloom | | |
| D771,615 S | 11/2016 | Pignotti | | |
| 9,506,281 B1 * | 11/2016 | Zaloom | | E05D 11/1028 |
| 9,568,141 B1 | 2/2017 | Zaloom | | |
| 9,773,601 B2 | 9/2017 | Breiwa et al. | | |
| 9,820,567 B1 | 9/2017 | Zaloom | | |
| 9,850,926 B2 * | 12/2017 | Buchanan | | F16B 2/22 |
| 9,933,009 B1 * | 4/2018 | Zaloom | | A45C 13/36 |
| 2007/0099469 A1 * | 5/2007 | Sorensen | | A45F 5/02 |
| | | | | 439/289 |
| 2011/0259771 A1 * | 10/2011 | Johnson | | A45C 11/00 |
| | | | | 206/320 |
| 2012/0074272 A1 * | 3/2012 | Hull | | F16M 11/041 |
| | | | | 248/122.1 |
| 2012/0252543 A1 | 10/2012 | Cho | | |
| 2012/0257345 A1 | 10/2012 | Hulet | | |
| 2012/0267402 A1 | 10/2012 | Beatty | | |
| 2012/0273630 A1 | 11/2012 | Gillespie-Brown et al. | | |
| 2014/0357328 A1 | 12/2014 | Aharon et al. | | |
| 2017/0156465 A1 | 6/2017 | Zaloom | | |

\* cited by examiner

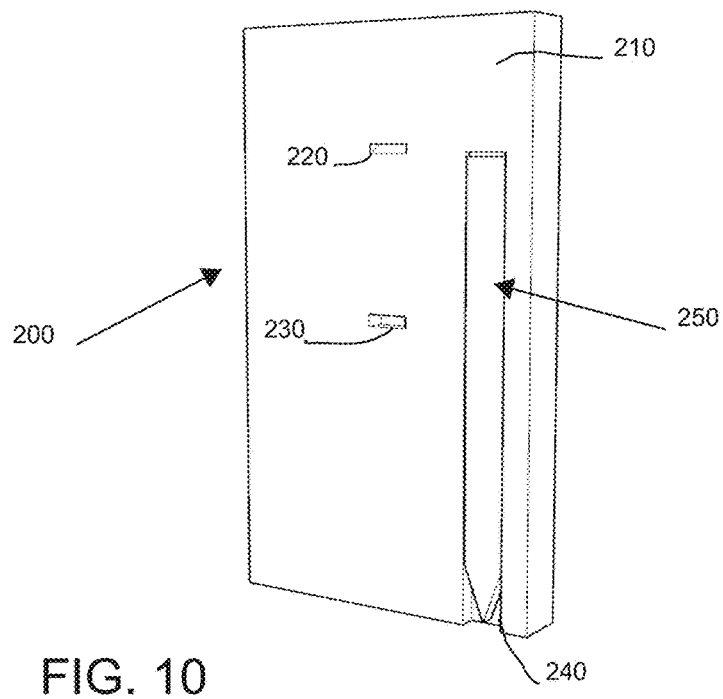
FIG. 10
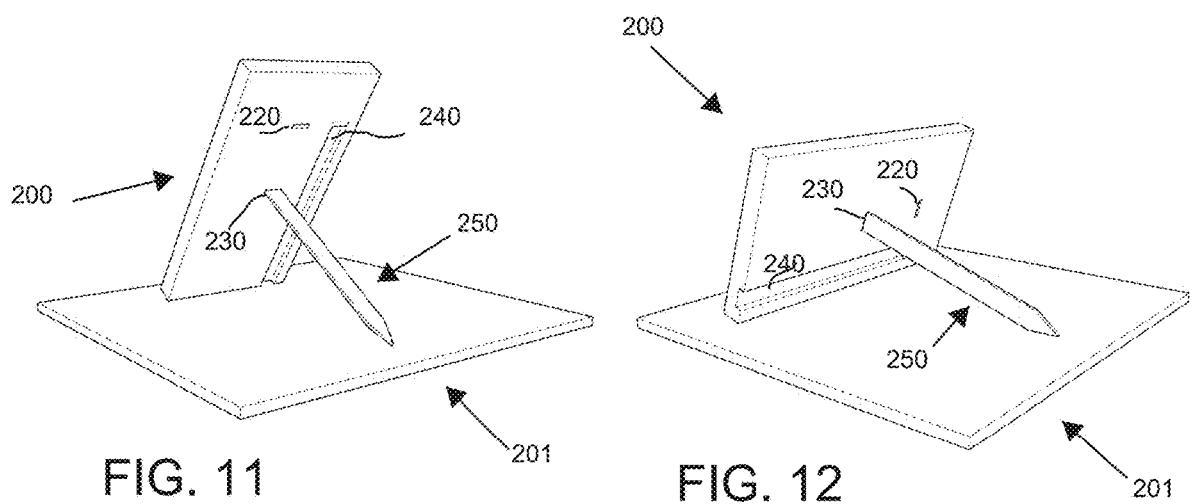
FIG. 11
FIG. 12

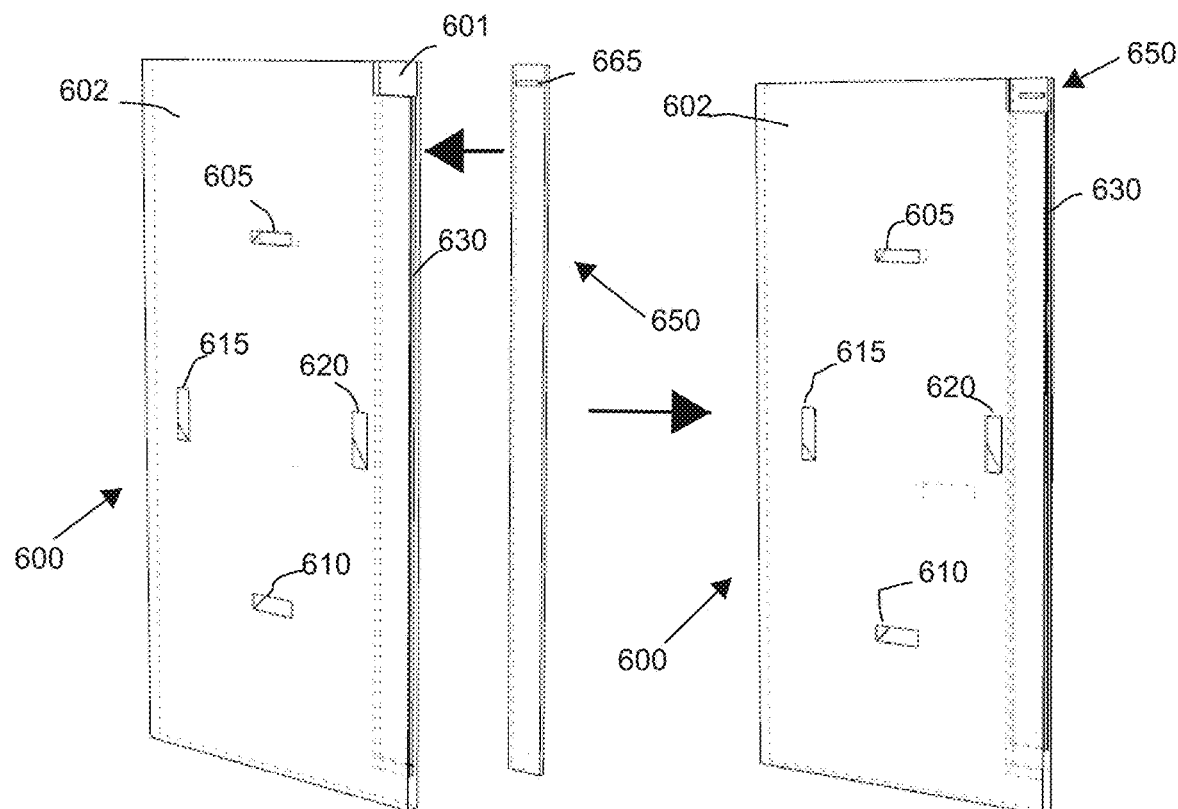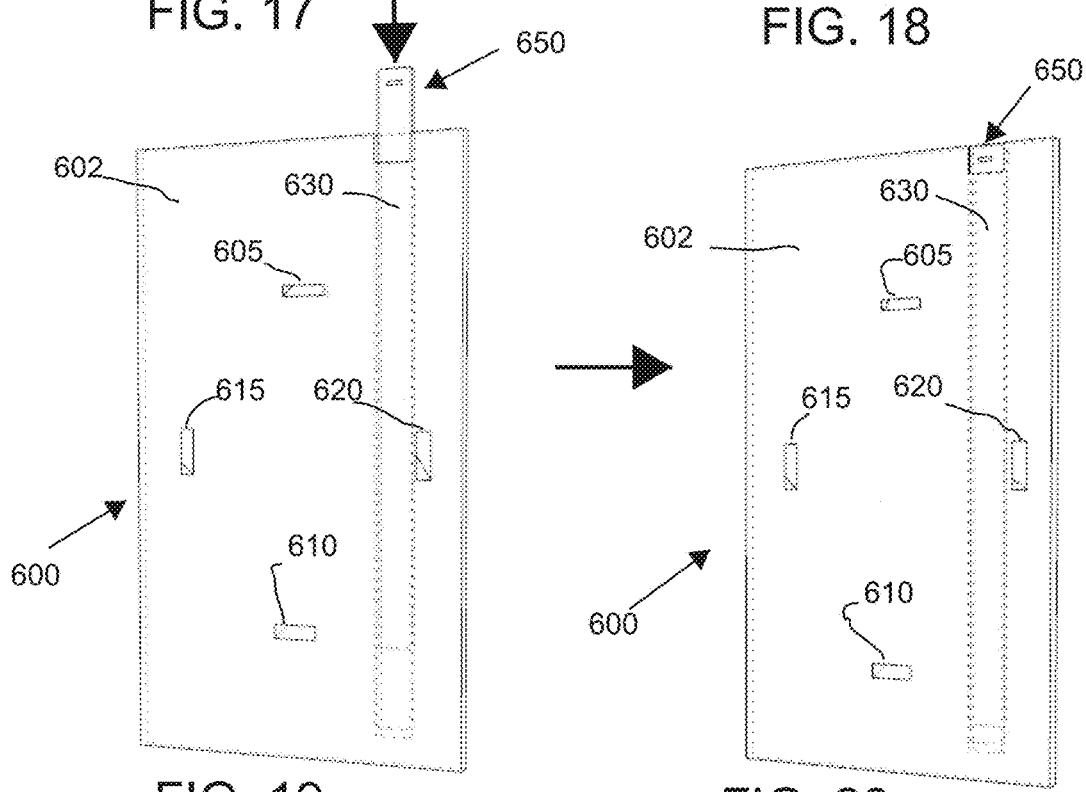

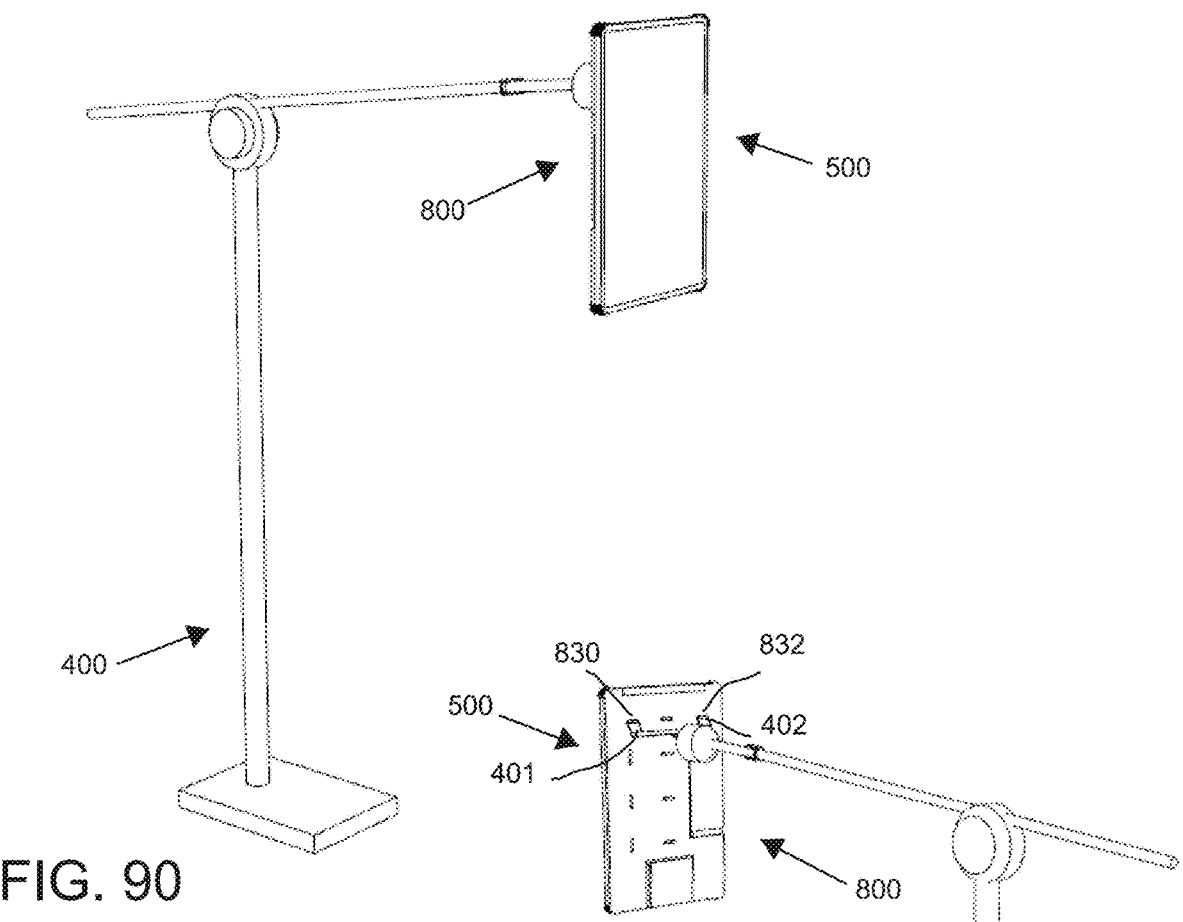

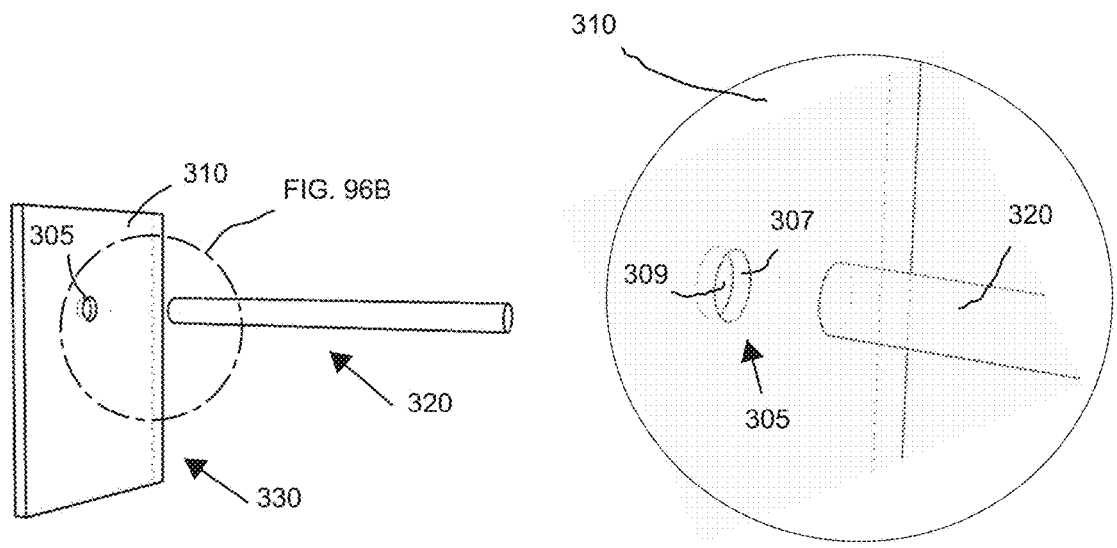
FIG. 96A
FIG. 96B
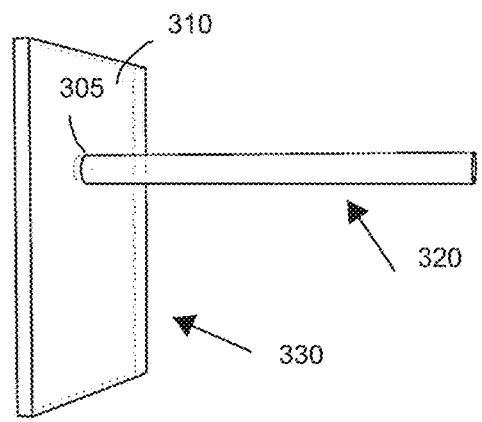
FIG. 96C
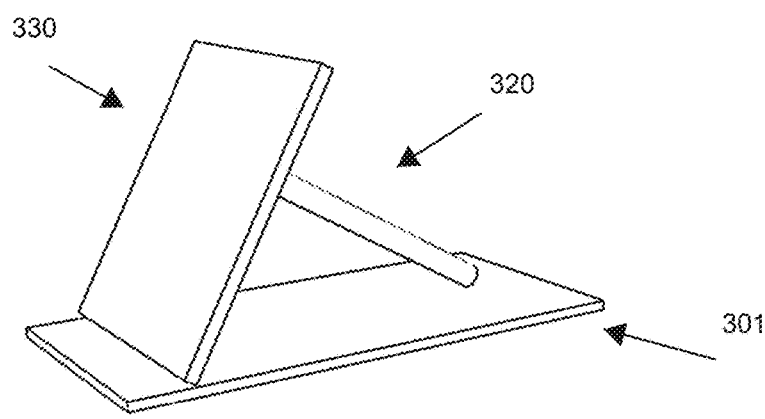
FIG. 96D

INCONSPICUOUS SUSPENSION SYSTEM FOR SUSPENDING MOBILE COMPUTING DEVICES TO MULTIPLE ANGLES AND ORIENTATIONS WITH RESPECT TO A RESTING SURFACE OR BASE

RELATED APPLICATIONS

This application is a continuation of U.S. patent application Ser. No. 16/358,646 filed on Mar. 19, 2019 and claims the benefit of U.S. Provisional Application No. 62/779,827 filed on Dec. 14, 2018 and U.S. Provisional Application No. 62/753,923 filed on Nov. 1, 2018, and is a continuation-in-part (CIP) of U.S. patent application Ser. No. 16/136,247 filed on Sep. 19, 2018, now U.S. Pat. No. 10,305,528 B2, which was a continuation of U.S. patent application Ser. No. 15/229,644 filed on Aug. 5, 2016, now U.S. Pat. No. 10,135,480 B1, which claims the benefit of U.S. Provisional Patent Application No. 62/263,434 filed Dec. 4, 2015, all of which applications are incorporated by reference in their entirety.

TECHNICAL FIELD

The technology herein relates to an integrated system of angled and straight cavities for propping, positioning, and suspending mobile computing devices to multiple angles and orientations with respect to a resting surface or base.

BACKGROUND OF THE INVENTION

Since the filing of my patent application Ser. No. 15/229,644 "coupling mechanisms for enhancing the functionality of smart phones and tablet computers" on Aug. 5, 2016; now U.S. Pat. No. 10,135,480, I have come to realize that in certain situations it may be more efficient and functional to store the electronic stylus or support element in locations other than in a silo inside the mobile computing device (such as in the Samsung Galaxy Note) or in an open recession in the back plate, protective cover, or back panel of a mobile computing device (as described in my U.S. Pat. No. 10,135,480). In certain situations, it may be more efficient and functional to store the electronic stylus or support element to the side of the mobile computing device—either inside the mobile computing device itself, or within a protective cover of the mobile computing device.

I have also come to realize that in certain situations it may beneficial to use the same concept of patent application Ser. No. 15/229,644 to suspend the device spatially on a desktop stand, a floor stand, from a car dashboard, or from a wall panel for more useful and ergonomic considerations.

The simple support system for propping and suspending mobile computing devices to multiple angles and orientations disclosed in this patent application provides an integrated approach for enhancing the functionality, comfort, and enjoyment of smart phones and tablet computers without compromising their artistic style and without adding noticeable thickness, weight, and cost to these devices. Some of the important practical advantages of this system are:

The ability to consume information or entertainment at an ergonomic angle while freeing both hands to eat, or to perform other tasks concurrently.

The ability to communicate wirelessly with another person over an extended period without tiring one's hand.

The ability to accommodate a small stylus that doubles as a support stand that vastly enhances the functionality of mobile computing devices as note taking and sketching instruments.

The ability to watch the news or communicate with another person while shaving, cooking, or performing other tasks The ability to quickly use mobile computing devices as GPS systems in a car by instantly "hanging" and "unhanging" the devices from the dashboard.

The ability to steady a camera shot or position a smart phone or tablet computer camera at an optimum angle for recording a scene or an interview.

The ability to take remotely controlled pictures and videos at convenient angles and orientations.

The ability to transform mobile computing devices into desktop computer replacements by hanging them on a desktop stand and adding a wireless keyboard and a mouse.

And finally, the ability to empower bed-ridden and elderly people to communicate with others and consume information or entertainment while in bed or while sitting on a couch simply by "hanging" and "unhanging" their mobile computing devices from a floor stand. Furthermore, the recent introduction of folding phones such as the Samsung Galaxy Fold and the Huawei Mate X with their expansive display screens makes it imperative to incorporate some sort of propping mechanism into modern mobile computing devices in order to empower users to take full advantage of their ever-expanding display screens.

SUMMARY OF THE INVENTION

The invention described herein is of a simple and inconspicuous system that does not compromise the artistic style of the device in which it is incorporated, practically adds no weight, no thickness, and no cost, to existing mobile computing devices, or to existing protective covers or cases of mobile computing devices, while enabling them to be quickly and efficiently propped up and suspended to multiple angles and orientations with respect to a resting surface or base—providing users added functionality, comfort, and enjoyment at minimal additional cost.

An important practical advantage of the invention is its ability to use a stylus to prop mobile computing devices to a plurality of angles and orientations.

Another important practical advantage of the invention is its ability to use hooks to suspend mobile computing devices to multiple angles and orientations; hooks which may be mounted on desktop stands, floor stands, car dashboards, and walls.

The use of styluses and hooks to prop and suspend mobile computing devices to multiple angles and orientation with respect to a resting surface or base is not essential for the proper functioning of the invention—and neither is the use of independent arms and plates. Furthermore, the location of styluses, arms, plates, and hooks that are used to prop and to suspend the mobile computing devices has no relevance on the proper functioning of the invention.

What the invention is, is a plurality of cavities such as sockets, grooves, notches, and slits strategically located on the back panel of mobile computing devices, or the back panel of protective covers or cases of mobile computing devices, or on panels that can be adhered to the back plate of a mobile computing device, with each cavity comprising walls which may be straight, curved, vertical, horizontal, or sloping and that are configured to receive a matching end of a support element or structure at a single specific angle and orientation with respect to the device's back plate in order to enable the support element or structure to prop or to suspend the mobile computing device to various angles and orientations with respect to a resting surface or base by manually keying at least one end of the support element or structure into a matching cavity and placing the other end of the support element or structure on a resting surface or base.

The support element may consist of a stylus, an arm, or a plate; and the support structure may consist of a desktop stand, a floor stand, a hook, or a plurality of hooks.

It is important to note that except for spherical cavities which consist of a single curved wall that can receive an end of a matching support element at multiple angles and orientations; the inner shape of the cavities and the shape of the matching end(s) of their associated support element/structure, as well as the storage location of the support element/structure are irrelevant for the proper functioning of the invention.

What is essential for the proper functioning of the invention is that each cavity; such as socket, groove, notch, or slit, be configured to receive a matching end of a support element or structure at a single specific angle and orientation with respect to the back plate of the mobile computing device with which it is associated. More specifically, the invention is an inconspicuous support system for propping and suspending mobile computing devices to multiple angles and orientations with respect to a resting surface or base, the system comprising:

a back plate of a mobile computing device, or a protective cover or case of a mobile computing device, or a panel that can be adhered to the back plate of a mobile computing device;

wherein the back plate, protective cover or case, or panel, comprises at least two cavities; each cavity comprising walls that may be straight, curved, slanted, horizontal, or vertical, or any combination thereof, with each cavity configured to receive, fully or partially, one end of a matching support element or structure at a single specific angle and orientation with respect to the back plate, protective cover or case, or panel to which it is attached; and wherein the support element or structure is used to prop and position, or to suspend and position, the mobile computing device to specific angles and orientations with respect to a resting surface or base by manually keying at least one end of the support element or structure into a matching cavity located in the back plate, protective cover or case, or panel of the mobile computing device and placing another end of the support element or structure on a resting surface or base.

In certain embodiments, the back plate, protective cover or case, or back panel of the mobile computing device may comprise a longitudinal cavity, slot, or slit for storing or retaining a support element.

In other embodiments, the support element may be stored inside the mobile computing device, to one side of the mobile computing device, or to the back of the mobile computing device.

Yet in other embodiments, the support element may be stored inside a protective cover or case of a mobile computing device, to one side of a protective cover or case of a mobile computing device or to the back of a protective cover or case of a mobile computing device.

Also, yet in other embodiments, the support element may be stored inside a panel that can be adhered to the back plate of a mobile computing device, to one side of a panel that can be adhered to the back plate of a mobile computing device, or to the back of a panel that can be adhered to the back plate of a mobile computing device.

In order to strengthen the connection between the cavities and their matching support element or structure, at least one end of the support element or structure may be magnetized and the matching cavities on the back plate, protective cover or case, or panel, may comprise, or may be layered by, a metallic substance.

Alternatively, at least one end of the support element or structure may be metallic and the matching cavities on the back plate, protective cover, or panel may comprise, or may be layered by, a magnetic substance.

BRIEF DESCPRIPTION OF THE DRAWINGS

FIGS. 1 to 3 illustrate the concept of the invention as it relates to placing cavities such as sockets, grooves, notches, and slits on the back plate of a mobile computing device, or a protective cover of a mobile computing device, or a panel that can be adhered to the back plate of a mobile computing device, and coupling it with an end of a matching support element to position the device to specific angles and orientations with respect to a resting surface or base.

FIGS. 4 and 5 illustrate the concept of the invention as it relates to placing cavities such as grooves, sockets, notches, and slits on the back plate of a mobile computing device, or a protective cover or case of a mobile computing device, or a panel that can be adhered to the back plate of a mobile computing device, and coupling it with an end of a matching hook to suspend the device to specific angles and orientations with respect to a resting surface or base.

FIGS. 10 to 12 illustrate the concept of the invention as it relates to propping a mobile computing device to a plurality of angles and orientations using a flat stylus that may be stored in an open recession that is adjacent to an edge of a mobile computing device.

FIGS. 15 to 20 illustrate three-dimensional perspective views of exemplary back panels with slits and slots that may be used for propping and suspending mobile computing devices.

Figure 78:
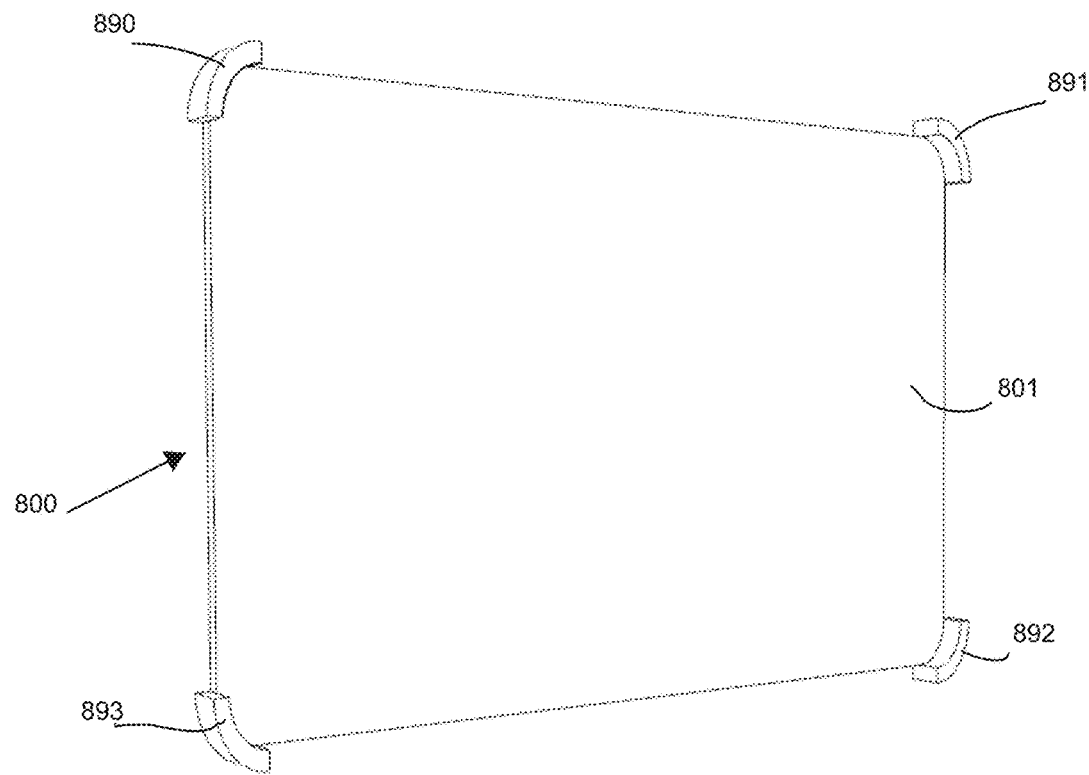
FIGS. 78 and 79 illustrate three-dimensional perspective views of the front and back sides of a non-limiting exemplary tablet holder for a contemporary tablet computer.
Figure 79:
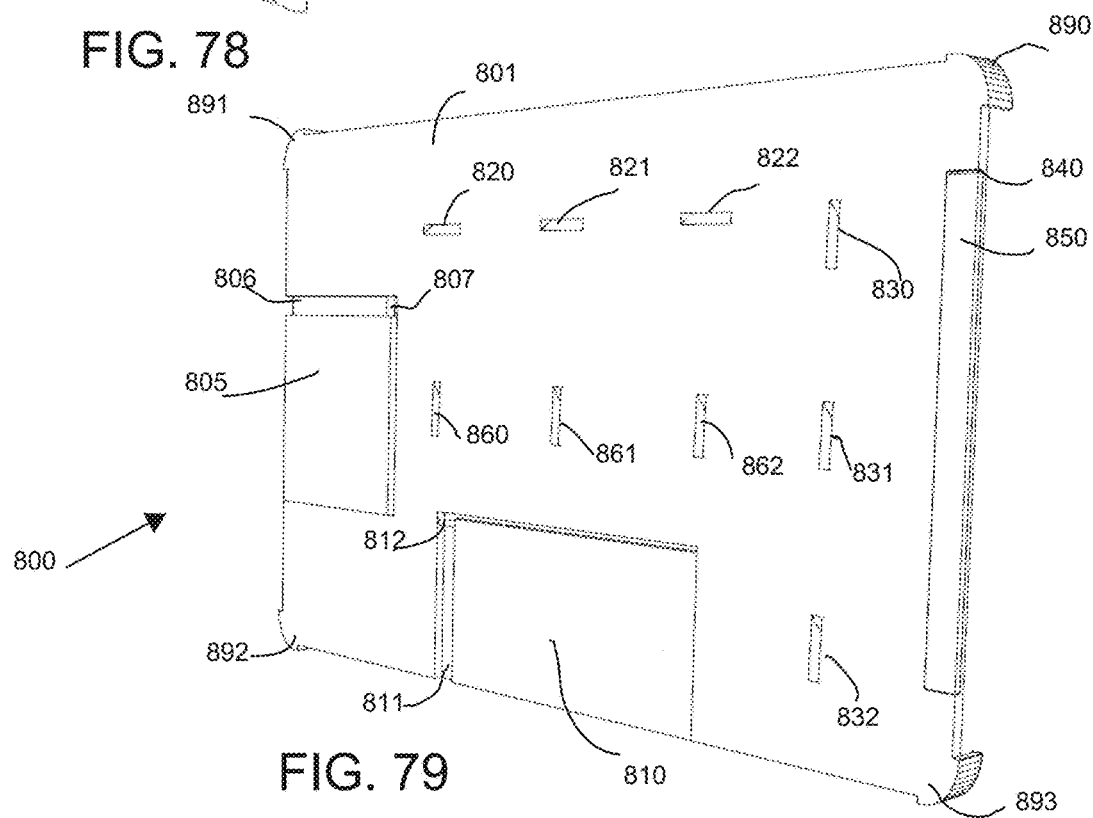
Figure 84:
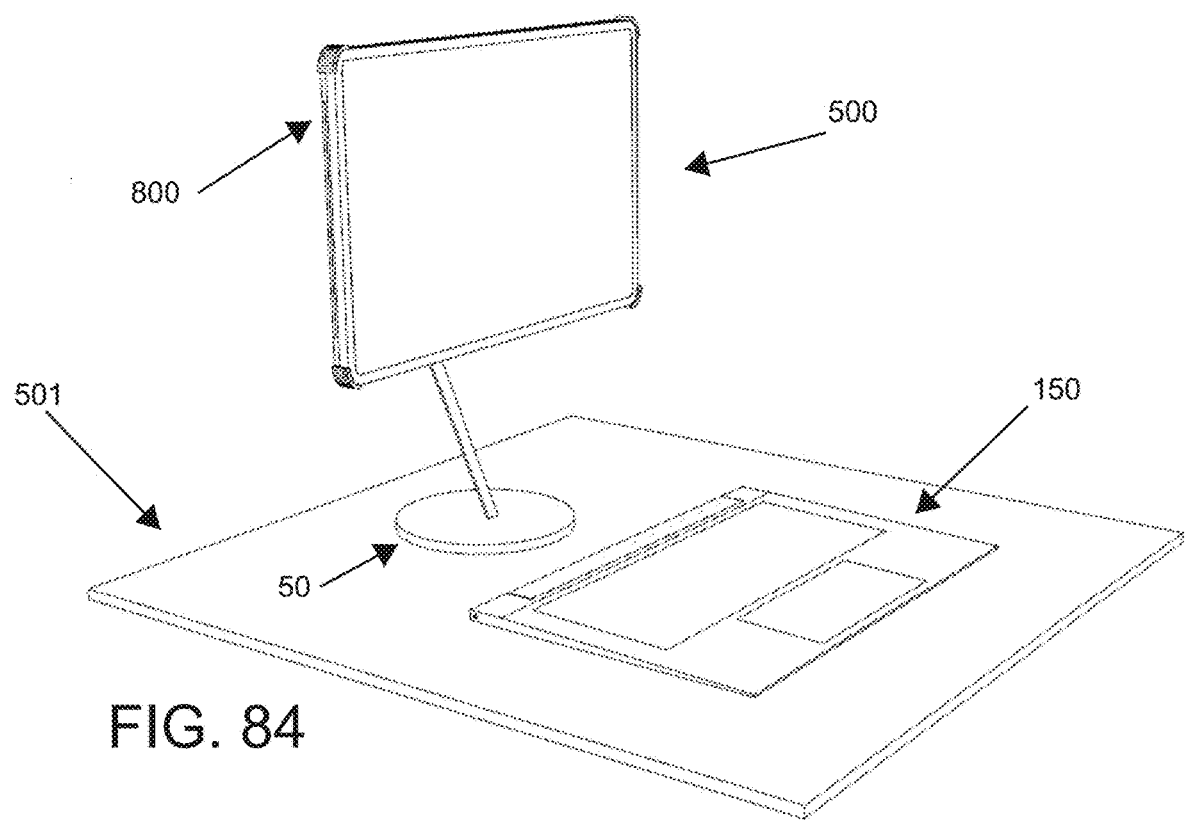
Figure 85:
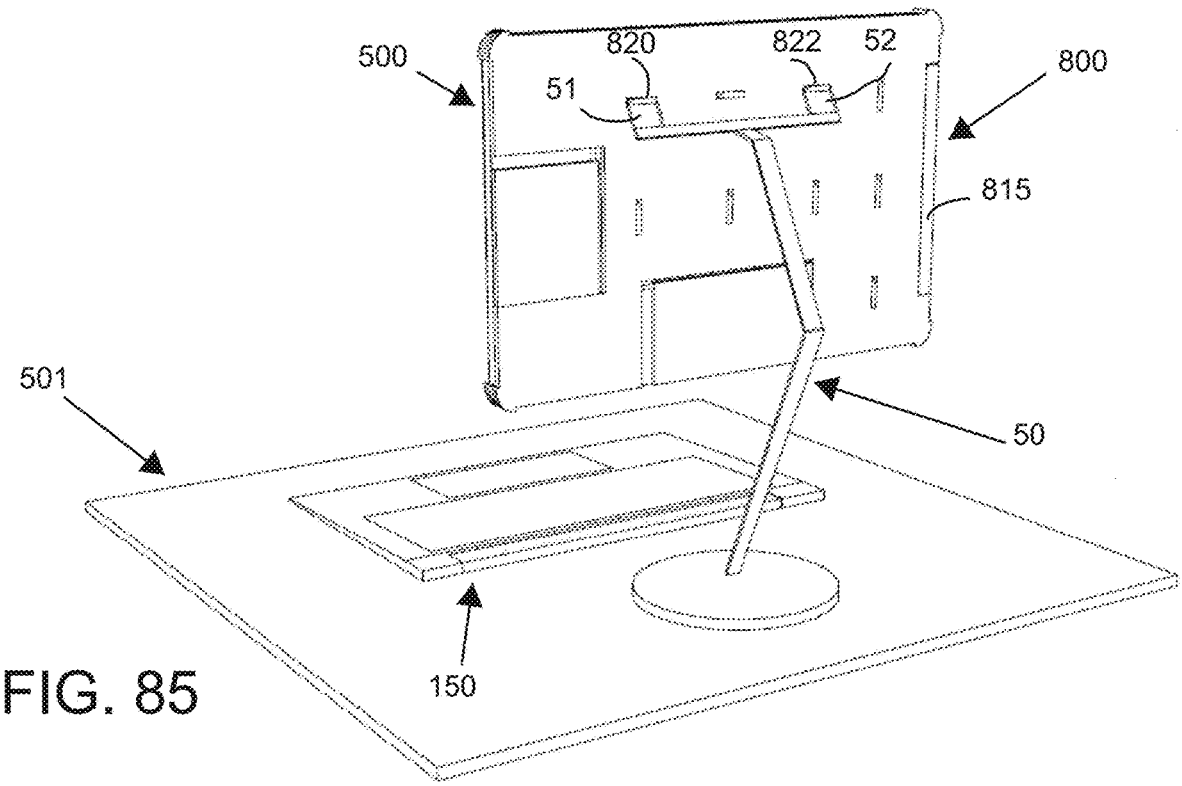

FIGS. 84 and 85 illustrate three-dimensional perspective views of the front and back sides of a contemporary tablet computer held in the exemplary tablet holder of FIGS. 78 and 79 suspended on a desktop stand in the landscape orientation.

Figure 86:
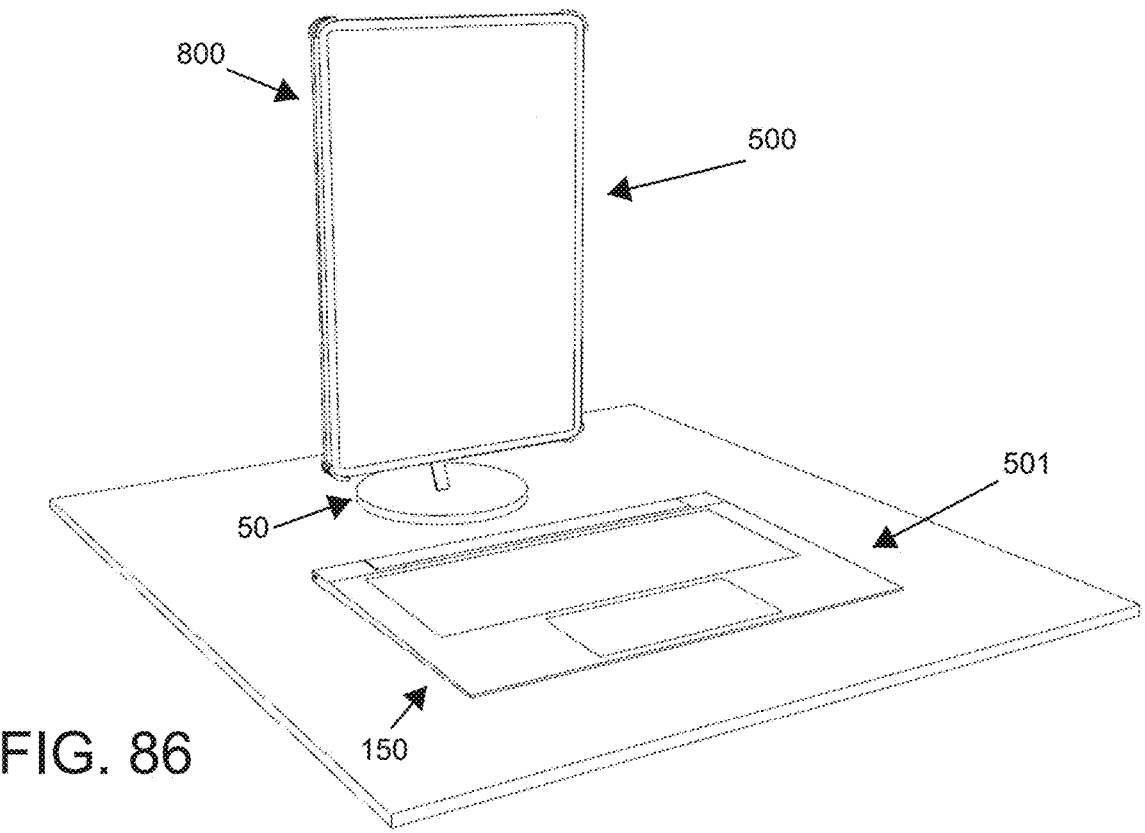
Figure 87:
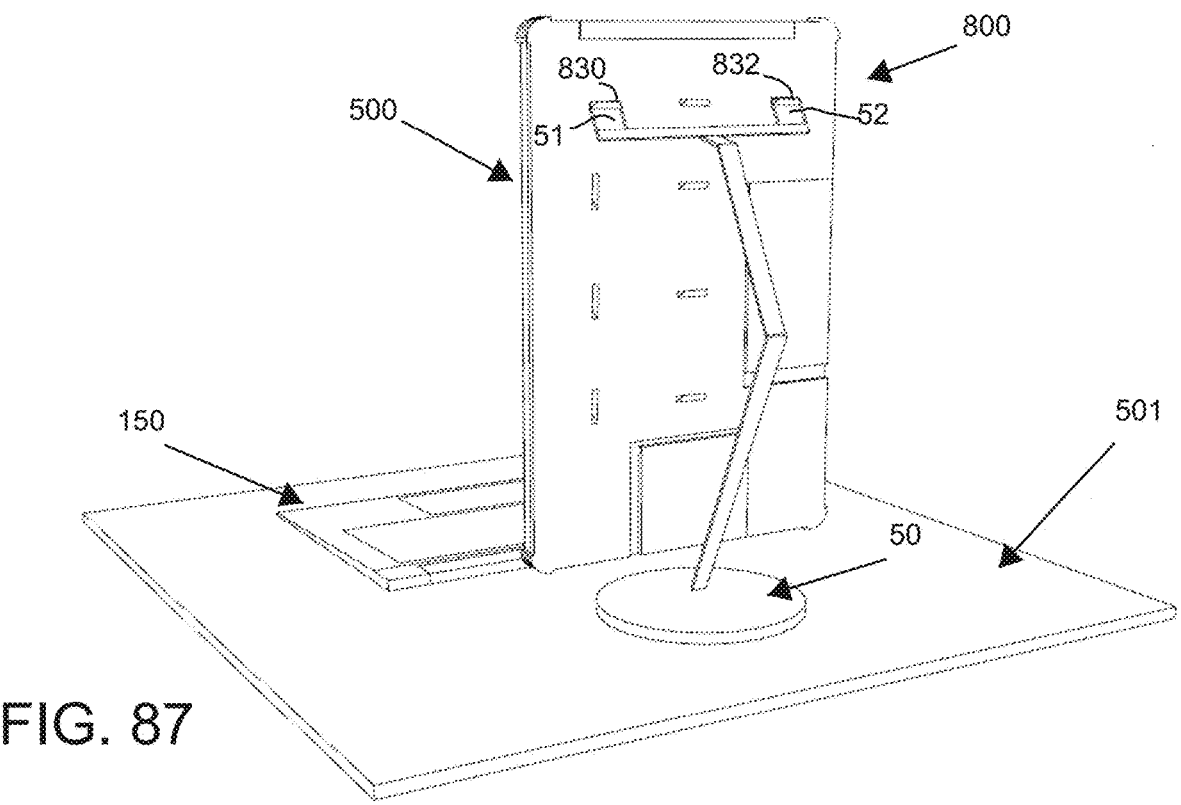

FIGS. 86 and 87 illustrate three-dimensional perspective views of the front and back sides of a contemporary tablet computer held in the exemplary tablet holder of FIGS. 78 and 79 suspended on a desktop stand in the portrait orientation.

Figure 88:
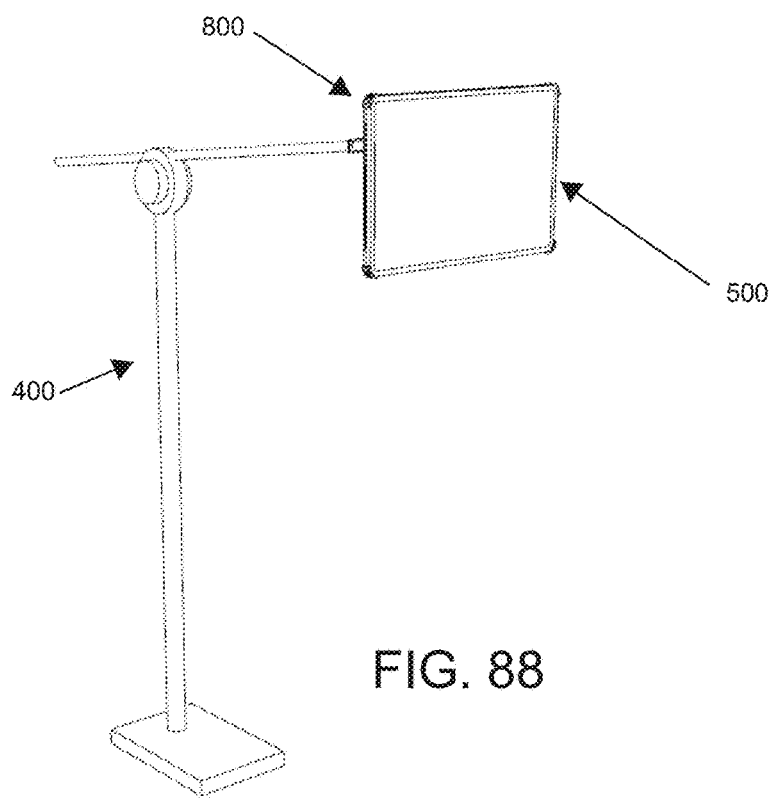
Figure 89:
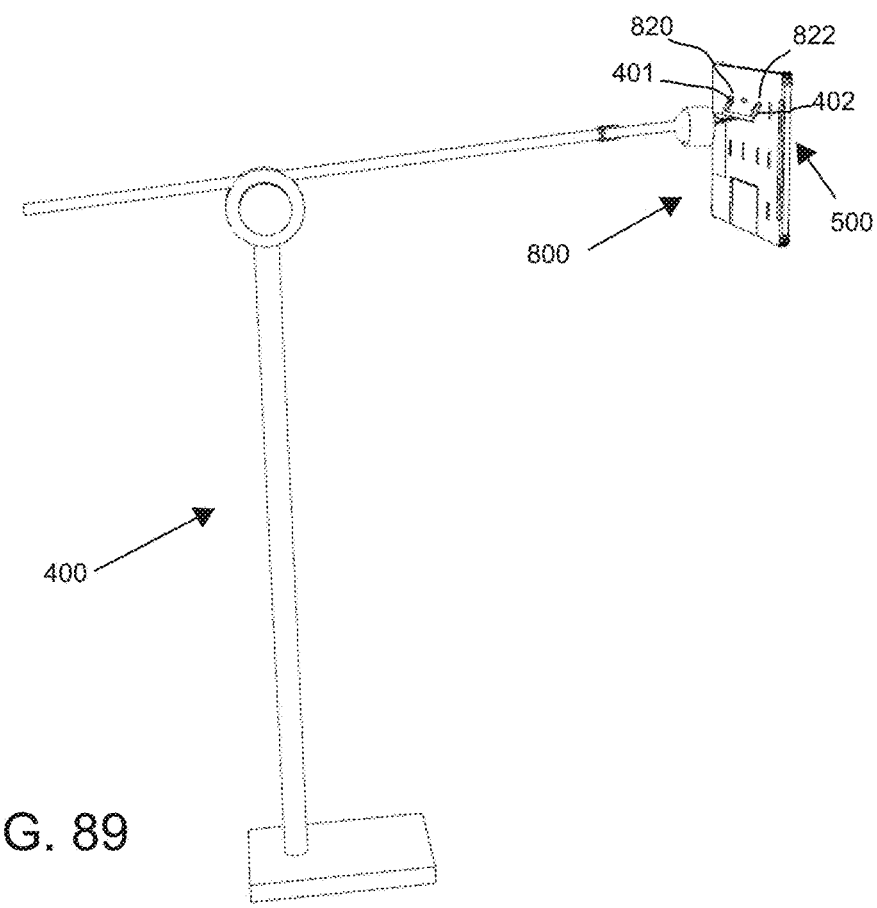

FIGS. 88 and 89 illustrate three-dimensional perspective views of the front and back sides of a contemporary tablet computer held in the exemplary tablet holder of FIGS. 78 and 79 suspended from a floor stand in the landscape orientation.

FIGS. 90 and 91 illustrate three-dimensional perspective views of the front and back sides of a contemporary tablet computer held in the exemplary tablet holder of FIGS. 78 and 79 suspended from a floor stand in the portrait orientation.

Figure 92:
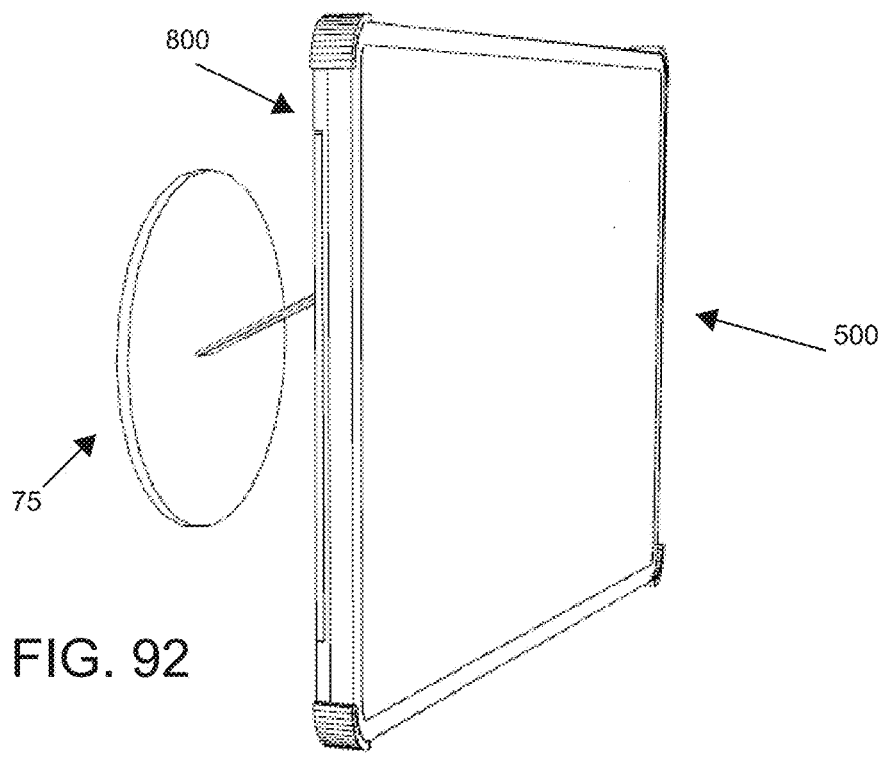
Figure 93:
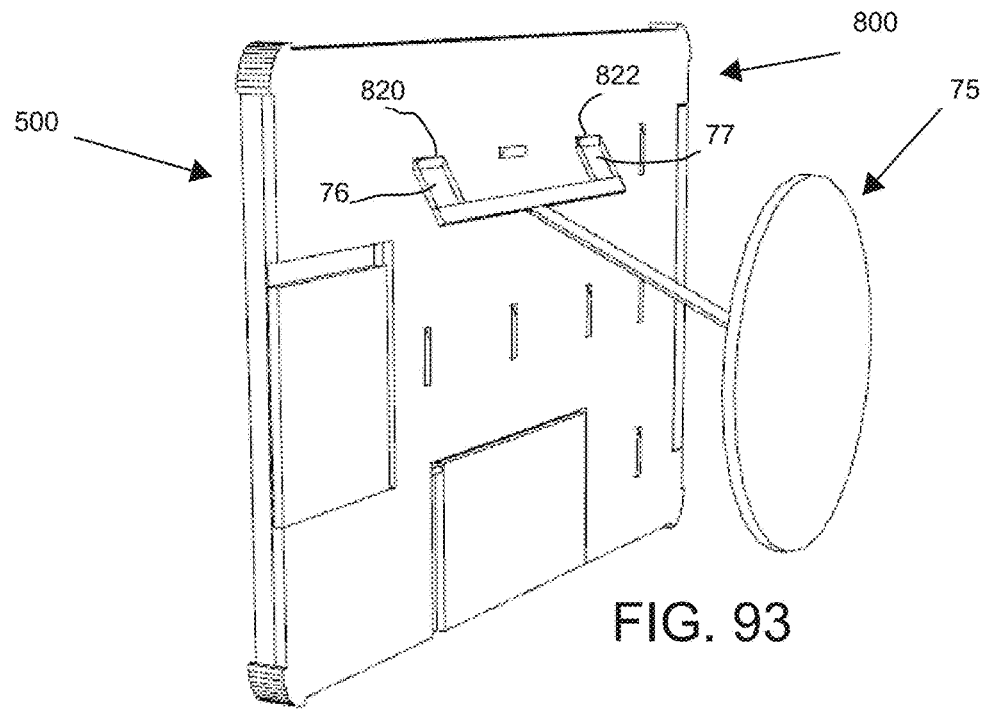

FIGS. 92 and 93 illustrate three-dimensional perspective views of the front and back sides of a contemporary tablet computer held in the exemplary tablet holder of FIGS. 78 and 79 suspended from a wall hook in the landscape orientation.

Figure 94:
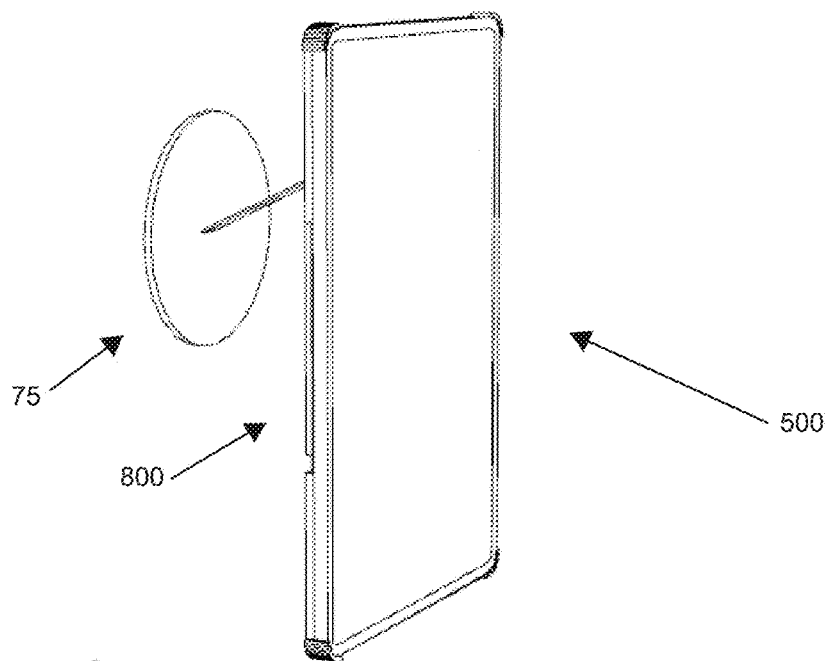
Figure 95:
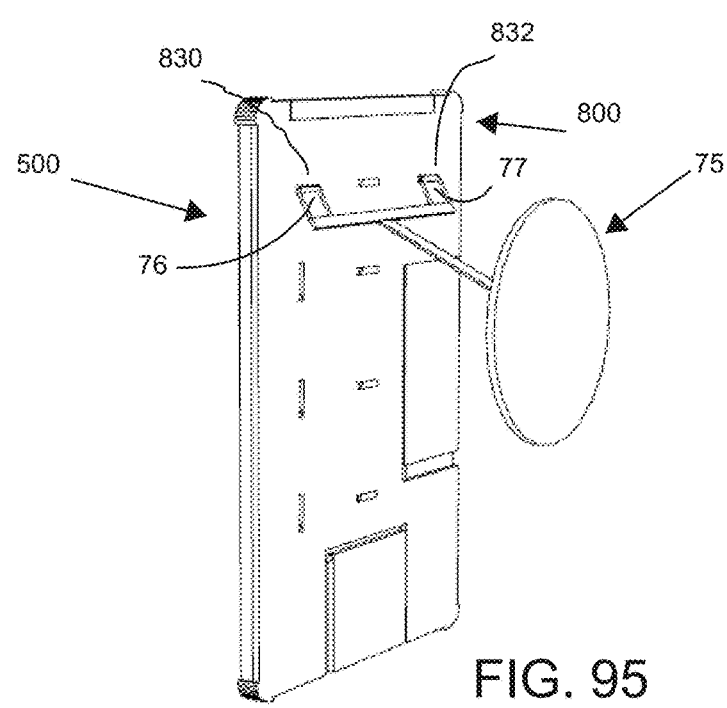
Figure 97A:
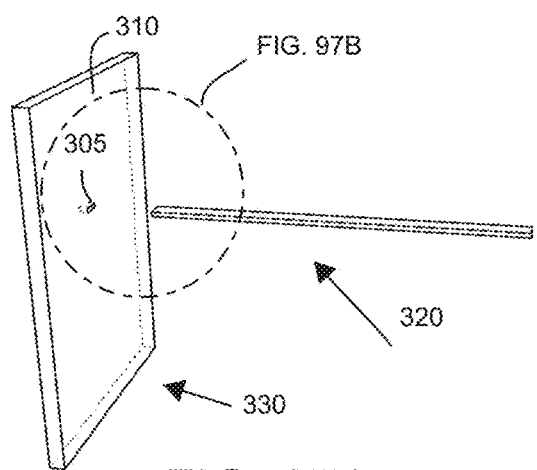
Figure 97B:
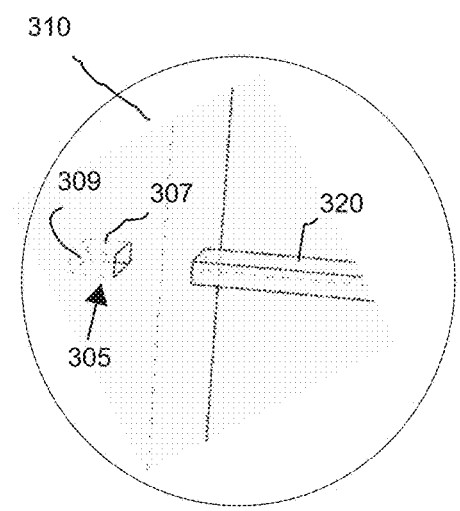
Figure 97C:
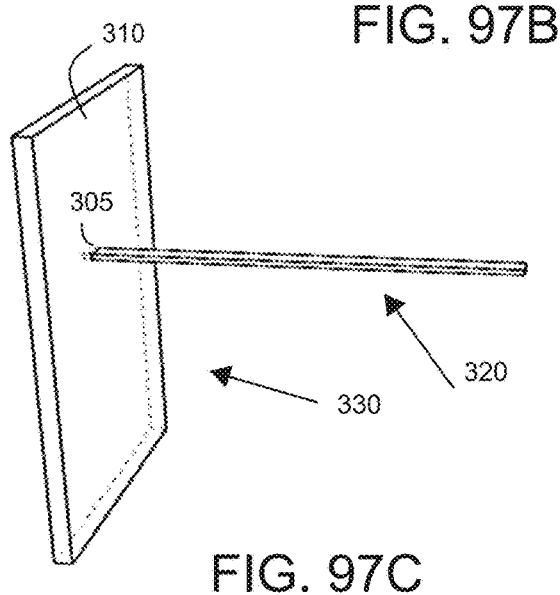
Figure 97D:
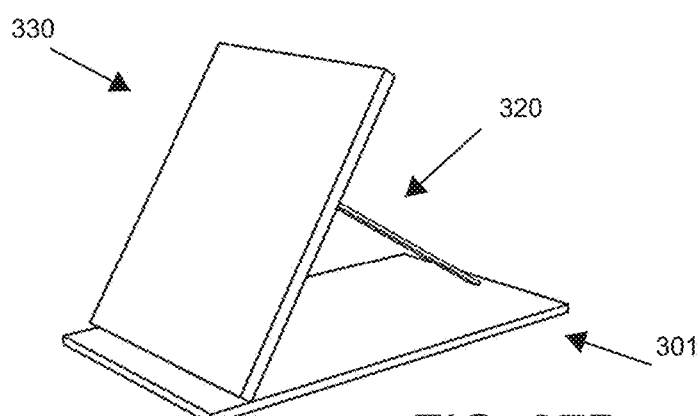
Figure 98A:
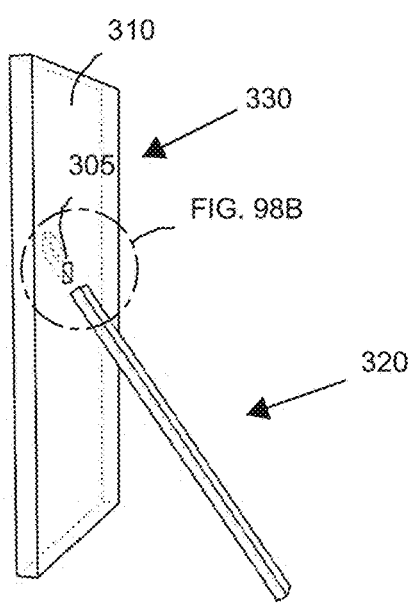
Figure 98B:
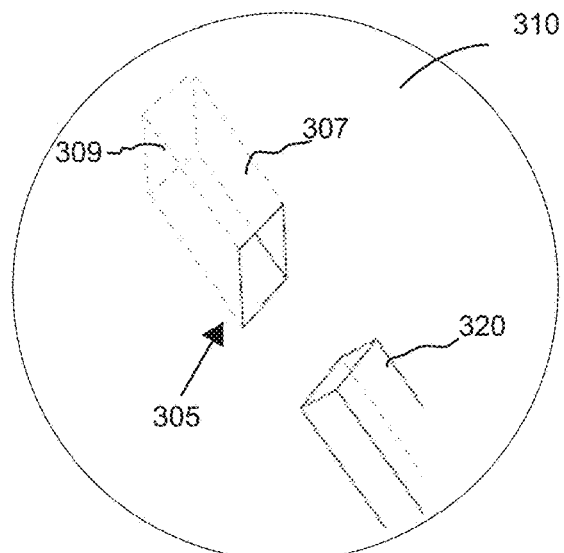
Figure 98C:
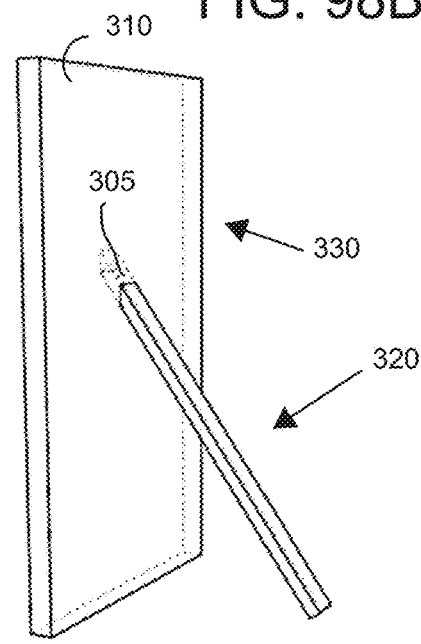
Figure 98D:
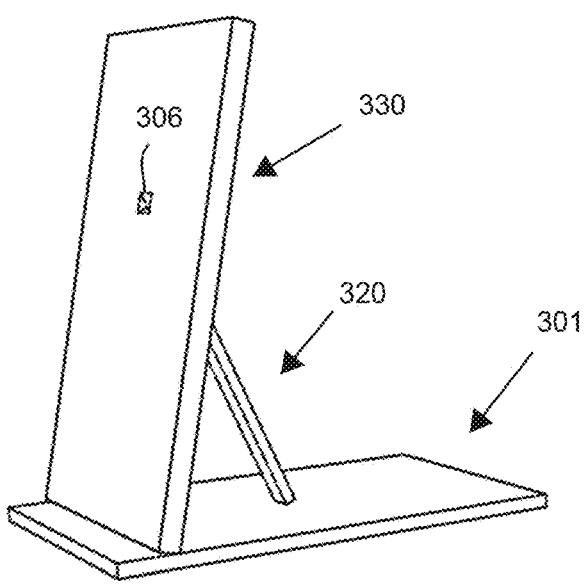
Figure 99A:
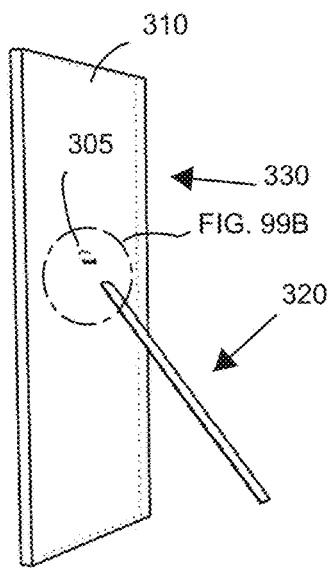
Figure 99B:
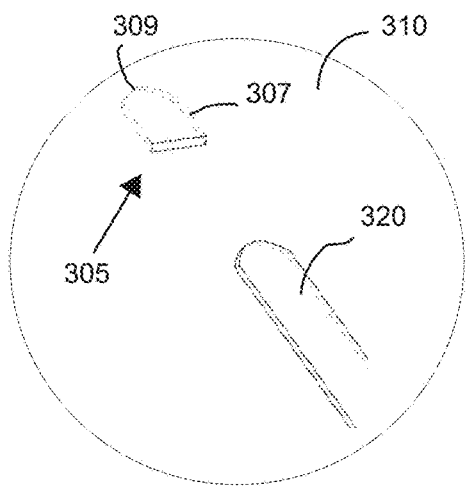
Figure 99C:
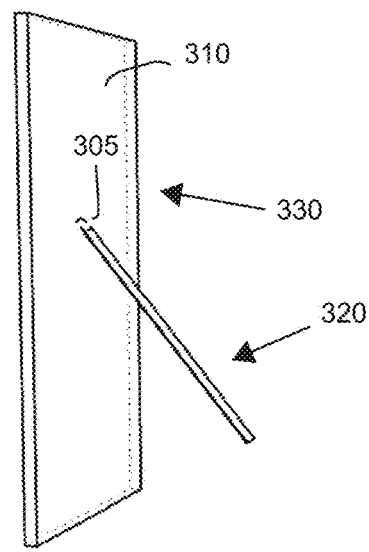
Figure 99D:
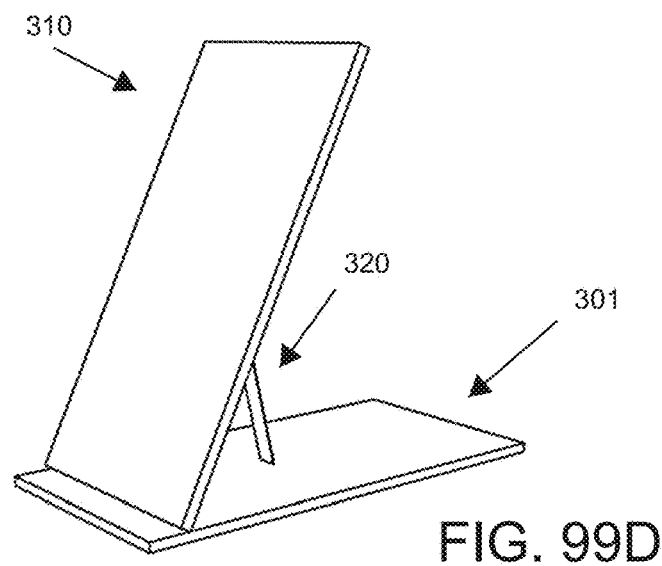

FIGS. 94 and 95 illustrate three-dimensional perspective views of the front and back sides of a contemporary tablet computer held in the exemplary tablet holder of FIGS. 78 and 79 suspended from a wall hook in the portrait orientation.

FIGS. 96A to 99D illustrate three-dimensional perspective views of the concept of the invention using a variety of non-limiting cavities and matching support elements to prop and suspend mobile computing devices to multiple angles and orientations with respect to resting surface or base.

FIGS. 100A to 100D illustrate three-dimensional perspective views of a non-limiting exemplary implementation of the concept of the invention as it relates to attaching a desktop stand, a floor stand, or a wall hook to a mobile computing device using an "L-Shaped" hook rather than an "I-Shaped" hook for a more robust locking between cavity and support element.

FIGS. 101 to 104 illustrate three-dimensional perspective views of additional exemplary embodiments of alternative configurations of straight, curved, and sloped endings of support elements and structures that may be used to prop and suspend mobile computing devices to multiple angles and orientations with respect to resting surface or base.

FIGS. 105 to 112 illustrate three-dimensional perspective views of a non-limiting exemplary implementation of how the suspension aspect of the disclosed invention can be combined with a hinged angular propping element to provide angular propping and suspension for a smart phone using two independent and fundamentally different mechanisms.

FIGS. 113 to 122 illustrate three-dimensional perspective views of a non-limiting exemplary implementation of how the suspension aspect of the disclosed invention can be combined with hinged angular propping elements to provide angular propping and suspension for a tablet computer using two independent and fundamentally different mechanisms.

DETAILED DESCRIPTION OF THE DRAWINGS

The following illustrations are directed to non-limiting exemplary embodiments of protective cases, back panels, support elements, support structures, storage structures, latching cavities, and hooks used for propping and suspending mobile computing devices to multiple angles and orientations with respect to a resting surface or base. The displayed embodiments are shown for exemplary purposes; the various cavities, grooves, sockets, notches, slits, silos, recessions, styluses, arms, plates, storage structures, protective cases, and back panels, desktop stands, floor stands, and hooks can have various shapes and sizes to fit the desired form and function of the device in which they are integrated.

Figure 1:
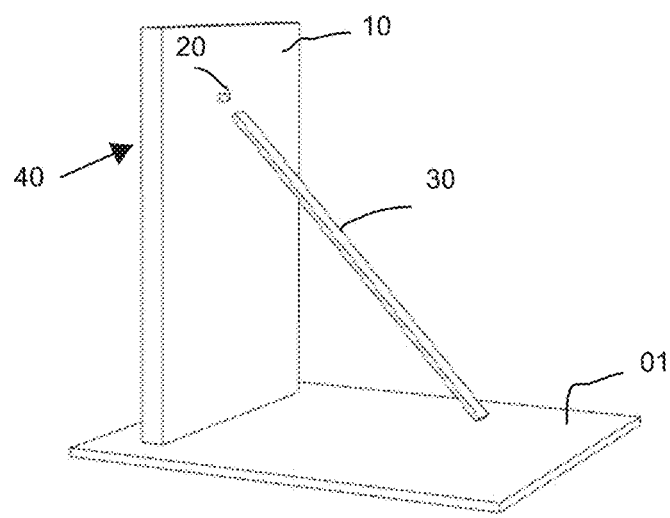
Figure 2:
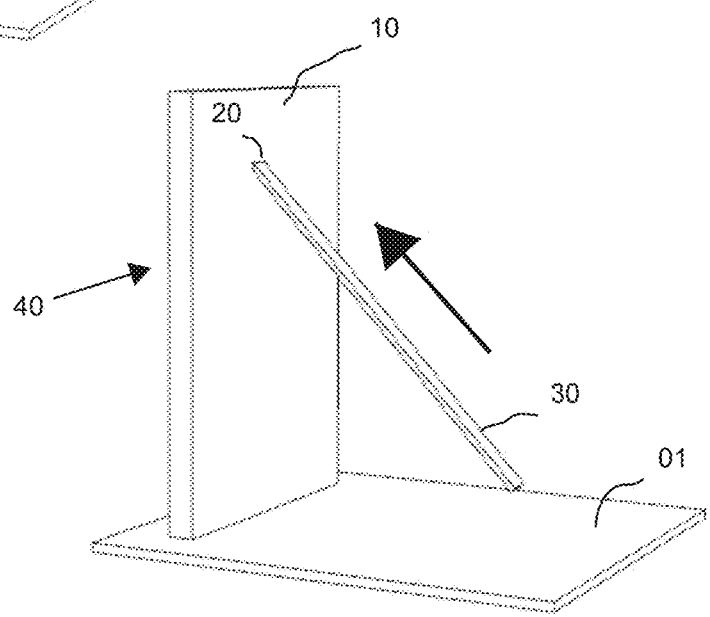
Figure 3:
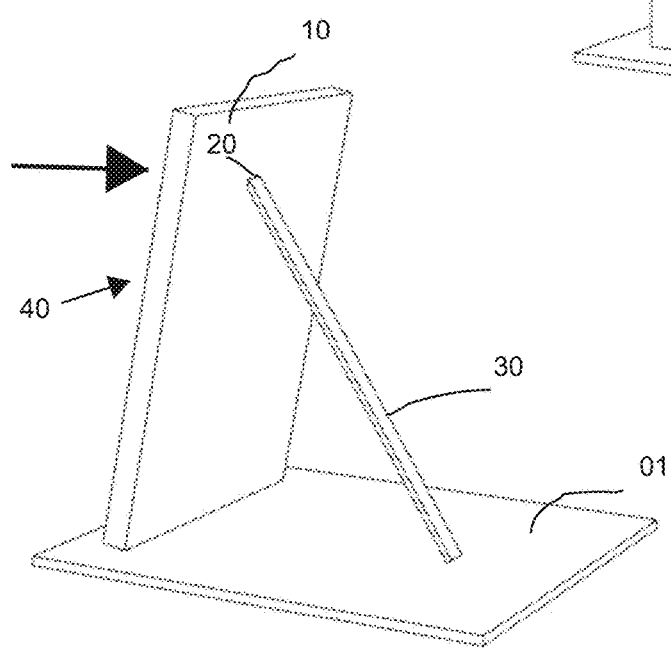

FIGS. 1 to 3 are a sequence of drawings that when looked at one after another provide something akin to a flip chart animation that illustrates a non-limiting exemplary demonstration of the concept of the invention as it relates to latching an exemplary support element 30 to the back plate 10 of an exemplary mobile computing device 40 by inserting one end of the exemplary support stand 30 into a cavity, groove, socket, notch, or slit 20 in the back plate 10 of the exemplary mobile computing device and leaning the device backward in order to position it to an angled position with respect to a resting surface or base 01. The support element 30 may be a stylus, an independent arm, or plate; and the exemplary mobile computing device 40 may be a smart phone, a tablet computer, an electronic book, or other mobile computing device.

Figure 4:
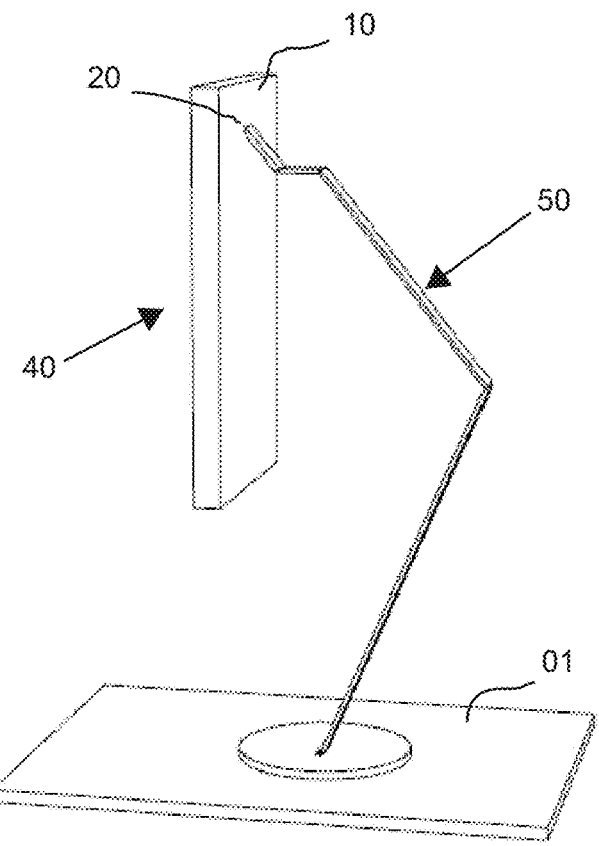

FIG. 4 illustrates a non-limiting exemplary demonstration of the concept of the invention as it relates to latching an exemplary desktop stand 50 into the back plate 10 of an exemplary mobile computing device 40 by inserting one end of the exemplary desktop stand 50 into a cavity, groove, socket, notch, or slit 20 in the back plate of the exemplary mobile computing device 40 in order to suspend and position that device at a straight or angled position with respect to a resting surface or base 01. The exemplary mobile computing device 40 may be a smart phone, a tablet computer, an electronic book, or other mobile computing device.

Figure 5:
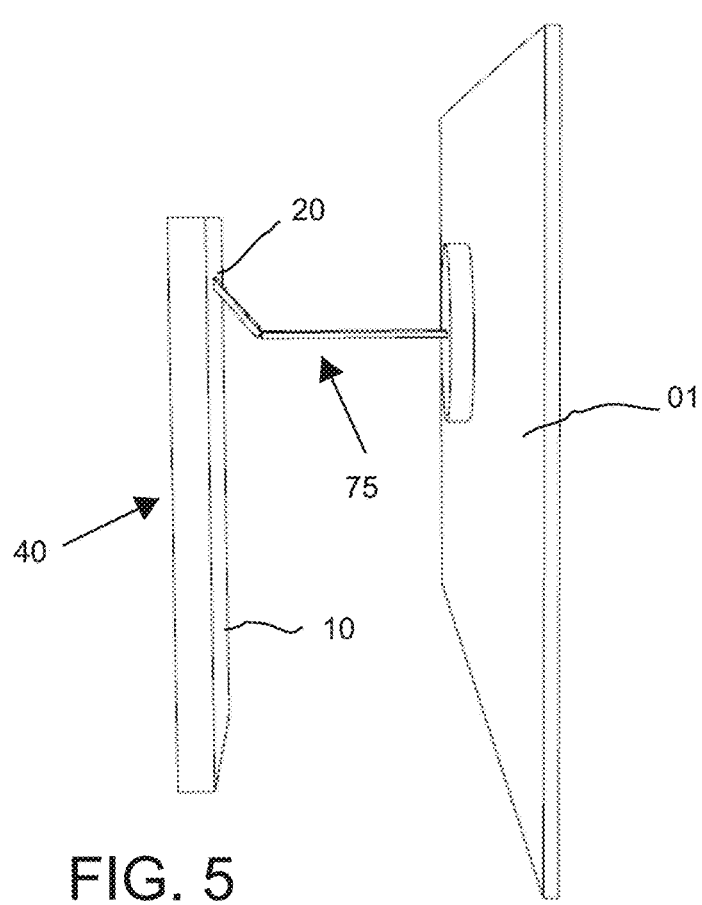

FIG. 5 illustrates a non-limiting exemplary demonstration of the concept of the invention as it relates to latching an exemplary wall hook 75 to the back plate 10 of an exemplary mobile computing device 40 by inserting one end of the exemplary wall hook 75 into a cavity, groove, socket, notch, or slit 20 in the back plate of the exemplary mobile computing device in order to suspend the exemplary mobile computing device at a straight or angled position with respect to a resting surface or base (wall) 01. The exemplary mobile computing device 40 may be a smart phone, a tablet computer, an electronic book, or other kind of mobile computing device.

FIGS. 6 to 9 illustrate the concept of the invention as it relates to propping a mobile computing device to various angles and orientations with respect to a base using a cylindrical stylus that may be stored in a silo located inside of a mobile computing device.

Figure 6:
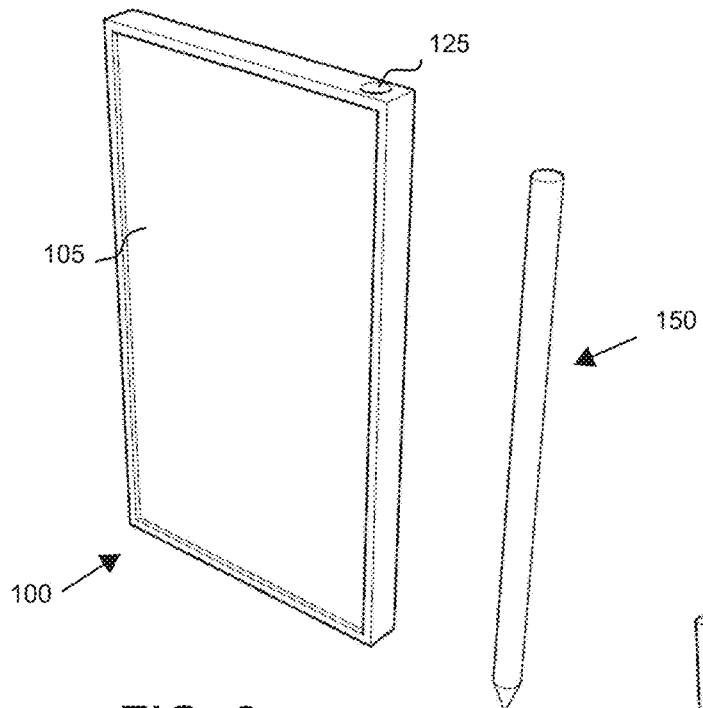
FIGS. 6 to 9 illustrate the concept of the invention as it relates to propping a mobile computing device to a plurality of angles and orientations with respect to a resting surface or base using a cylindrical stylus that may be stored in a silo located inside of a mobile computing device.

FIG. 6 illustrates the front side 105 of an exemplary smart phone 100 that incorporates a pen silo 125 and an exemplary electronic pen 150.

Figure 7:
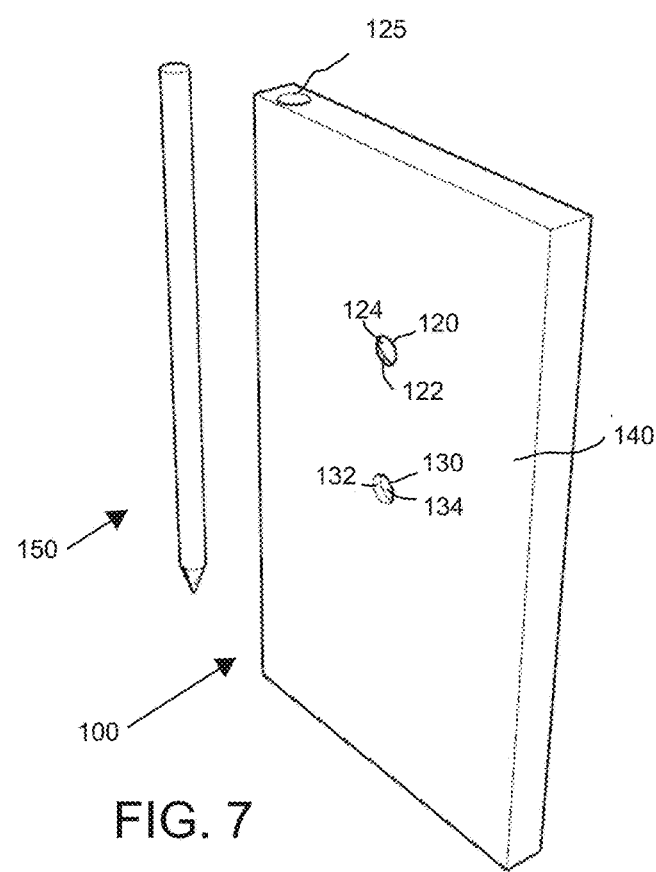

FIG. 7 illustrates the back side 140 of an exemplary smart phone 100 that incorporates a pen silo 125 and two circular cavities 120 and 130. Cavity 120 has a slanted wall 124 and a curved wall 122 for receiving electronic pen 150 at an angle, and cavity 130 has a circular straight wall 134 and a curved side wall 132 for receiving the electronic pen 150 at a 90° angle.

Figure 8:
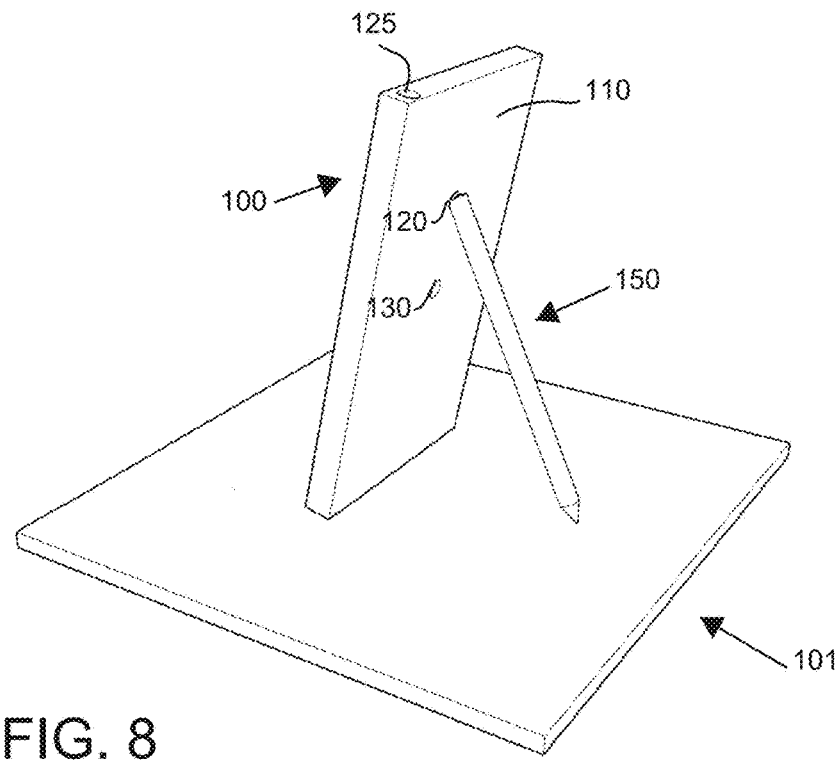

FIG. 8 illustrates how exemplary smart phone 100, placed on platform 101, can be propped by exemplary electronic pen 150 into a slanted portrait orientation through the insertion of exemplary electronic pen 150 into circular cavity 120 located on the back side 110 of exemplary smart phone 100.

Figure 9:
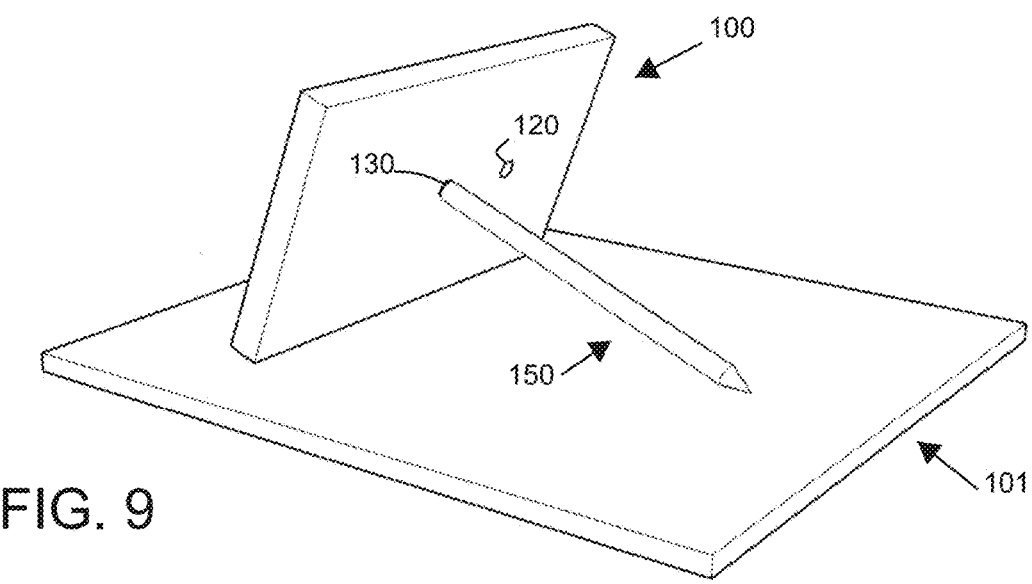

FIG. 9 illustrates how exemplary smart phone 100 can be propped by exemplary electronic pen 150 into a slanted landscape orientation through the insertion of exemplary electronic pen 150 into circular cavity 130.

FIGS. 10 to 12 illustrate the concept of the invention as it relates to propping a mobile computing device to multiple angles and orientations with respect to a fixed surface using a flat stylus that may be stored in an open recession that is adjacent to an edge of a mobile computing device.

FIG. 10 illustrates the back of an exemplary smart phone 200 with an open recession 240 housing an exemplary support element 250 with two rectangular cavities 220 and 230 for receiving the exemplary support element 250 at specific angles and orientations with respect to the back side 210 of exemplary smart phone 200.

FIG. 11 illustrates how exemplary smart phone 200 can be propped by exemplary support element 250 into a slanted portrait orientation through the insertion of exemplary support element 250 into rectangular cavity 230.

FIG. 12 illustrates how exemplary smart phone 200 can be propped by exemplary support element 250 into a slanted landscape orientation through the insertion of exemplary support element 250 into rectangular cavity 230.

Figure 13:
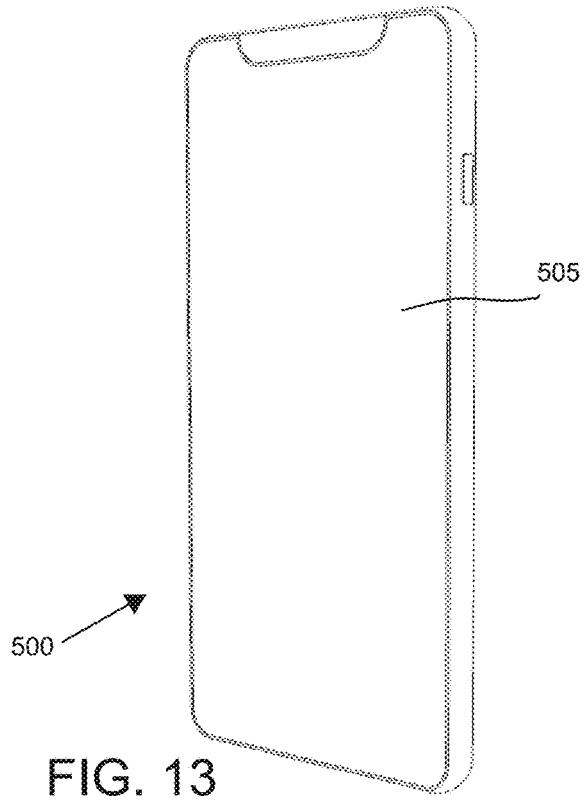
FIGS. 13 and 14 illustrate three-dimensional perspective views of the front and back sides of a non-limiting exemplary smart phone.

FIG. 13 illustrates the front side 505 of a three-dimensional perspective view of a slick and thin modern smart phone 500.

Figure 14:
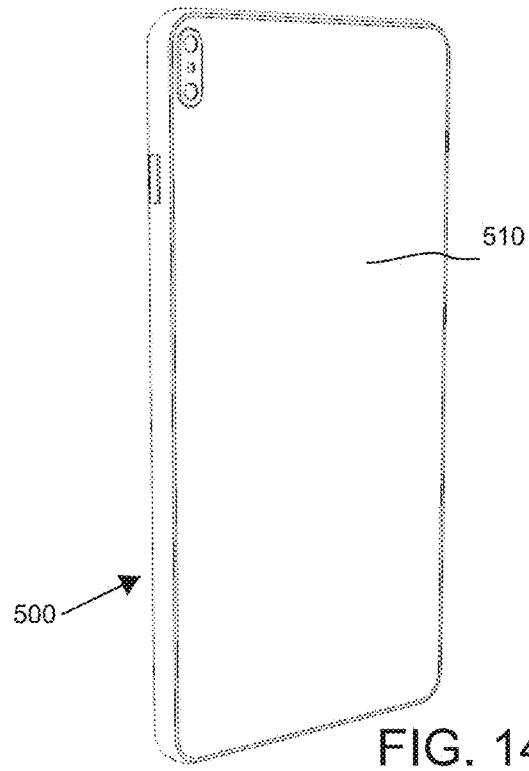

FIG. 14 illustrates the back side 510 of a three-dimensional perspective view of a slick and thin modern smart phone 500.

FIGS. 15 to 23 illustrate the implementation of the invention on non-limiting exemplary support panels for personal computing devices.

Figure 15:
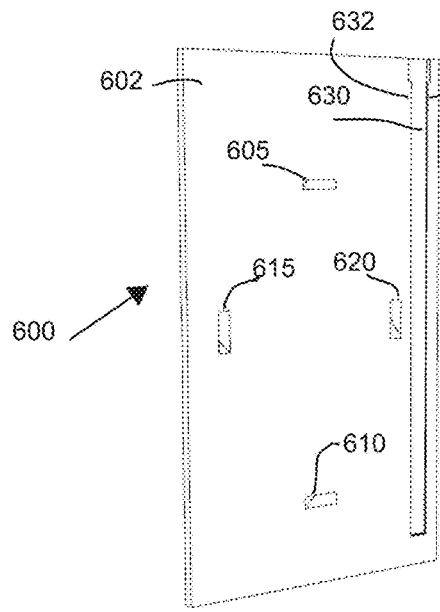

FIG. 15 illustrates a non-limiting exemplary support panel 600 with an open recession or vertical slot 630 for housing support element 650. Support panel 600 may for example be made of a strong rubbery material with a tough elastic texture that can support the weight of a mobile computing device if suspended in the air through the insertion of one end of support element 650 into any of the angled cavities or slits that are positioned strategically on the back of support panel 600. Support element 650 may consist of a conductive stem 660 and a rubbery and soft conductive end 670 for writing on a display panel, and notch 665 for easing support element 650 out of slot 630. Angled cavities or slits 605, 610, 615, and 620 are positioned strategically on the back of support panel 600 to enable support element 650 to attach to support panel 600 and position the support panel and any associated mobile computing device, to multiple angles and orientations with respect to a resting surface or base. This is accomplished by manually keying one end of support element 650, such as end 675, into individual cavities or slits 605, 610, 615, and 620 and placing the other end of support element 650, such as end 670, on a resting surface or base. Each individual angled cavity or slit 605, 610, 615, and 620 enables support element 650 to position support panel 600 to a specific angle and orientation with respect to a resting surface or base. Support element 650 may be stored in vertical slot 630 either by latching magnetically into the slot; by being inserted into the slot through vertical slits 631 and 632 that are located on either slide of the slot; or by being stored in vertical slot 630 by other means or mechanisms.

Figure 16:
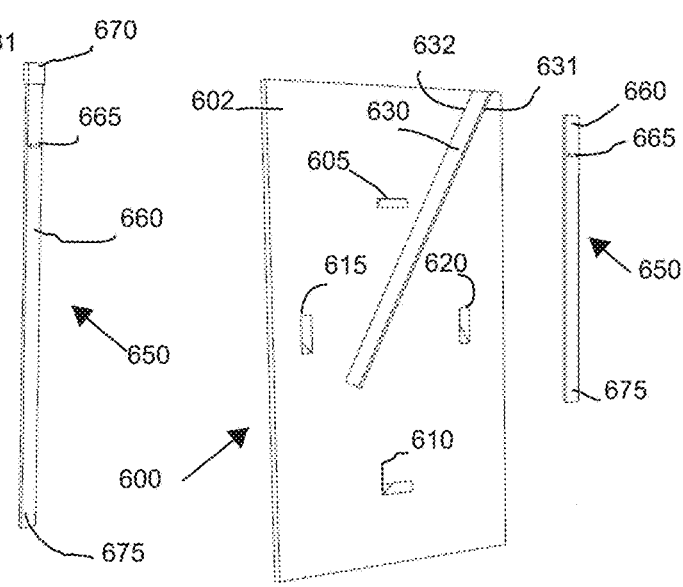

FIG. 16 illustrates another non-limiting exemplary variation of a support panel 600 where the open recession or slot 630 that is used for housing support element 650 is not adjacent nor aligned with an edge of the support panel, yet performs the exact same functions as support panel 600 of FIG. 15; demonstrating that the positioning of open cavity, or slot 630 that is used for housing the support element 650 is irrelevant to the proper functioning of the support panel.

FIGS. 17 and 18 illustrate yet another non-limiting exemplary variation of a support panel 600 where the housing of support element 650 consists of a slit that is located at one side of the support panel 600—without impacting the proper functioning of support panel 600. FIG. 17 shows support element 650 outside of support panel 600 while FIG. 18 shows support element 650 inserted in a slit 630 at one side of support panel 600.

FIGS. 19 and 20 illustrate yet another non-limiting exemplary variation of a support panel 600 where the housing of support element 650 consists of a closed slot 630 located inside of support panel 600, demonstrating once more, that the location and housing of support element 650 is irrelevant to the proper functioning of support panel 600 in propping a mobile computing device to multiple angles and orientations with respect to a resting surface or base.

Figure 21:
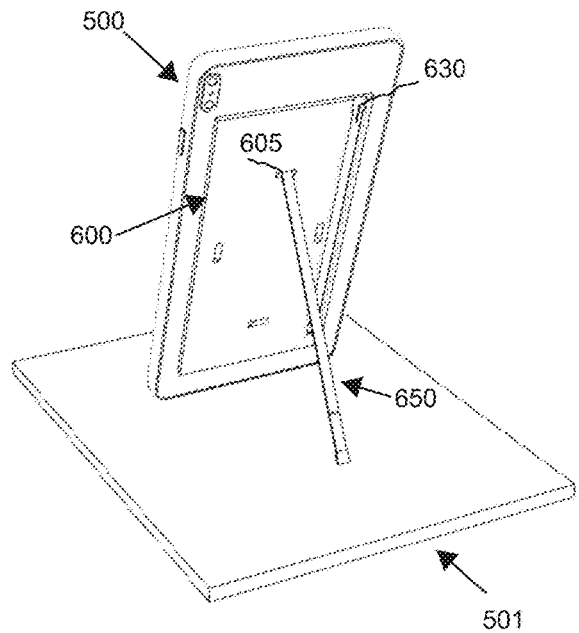
FIGS. 21 to 23 illustrate three-dimensional perspective views of the application of some of the exemplary back panels of FIGS. 15 to 20 to the back of a contemporary mobile phone to position that device to multiple angles and orientations with respect to a resting surface or base.
Figure 22:
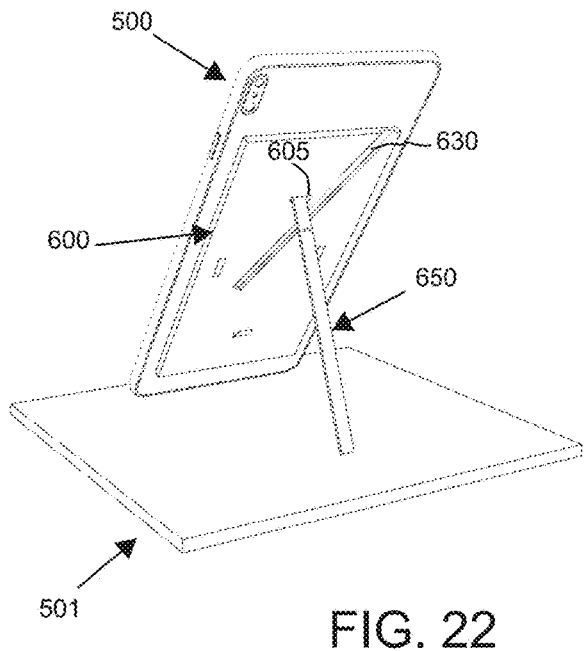
Figure 23:
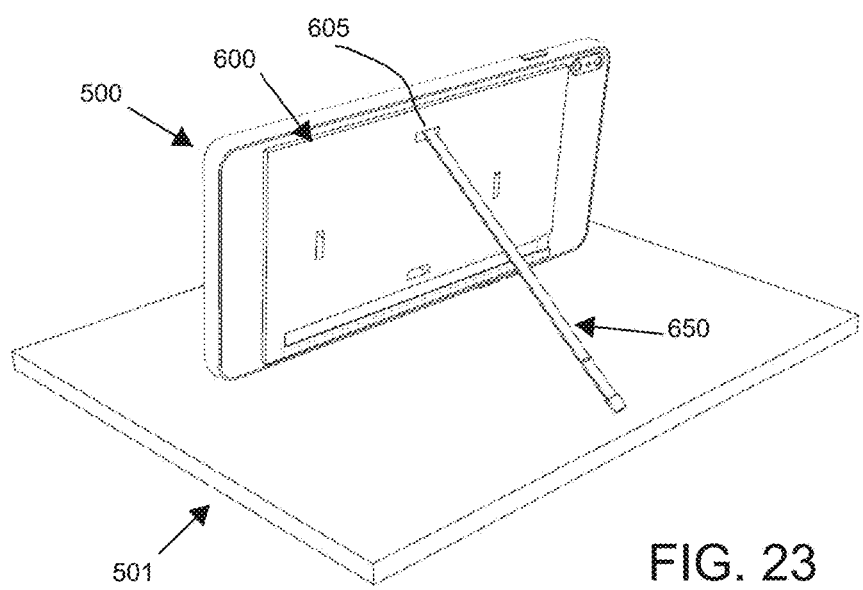

FIGS. 21, 22, and 23 illustrate the practical application of the non-limiting exemplary support panels 600 of FIGS. 15 through 20 to the back of an exemplary smart phone phone 500 to position that device to multiple angles and orientations with respect to a resting surface or base 501.

FIG. 21 illustrates a support panel 600 with a vertical open slot 630 used to prop an exemplary smart phone 500 to the portrait orientation.

FIG. 22 illustrates a support panel 600 with an angled open slot 630 used to prop an exemplary smart phone 500 to the portrait orientation.

FIG. 23 illustrates a support panel 600 used to prop an exemplary smart phone 500 to the landscape orientation.

FIGS. 24 to 32 illustrate three-dimensional perspective views of the implementation of the invention on smart phones wherein the mobile computing device comprises a cavity or slot for storing the support element at one side of the device.

Figure 24:
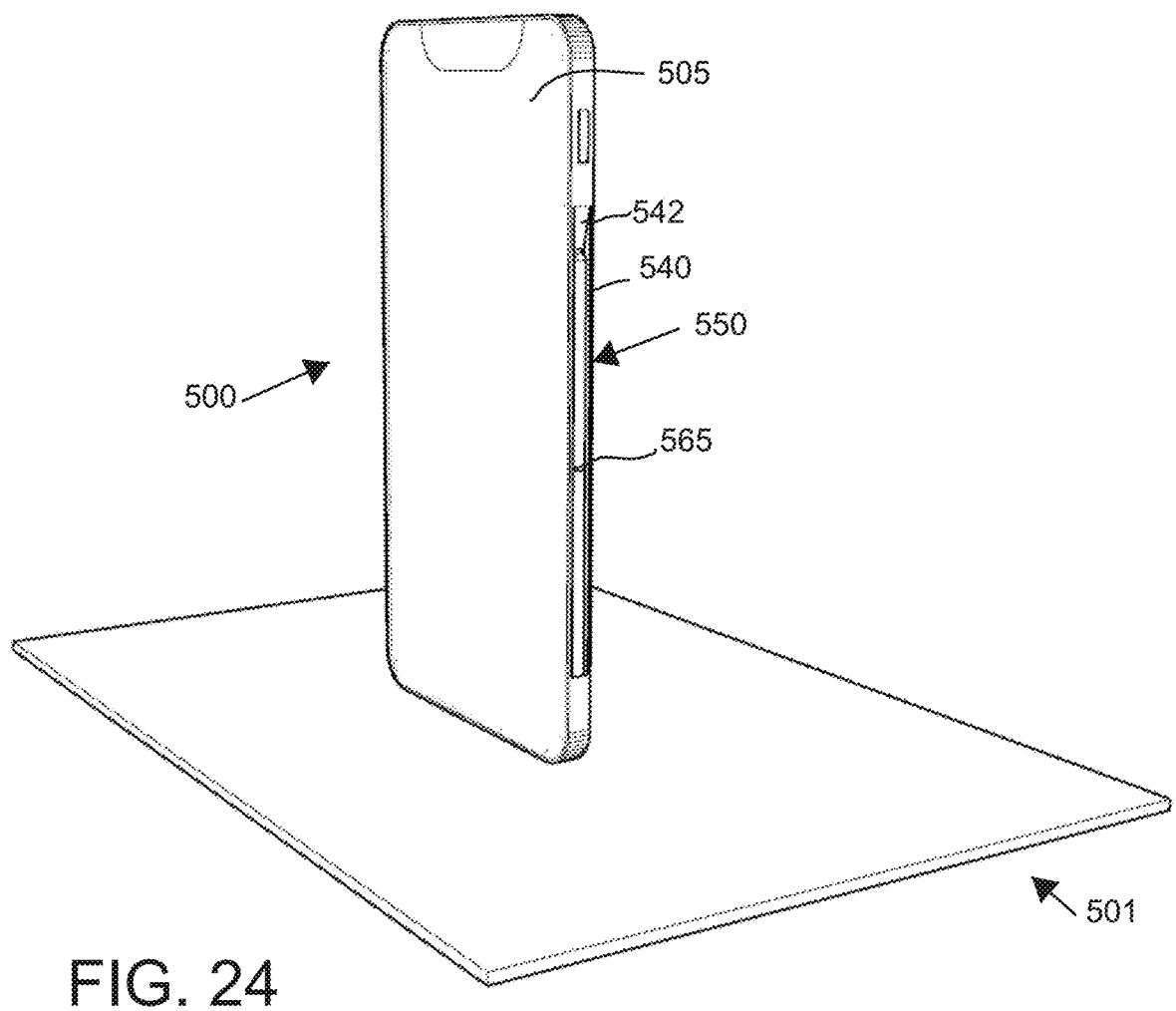
FIG. 24 illustrates a three-dimensional perspective view of the smart phone of FIGS. 13 and 14 with an electronic stylus stored at one side of the device.

FIG. 24 illustrates a three-dimensional perspective side view of the smart phone 500 of FIGS. 13 and 14 standing on a horizontal platform 501 with an electronic stylus 550 comprising a side notch 565 stored inside a longitudinal recess 540 at one side of smart phone 500. The side notch 565 is used to slide electronic stylus 550 along longitudinal recess 540 which ends with slanted wall 542 in order to quickly retrieve electronic stylus 550 from side recess 540 for use as stylus or as a support element when needed.

Figure 25:
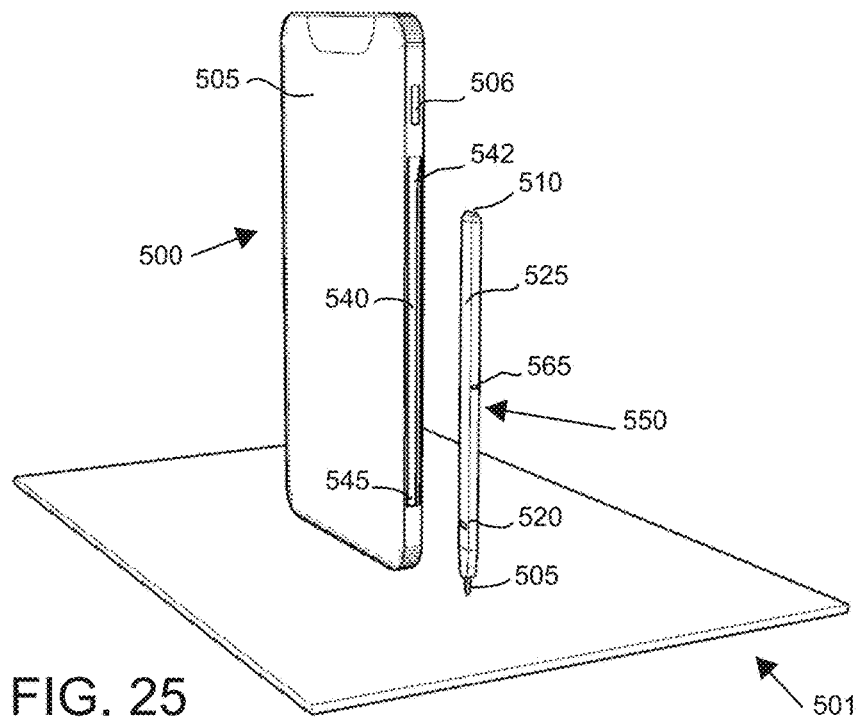
FIGS. 25 and 26 illustrate front and back three-dimensional perspective views of the smart phone of FIG. 24 with the electronic stylus pulled to the side of the device.

FIG. 25 illustrates a three-dimensional perspective front view of smart phone 500 with its electronic stylus 550 to the side. The figure illustrates longitudinal recess 540, that is used for the storage of electronic stylus 550; slanted wall 542, that is used to nudge electronic stylus 550 outward as it slides upward within the open recession; and bottom bore 545 that is used to envelop the lower part of electronic stylus 550 for sturdier support. FIG. 25 also illustrates a narrow ridge 510 at the top end of electronic stylus 550 that is used to insert and engage with corresponding notches or slits 551 to 562 on the back plate 508 of smart phone 500. Button 520 on shaft 525 of electronic stylus 550 can be programed to initiate specific software routines upon clicking, and tip 505 of electronic stylus 550 is used to draw on the electronic display 505 of smart phone 500.

Figure 26:
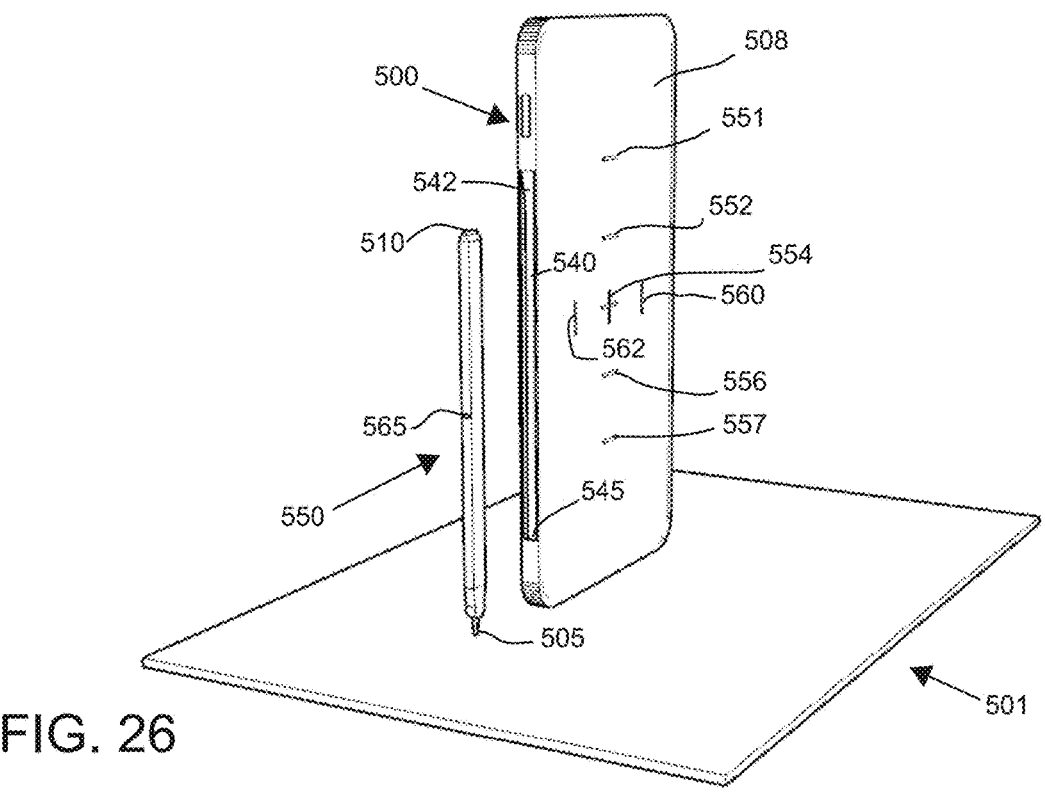

FIG. 26 illustrates a three-dimensional perspective back view of smart phone 500 with strategically located cavities, notches, or slits 551, 552, 554, 556, 557, 560 and 562 that are used to couple with corresponding narrow ridge 510 at the top of electronic stylus 550 to set smart phone 500 to multiple angles and orientations with respect to a resting surface or base 501.

Figure 27:
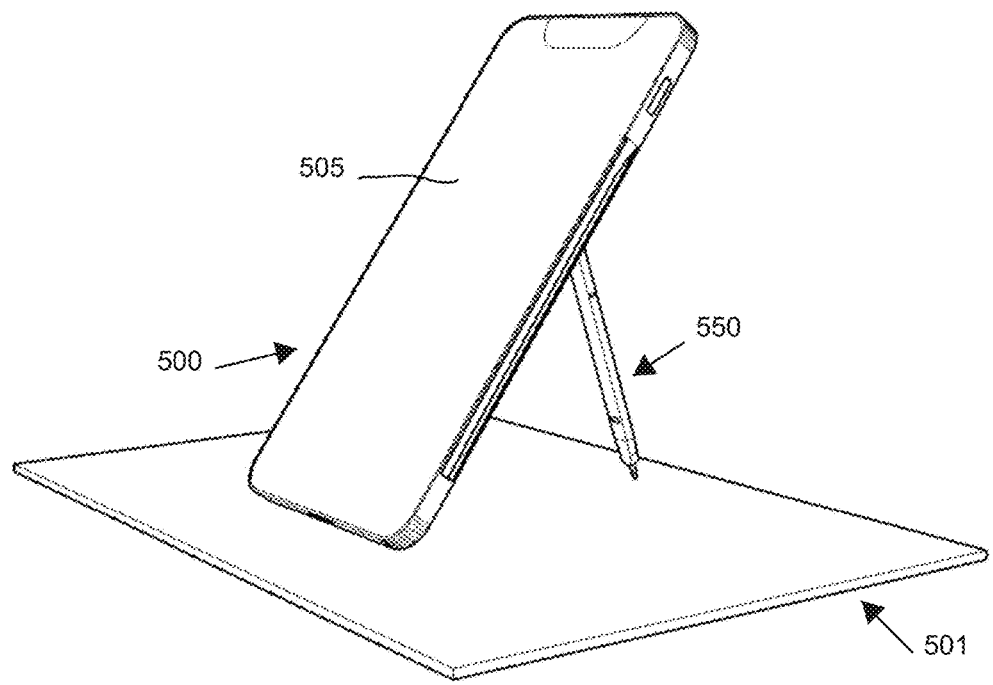
FIGS. 27 and 28 illustrate front and back three-dimensional perspective views of the smart phone of FIG. 24 with the electronic stylus propping the device to a specific angle in the portrait orientation, with respect to a resting surface or base.

FIG. 27 illustrates a three-dimensional perspective front view of smart phone 500 propped up to a specific angle and orientation by electronic stylus 550.

Figure 28:
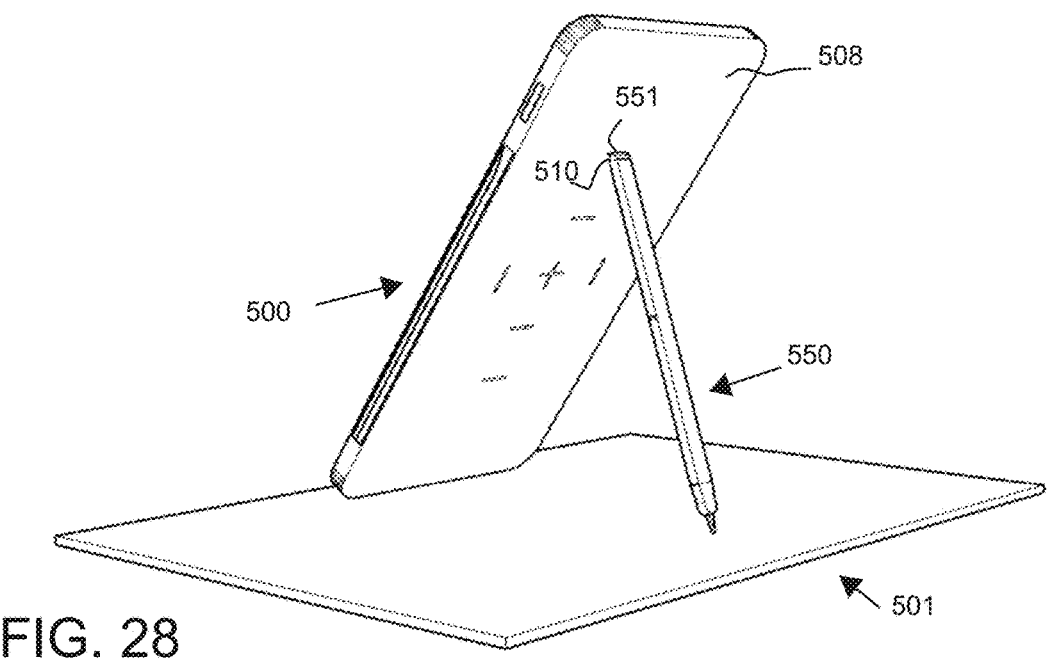

FIG. 28 illustrates a three-dimensional perspective back view of how smart phone 500 can be propped up to a specific angle and orientation through the insertion of narrow ridge 510 of electronic stylus 550 into matching cavity 551 located on the back plate 508 of smart phone 500.

Figure 29:
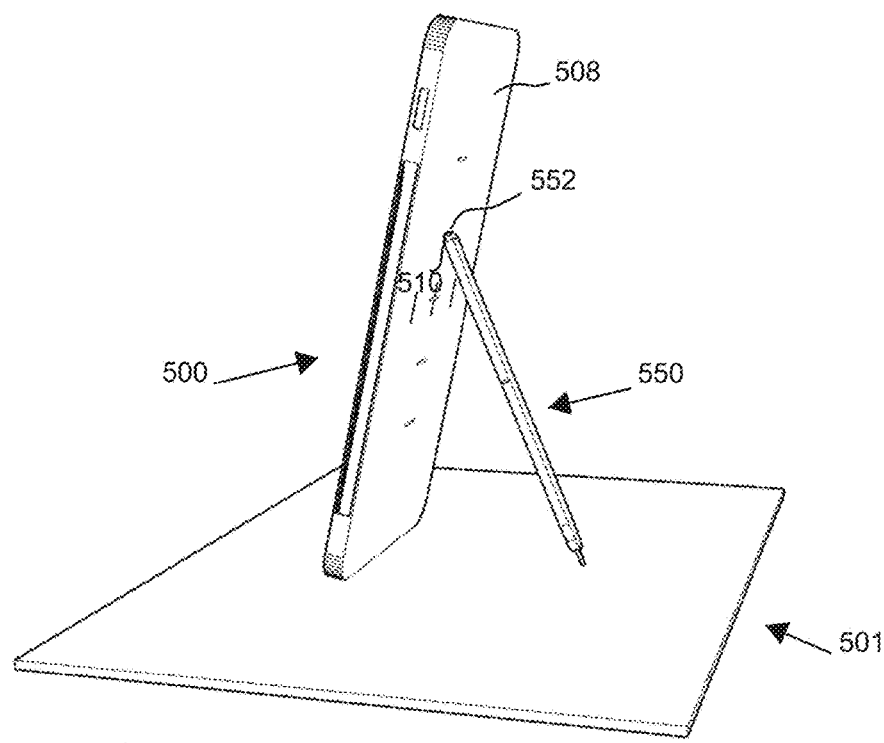
FIGS. 29 and 30 illustrate three-dimensional perspective views of the smart phone of FIG. 24 with the electronic stylus propping the device to alternative angles in the portrait orientation, with respect to a resting surface or base.
Figure 30:
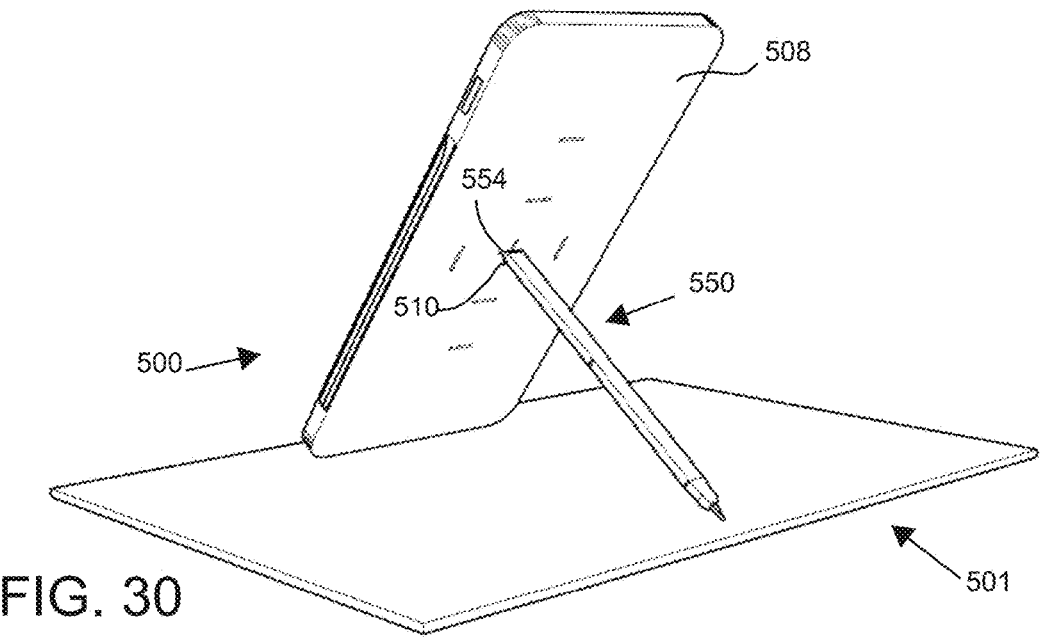

FIGS. 29 and 30 illustrate three-dimensional perspective back views of smart phone 500 being propped up by electronic stylus 550 into alternative angles in the portrait orientation by inserting narrow ridge 510 of electronic stylus 550 into alternative slits 552 and 554 located on the back plate 508 of smart phone 500.

Figure 31:
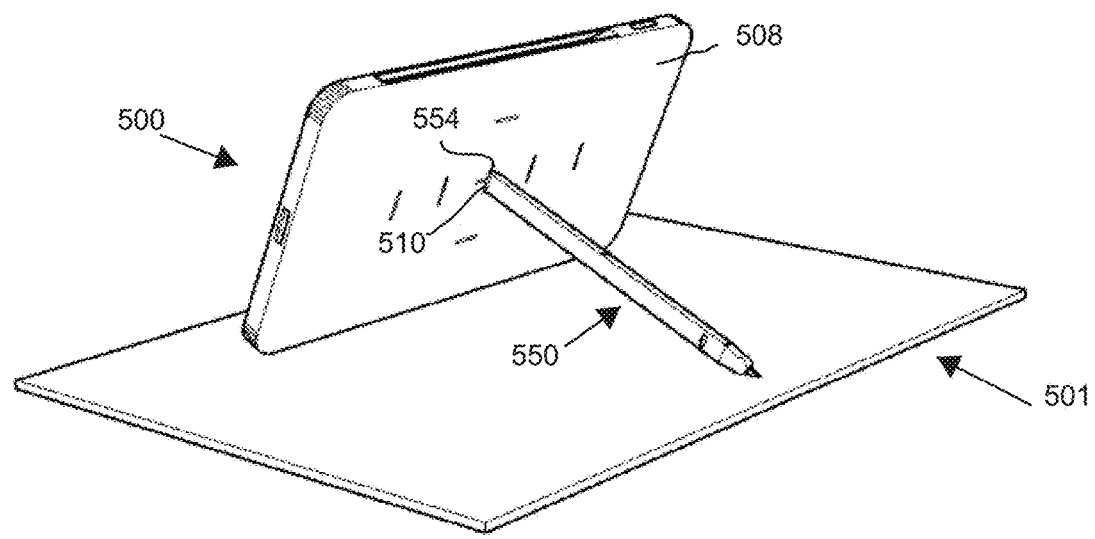
FIGS. 31 and 32 illustrate front and back three-dimensional perspective views of the smart phone of FIG. 24 with the electronic stylus propping the device to a specific angle in the landscape orientation, with respect to a resting surface or base.
Figure 32:
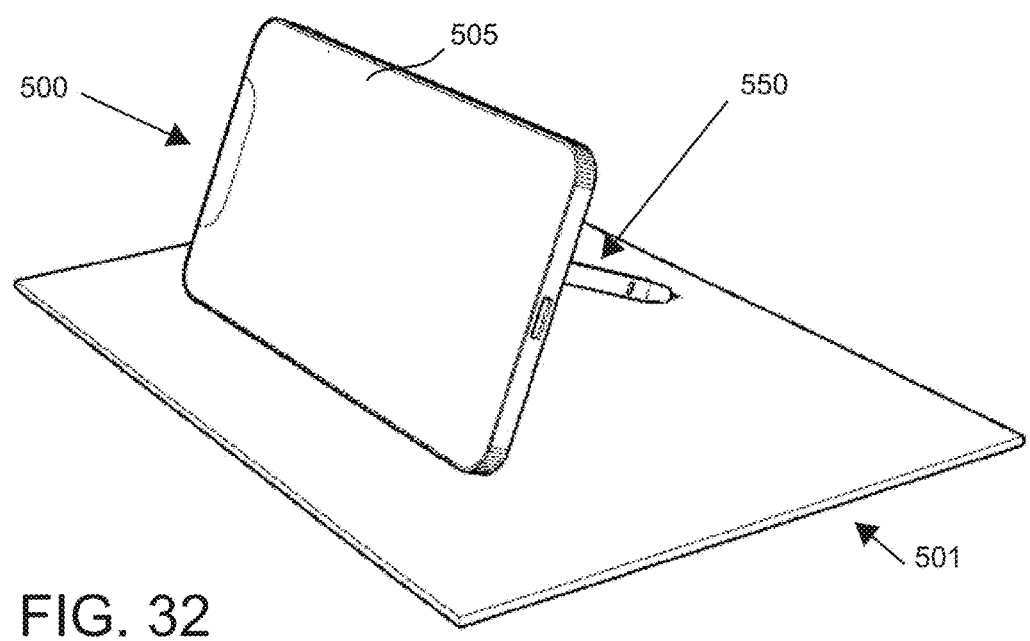

FIGS. 31 and 32 illustrate front and back three-dimensional perspective views of how electronic stylus 550 can prop smart phone 500 to a specific angle in the landscape orientation by inserting narrow ridge 510 of electronic stylus 550 into slit 554 located on back plate 508 of smart phone 500.

FIGS. 33 to 58 illustrate three-dimensional perspective views of the implementation of the invention on smart phones wherein the mobile computing device is encased in a protective case that comprise a longitudinal recess or slit at one side of the protective case, or alternatively, on the back panel of the protective case for storing the support element.

Figure 33:
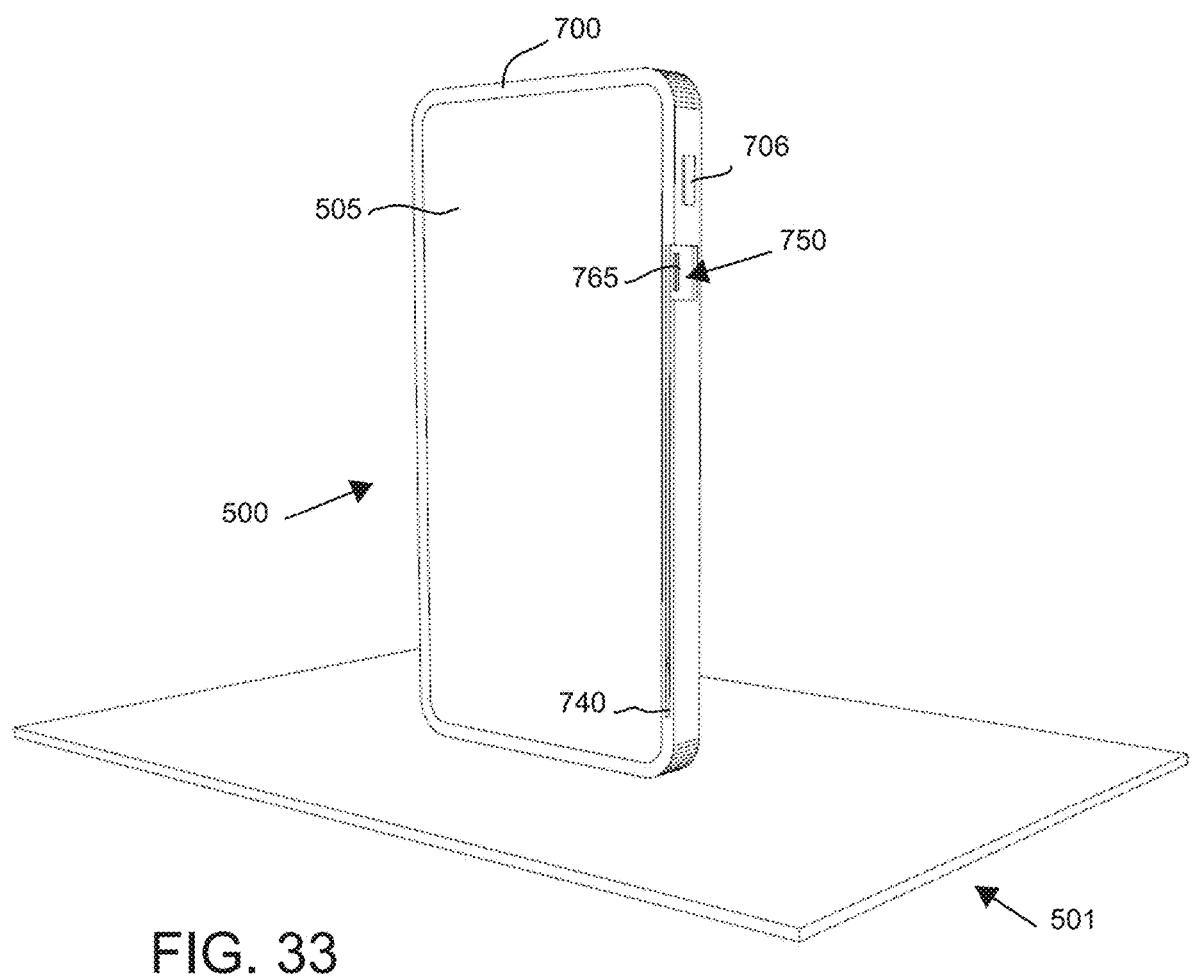
FIG. 33 illustrates a three-dimensional perspective view of the non-limiting exemplary smart phone of FIGS. 13 and 14 encased in a protective case with a flat support element stored within a slit at one side of the protective case.

FIG. 33 illustrates a three-dimensional perspective view of a smart phone 500 enclosed in a protective case 700 with a flat support element 750 that comprises a side notch 765 stored inside longitudinal recess or slit 740 at one side of protective case 700. Side notch 765 is used to slide support element 750 out of longitudinal recess or slit 740.

Figure 34:
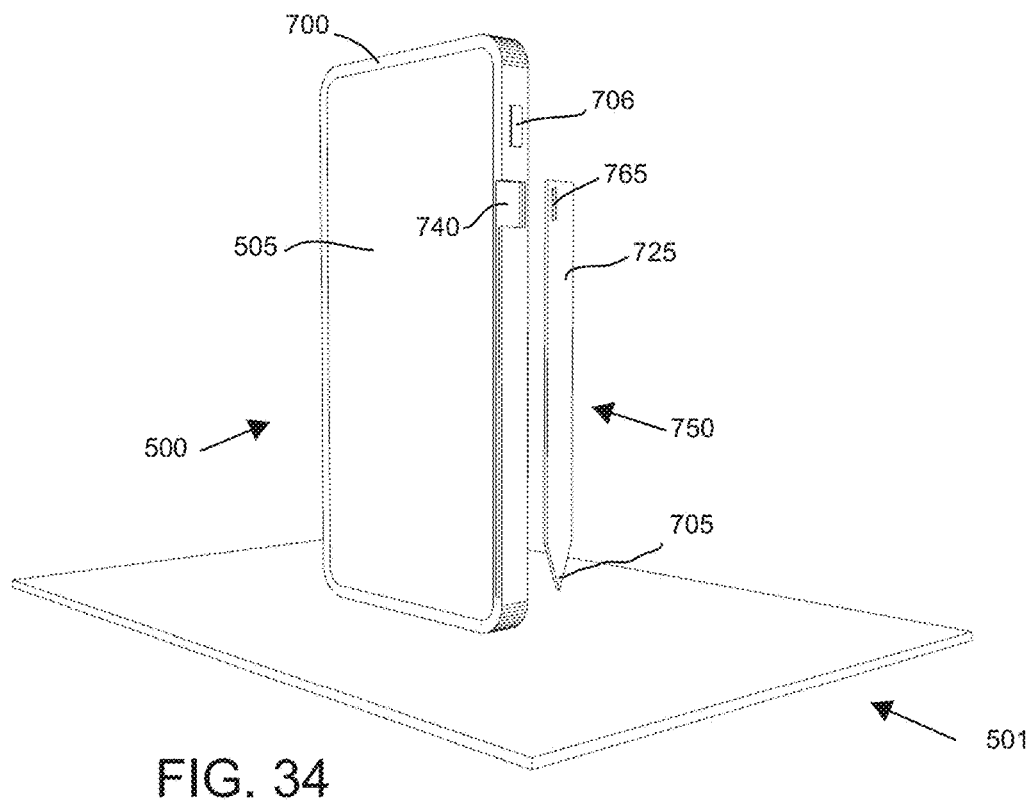
FIGS. 34 and 35 illustrate front and back three-dimensional perspective views of the encased smart phone of FIG. 33 with the flat support element pulled to the side of the device.

FIG. 34 illustrates a three-dimensional perspective front view of smart phone 500 in protective case 700 with its electronic stylus or support element 750 to the side. Support element 750 may double as an electronic stylus if the shaft 725 and tip 705 are made of conductive material than can interact with display panel 505.

Figure 35:
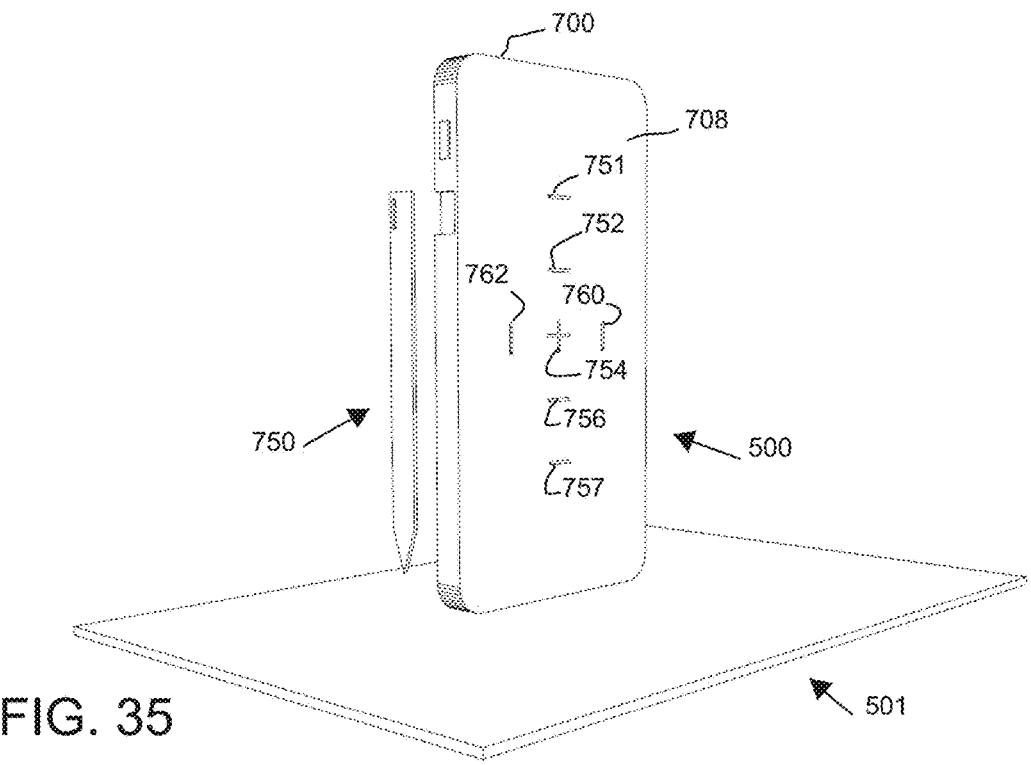

FIG. 35 illustrates a three-dimensional perspective back view of smart phone 500 in protective case 700 with strategically located cavities, notches, or slits 751, 752, 754, 756, 757, 760 and 762 that are used to couple with the top end of support element 750 to set smart phone 500 to multiple angles and orientations with respect to a resting surface or base 501.

Figure 36:
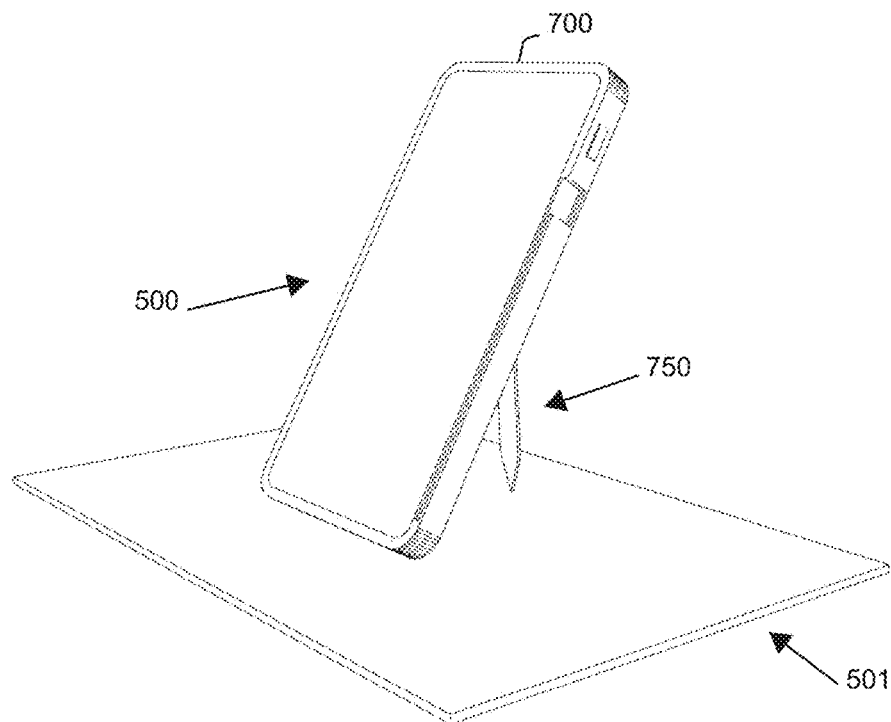
FIGS. 36 and 37 illustrate front and back three-dimensional perspective views of the encased smart phone of FIG. 33 with the flat support element propping the device to a specific angle in the portrait orientation, with respect to a resting surface or base.

FIG. 36 illustrates a three-dimensional perspective front view of smart phone 500 in protective case 700 propped up to a specific angle in the portrait orientation by support element 750.

Figure 37:
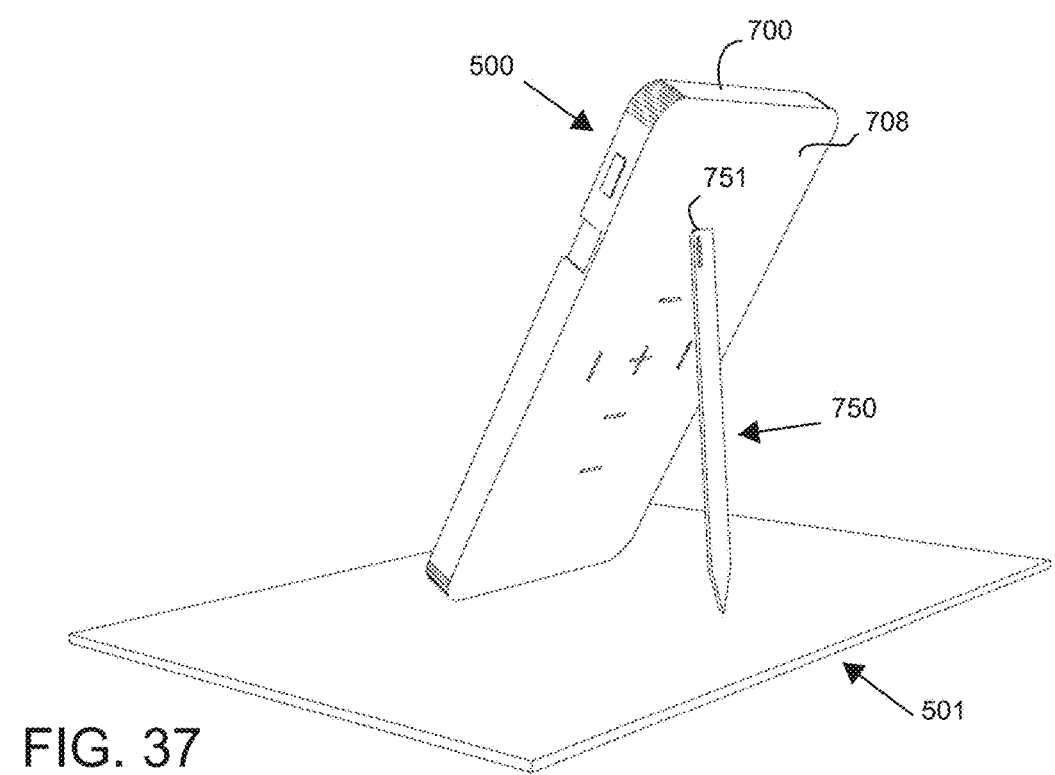

FIG. 37 illustrates a three-dimensional perspective back view of how smart phone 500 in protective case 700 can be propped up to a specific angle in the portrait orientation through the insertion of the top end of support element 750 into matching slit 751 located on back plate 708 of protective cover 700.

Figure 38:
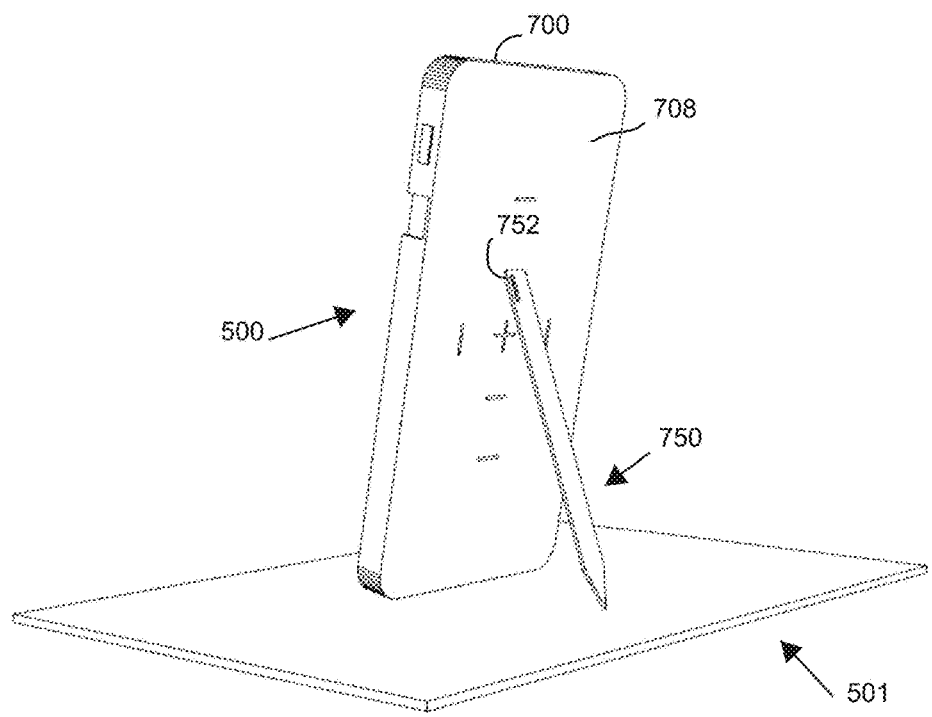
FIGS. 38 and 39 illustrate three-dimensional perspective views of the encased smart phone of FIG. 33 with the flat support element propping the device to alternative angles in the portrait orientation, with respect to a resting surface or base.
Figure 39:
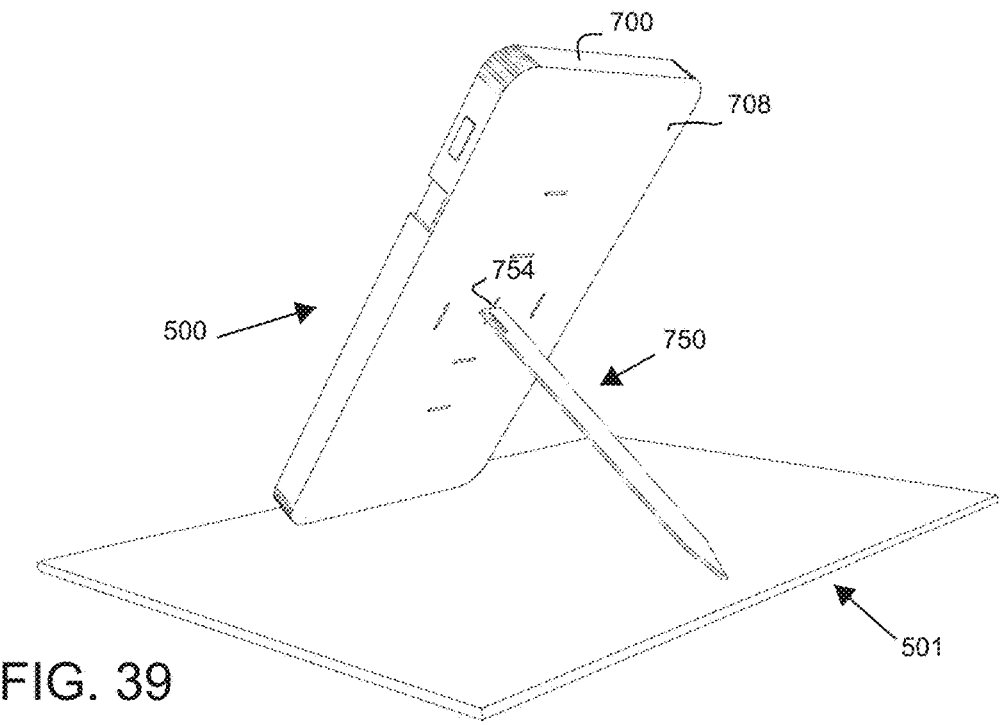

FIGS. 38 and 39 illustrate three-dimensional perspective back views of smart phone 500 in protective case 700 being propped up by support element 750 into alternative angles in the portrait orientation by inserting the top end of support element 750 into alternative slits 752 and 754 located on back plate 708 of protective cover 700.

Figure 40:
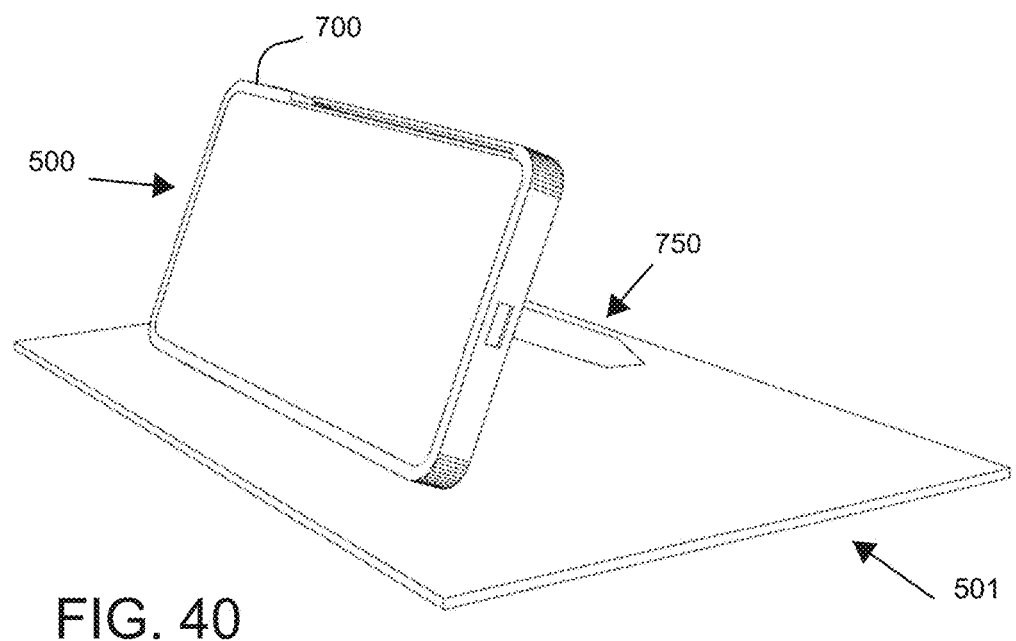
FIGS. 40 and 41 illustrate front and back three-dimensional perspective views of the encased smart phone of FIG. 33 with the flat support element propping the device to a specific angle in the landscape orientation, with respect to a resting surface or base.
Figure 41:
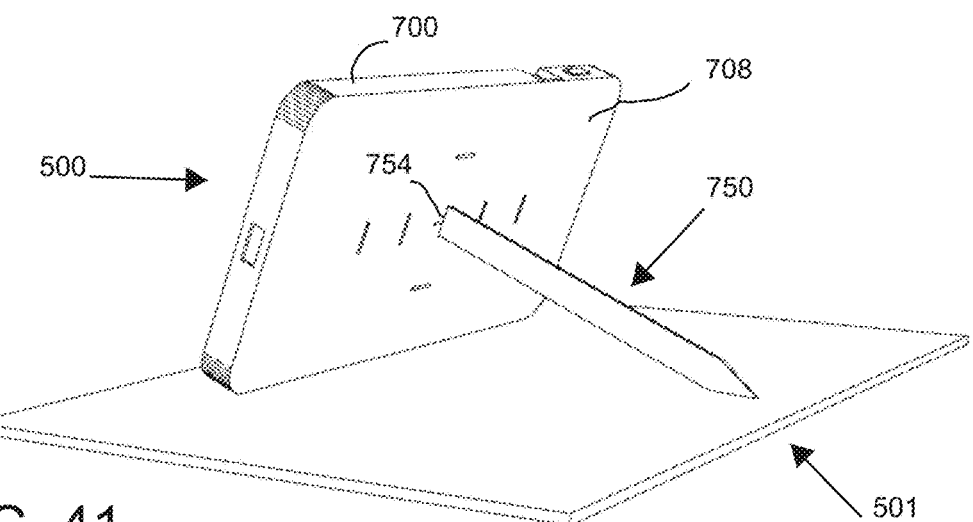

FIGS. 40 and 41 illustrate front and back three-dimensional perspective views of how support element 750 can prop smart phone 500 in protective case 700 to a specific angle in the landscape orientation by inserting the top end of support element 750 into slit 754 located on back plate 708 of protective cover 700.

Figure 42:
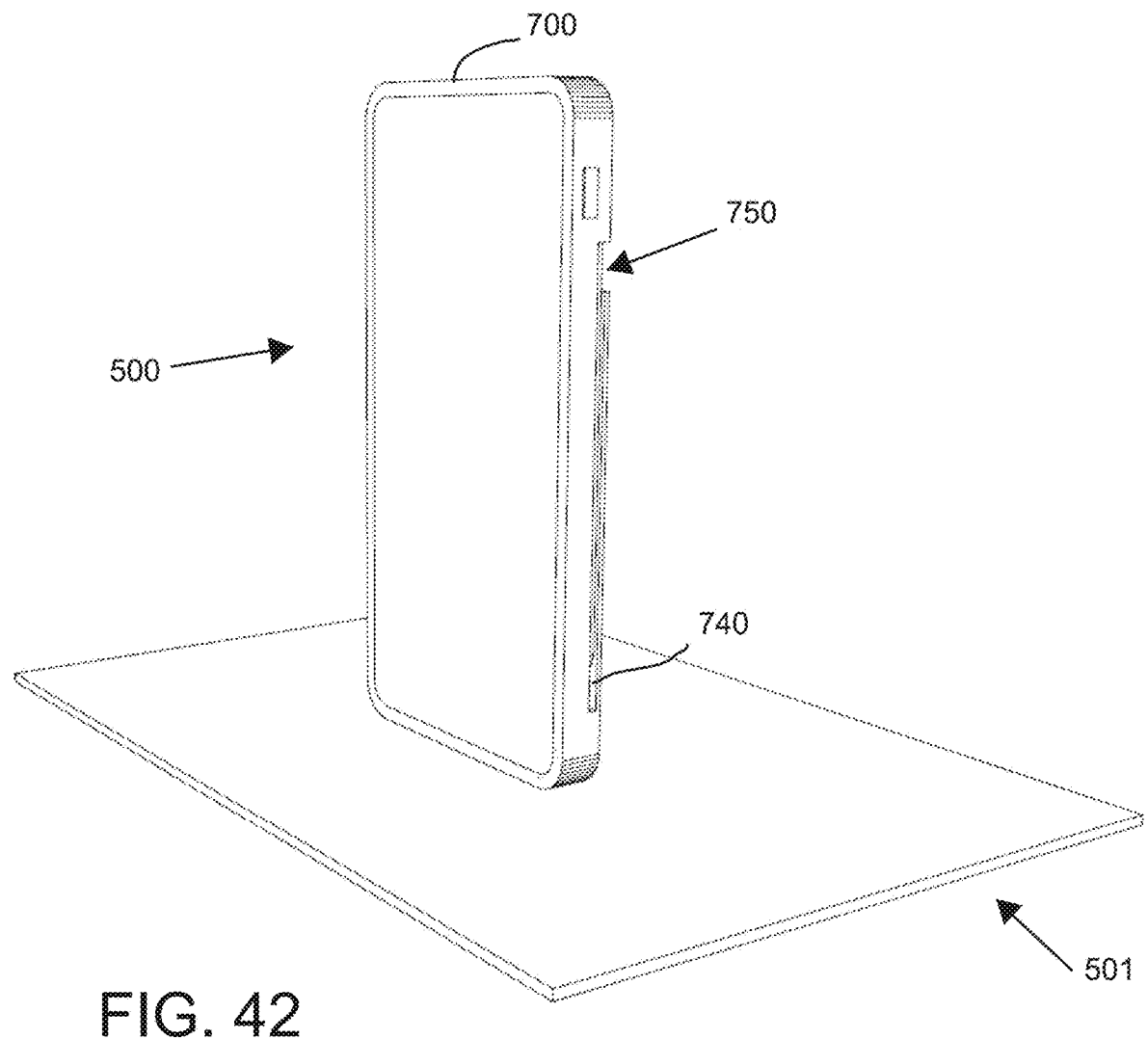
FIG. 42 illustrates a three-dimensional perspective view of the smart phone of FIGS. 13 and 14 encased in a protective case with a flat support element stored within a slit in the back panel of the protective case.

FIG. 42 illustrates a three-dimensional perspective view of the smart phone 500 in protective case 700 with flat support element 750 stored within slit 740 located in the back panel 708 of protective case 700.

Figure 43:
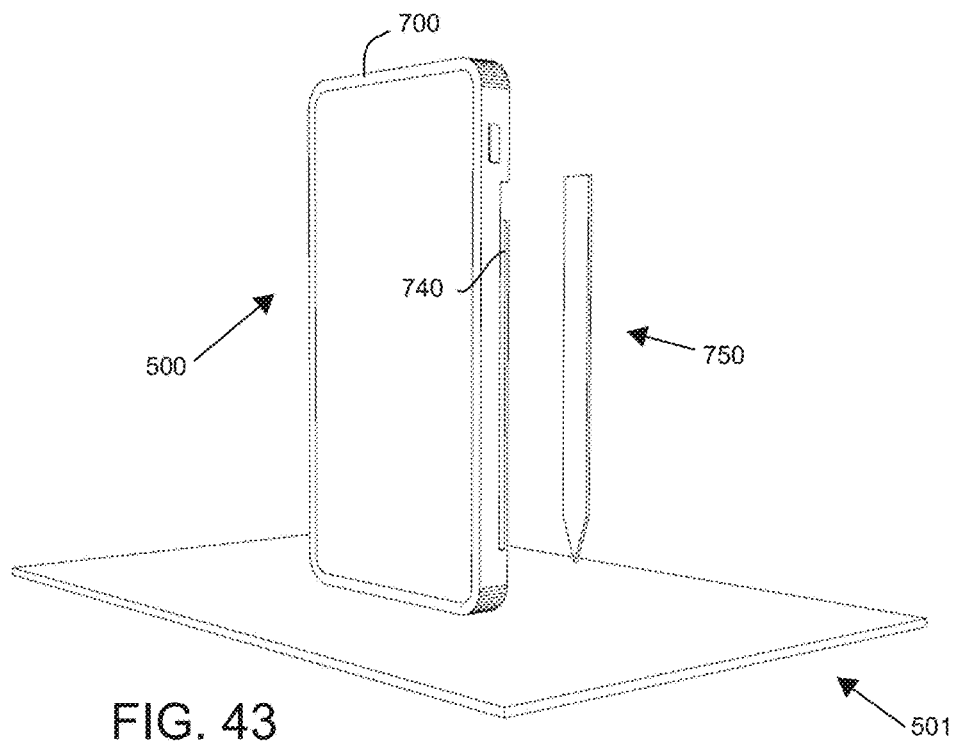
FIGS. 43 and 44 illustrate front and back three-dimensional perspective views of the encased smart phone of FIG. 42 with the flat support element pulled to the side of the device.
Figure 44:
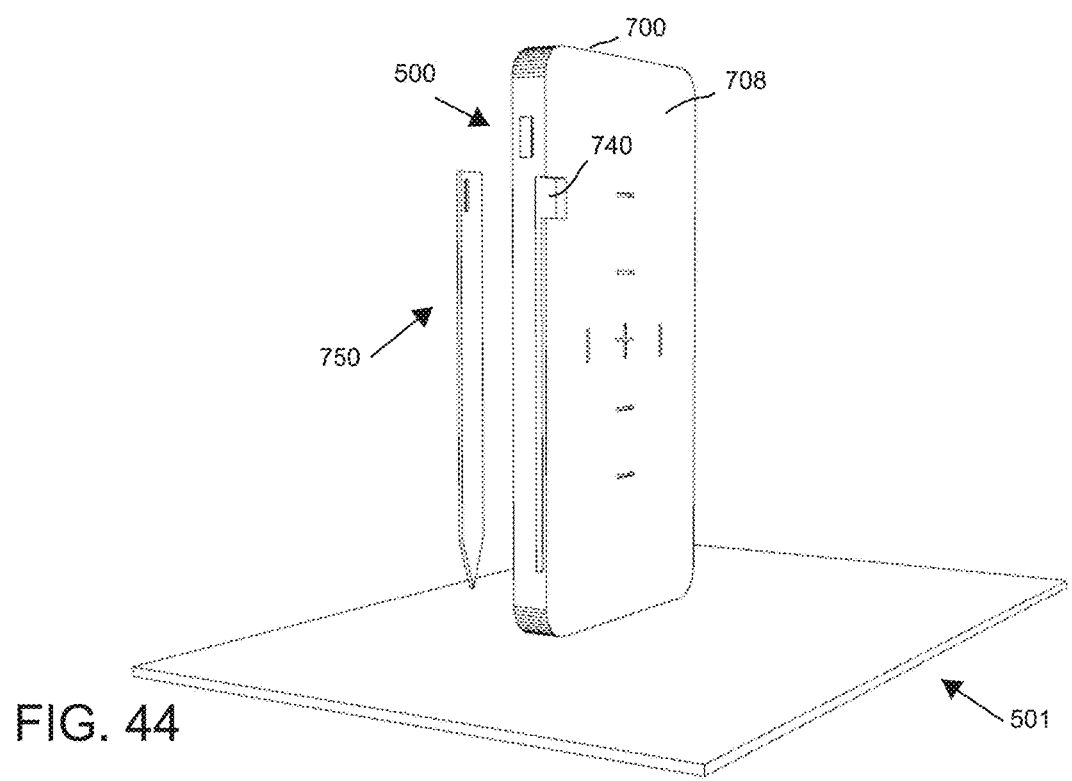

FIGS. 43 and 44 illustrate front and back three-dimensional perspective front views of smart phone 500 in protective case 700 with its electronic stylus or support element 750 to the side and longitudinal recess, or slit, 740 that houses its electronic stylus or support element located in the back panel 708 of protective case 700 rather than in one of its longitudinal sides.

Figure 45:
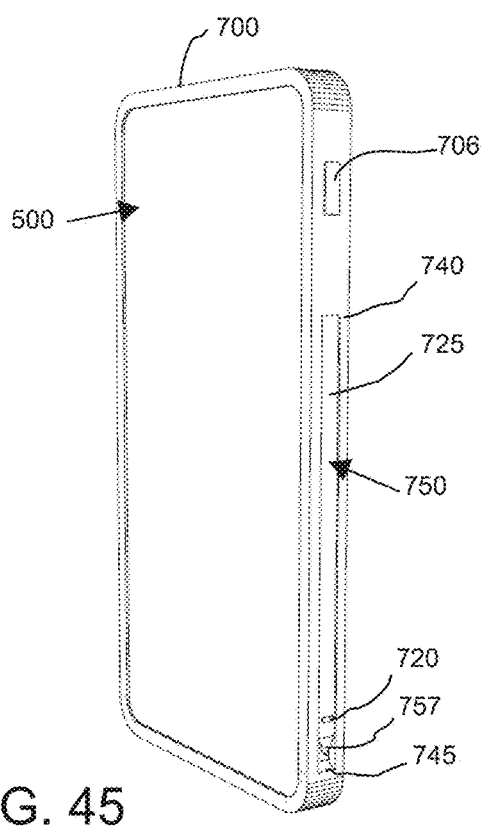
FIGS. 45 and 46 illustrate three-dimensional perspective views of the front and back sides of the exemplary non-limiting smart phone of FIGS. 13 and 14 encased in a protective case with a stylus and a support element stored or either side of the case.
Figure 46:
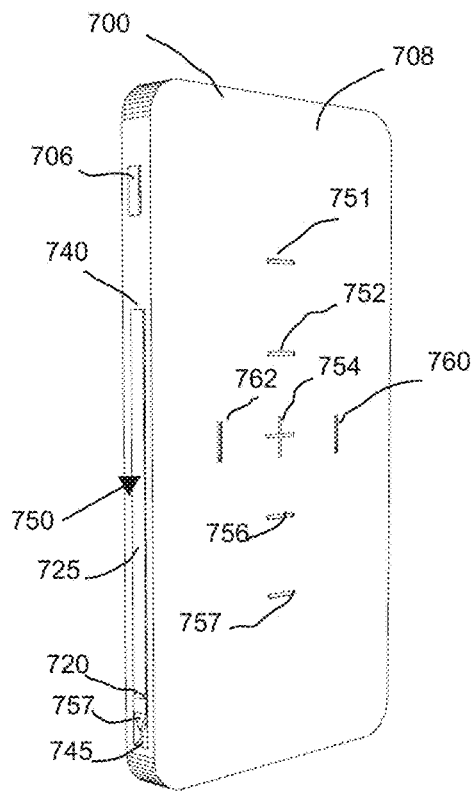

FIGS. 45 and 46 illustrate the front and back sides of yet another exemplary phone case with a stylus and a support element stored or either side of the case.

FIG. 45 to FIG. 48 illustrate three-dimensional perspective side views of a non-limiting exemplary smart phone 500 encased in a non-limiting exemplary protective case 700. Exemplary case 700 has a power button 706 and two longitudinal slots 740 and 780 on either side of the exemplary smart phone case 700. Each of longitudinal slots 740 and 780 has a curved lower end; 745 and 785 respectively, and house support elements/styluses 750 and 790. Support elements/styluses 750 and 790 may be housed in their respective vertical slots; 740 and 780 by latching magnetically into the slots. Support element/stylus 750 has a stem 725, a notch 720 for sliding support element 750 out of slot 740, and a pointed head 757 for writing on the screen. Support element 790 has a stem 799, a notch 795 for sliding support element 790 out of slot 780, and a flat head 797. Notches 720 and 795 are used to push support elements/styluses 750 and 790 down along longitudinal recesses 740 and 780 which lead to curved corners 745 and 785 which slide support elements/styluses 750 and 790 out of their respective slots.

FIG. 46 illustrates a three-dimensional perspective view of the back side 708 of exemplary protective case 700. Angled cavities or slits 751, 752, 754, 756, 757, 760, and 762 are positioned strategically on the back of exemplary phone case 700 to enable support elements/styluses 750 and 790 to attach to exemplary phone case 700 and to position case 700, and encased exemplary smart phone 500, to various angles and orientations with respect to a resting surface or base. This is accomplished by manually keying one end of support elements/styluses 750 and 790 into individual cavities or slits, 751, 752, 754, 756, 757, 760, and 762 and placing the other end of the support elements/styluses on a resting surface or base. Each individual angled cavity or slit 751, 752, 754, 756, 757, 760, and 762 enables support elements/styluses 750 and 790 to position exemplary phone case 700 to a different specific angle and orientation with respect to a resting surface or base.

Figure 47:
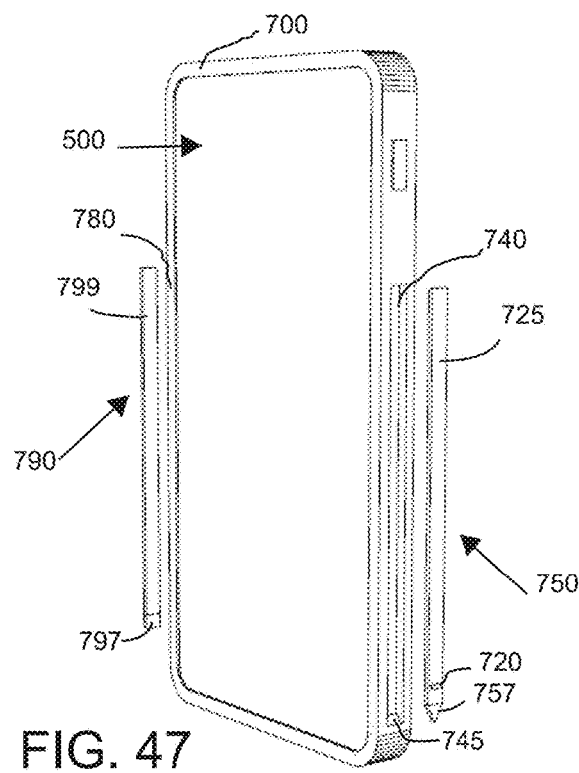
FIGS. 47 and 48 illustrate three-dimensional perspective views of the front and back sides of the encased smart phone of FIGS. 45 and 46 with a stylus and a support element outside of either side of the case.
Figure 48:
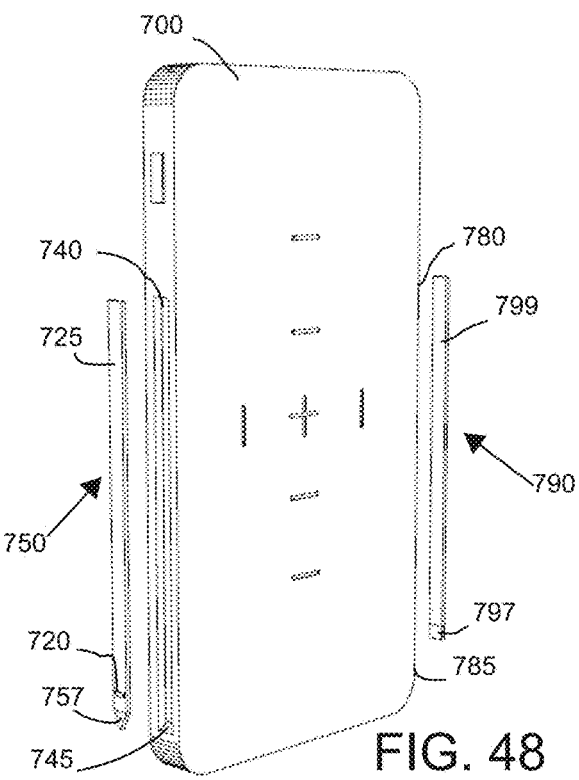

FIGS. 47 and 48 illustrate three-dimensional perspective views of the front and back sides of exemplary smart phone case 700 with support elements/styluses 750 and 790 located outside of either side of protective case 700.

Figure 49:
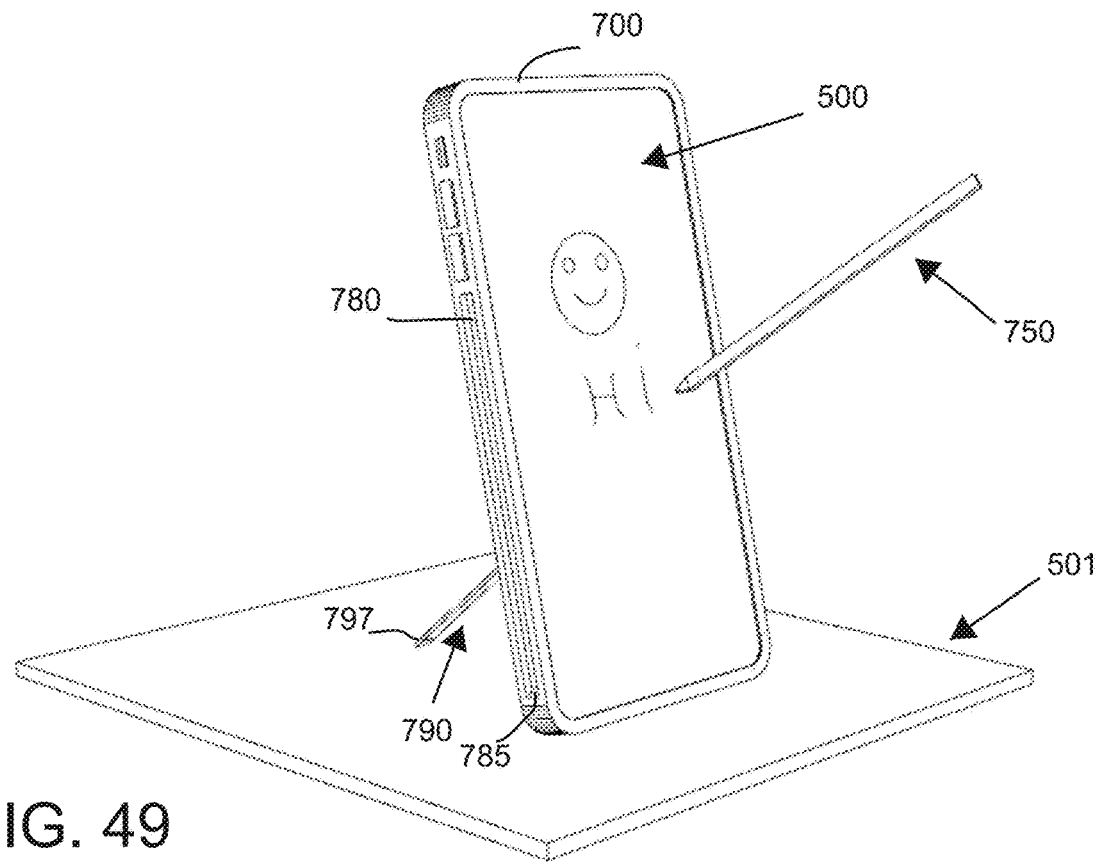
FIGS. 49 and 50 illustrate three-dimensional perspective views of the front and back sides of the encased smart phone of FIGS. 45 and 46 with the support element deployed to prop the device to a specific angle in the portrait orientation.
Figure 50:
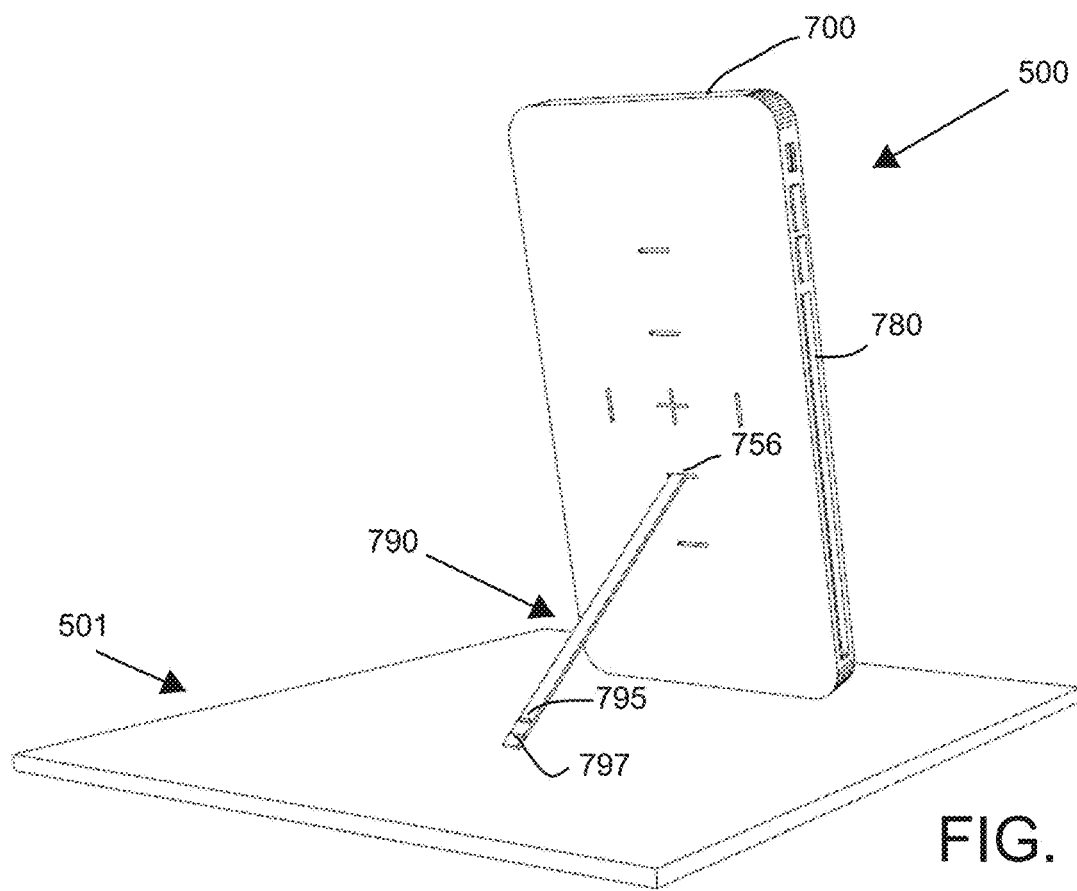

FIGS. 49 and 50 illustrate three-dimensional perspective views of the front and back sides of exemplary phone case 700 with its support element/stylus 790 inserted into angled slit 756 of protective phone case 700 to prop exemplary smart phone 500 to a specific angle in the portrait orientation.

Figure 51:
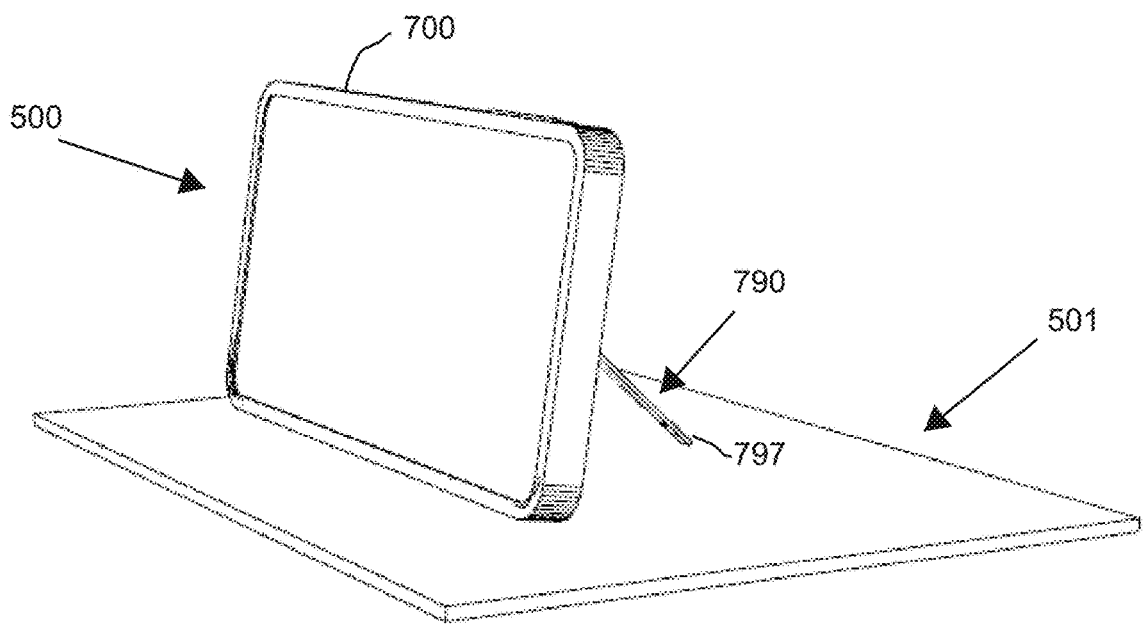
FIGS. 51 and 52 illustrate three-dimensional perspective views of the front and back sides of the encased smart phone of FIGS. 45 and 46 with the support element deployed to prop the device to a specific angle in the landscape orientation.
Figure 52:
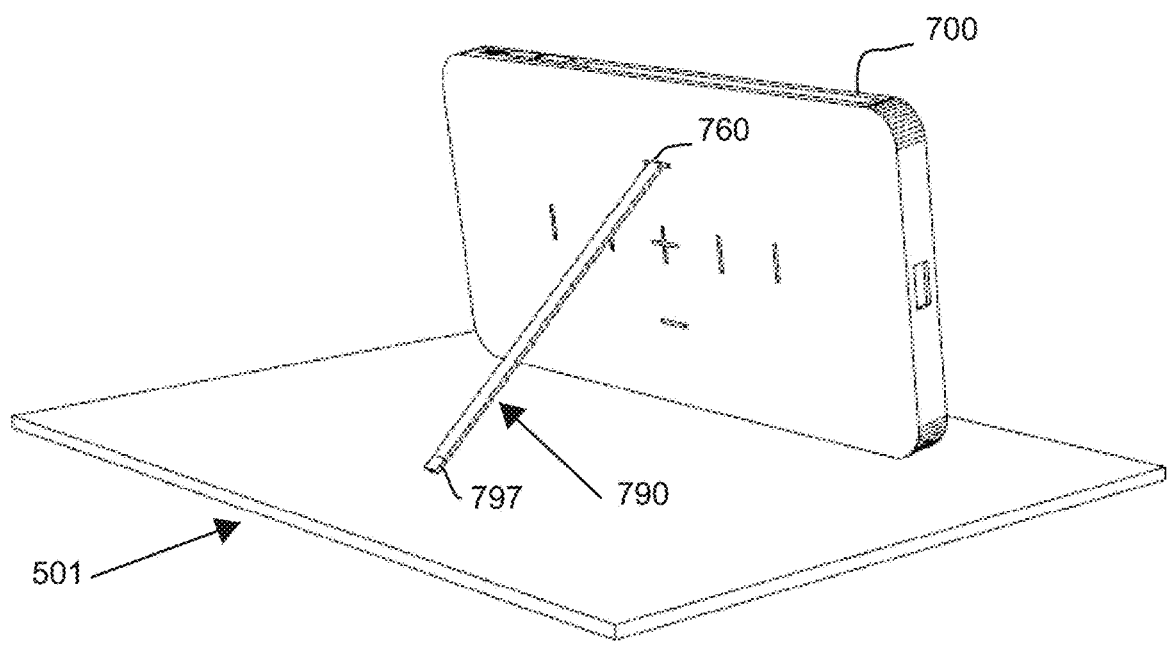

FIGS. 51 and 52 illustrate three-dimensional perspective views of the front and back sides of exemplary phone case 700 with its support element/stylus 790 inserted into angled slit 760 of protective phone case 700 to prop exemplary smart phone 500 to a specific angle in the landscape orientation.

Figure 53:
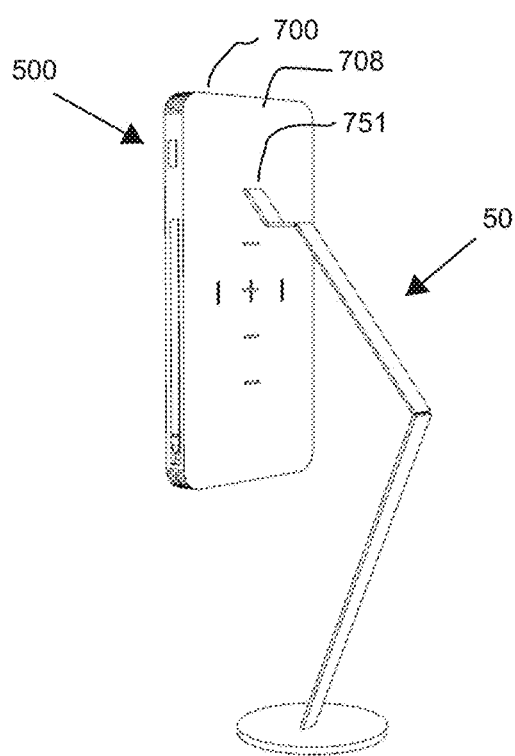
FIGS. 53 and 54 illustrate three-dimensional perspective views of the front and back sides of the encased smart phone of FIGS. 45 and 46 encased in a protective case and suspended from an exemplary desktop stand in the portrait orientation.
Figure 54:
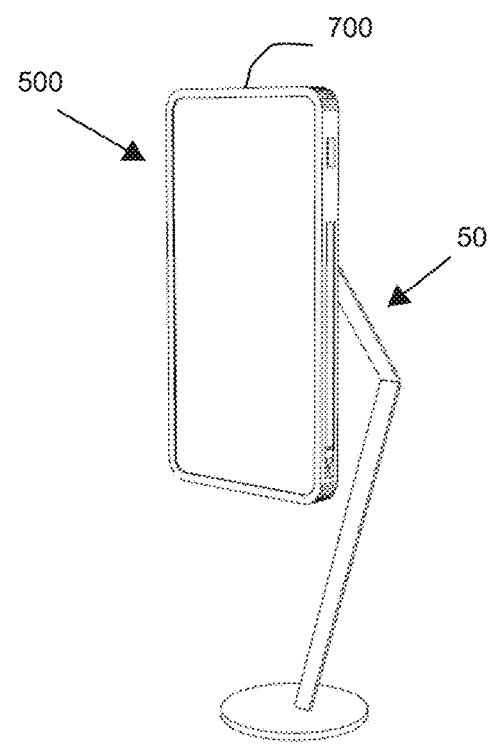

FIGS. 53 and 54 illustrate three-dimensional perspective views of the front and back sides of exemplary smart phone 500 encased in protective case 700 and suspended from an exemplary desktop stand 50 in the portrait orientation by inserting an end of exemplary desktop stand 50 into angled slit 751 in the back plate 708 of protective case 700.

Figure 55:
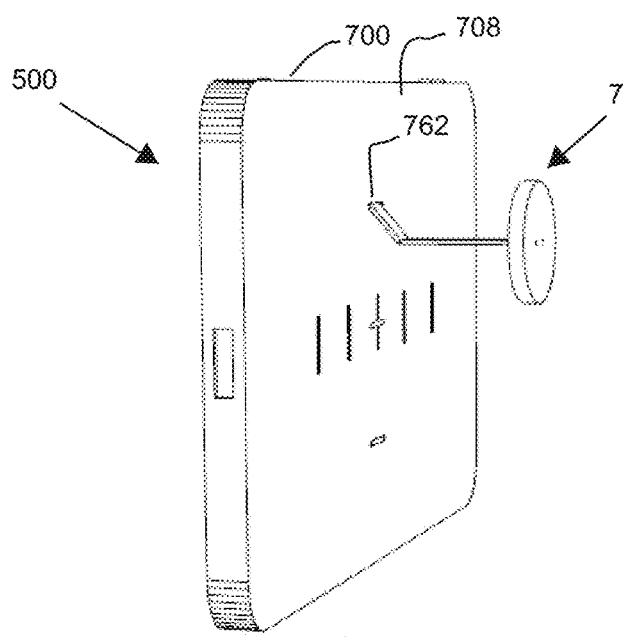
FIGS. 55 and 56 illustrate three-dimensional perspective views of the front and back sides of the encased smart phone of FIGS. 45 and 46 encased in a protective case and suspended from a wall hook in the landscape orientation.
Figure 56:
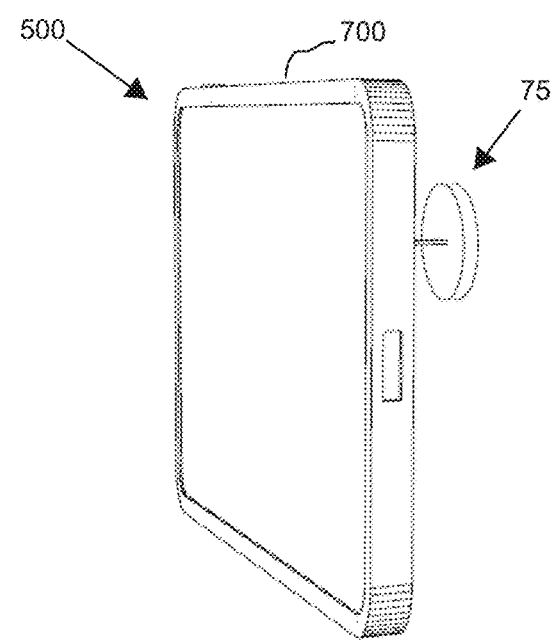

FIGS. 55 and 56 illustrate three-dimensional perspective views of the front and back sides of exemplary smart phone 500 encased in a protective case 700 and suspended from an exemplary wall hook 75 in the landscape orientation by inserting an end of exemplary hook 75 into angled slit 762 in the back plate 708 of protective case 700.

Figure 57:
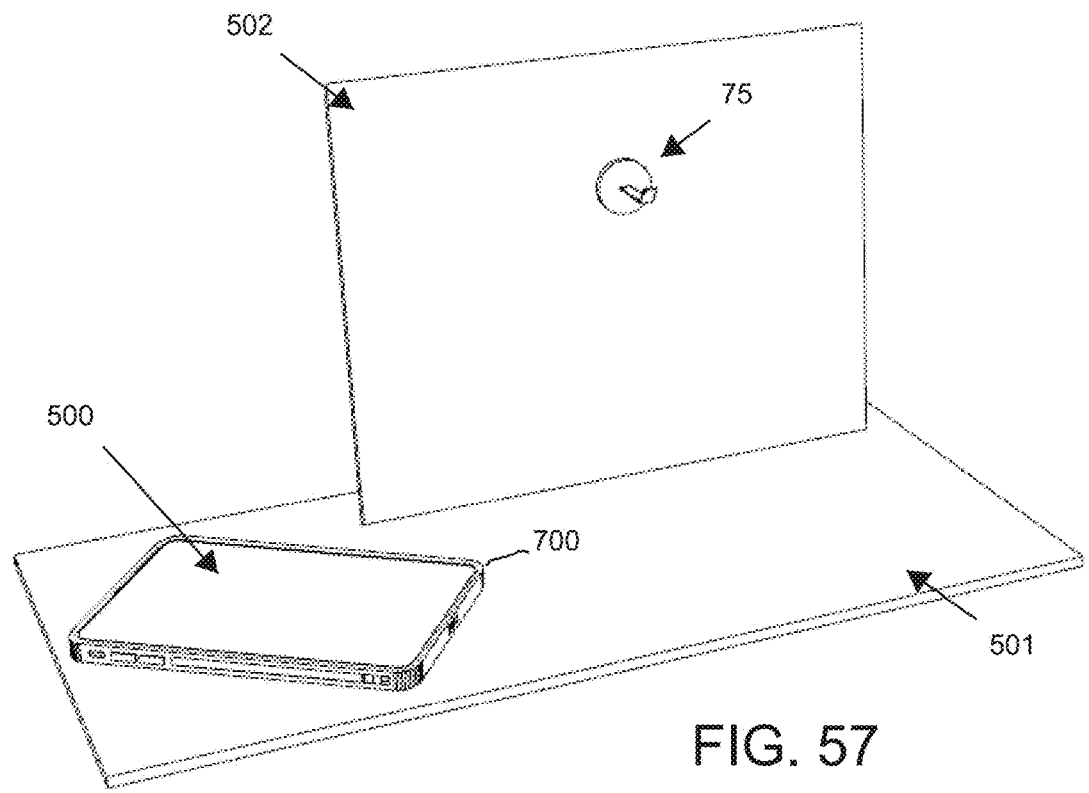
FIG. 57 illustrates a three-dimensional perspective view of the encased smart phone of FIGS. 45 and 46 laying on a flat surface in front of a wall with a hook positioned at the center of the wall.

FIG. 57 illustrates a three-dimensional perspective view of a smart phone 500 encased in an exemplary protective phone case 700 laying on a flat surface 501 in front of a wall 502 with a hook 75 positioned at the center of the wall.

Figure 58:
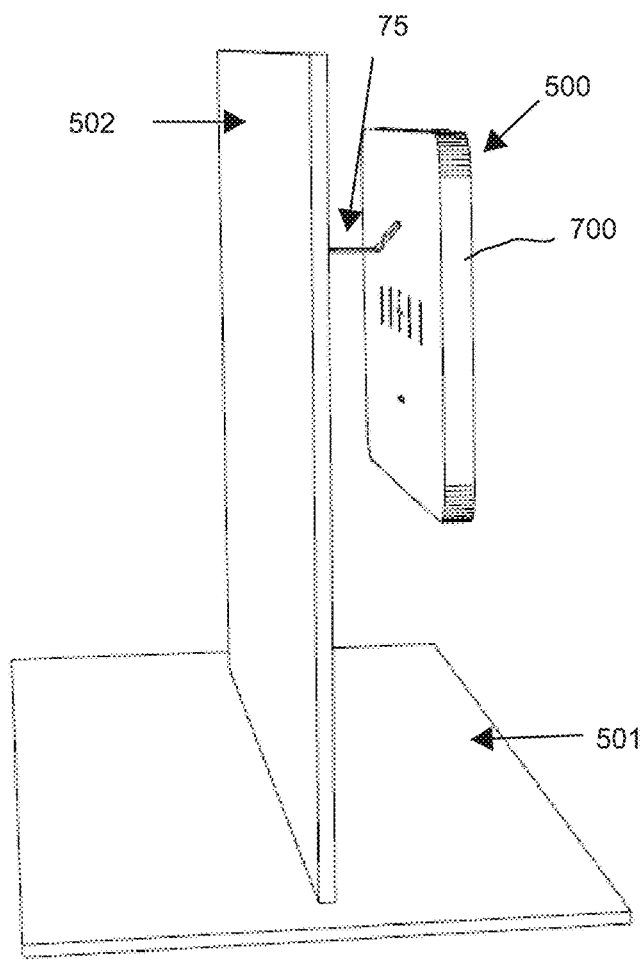
FIG. 58 illustrates a three-dimensional perspective view of the encased smart phone of FIGS. 45 and 46 suspended from the hook on the wall.

FIG. 58 illustrates a three-dimensional perspective view of the exemplary smart phone 500 of FIG. 57 suspended from wall hook 75. The wall hook is a non-limiting exemplary embodiment of the versatility of the disclosed invention because it enables mobile computing devices to be suspended from virtually any flat vertical surface. This capability could be especially usefully for hanging mobile computing devices practically anywhere; kitchens, bathrooms, vehicle dashboards, etc.

FIGS. 59 to 66 illustrate three-dimensional perspective views of the implementation of the invention on an exemplary folding phone such as the newly announced Samsung Galaxy Fold; but the same invention can also be easily implemented on the newly introduced Huawei Mate X by placing the cavities, grooves, sockets, notches, or slits and their associated support element in the stationary bar of the Huawei Mate X.

Figure 59:
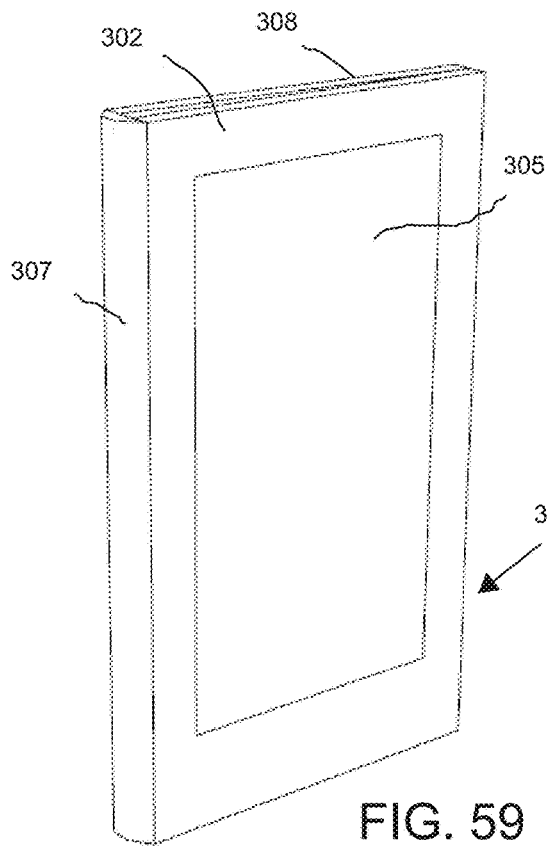
FIG. 59 illustrates a three-dimensional perspective front view of a non-limiting exemplary folding smart phone such as the new Samsung Galaxy Fold in its folded configuration.

FIG. 59 illustrates a three-dimensional perspective front view of a non-limiting exemplary folding smart phone 300 such as the new Samsung Galaxy Fold in its folded configuration with front panel 302 folded over back panel 308 and separated by spine 307. Front panel 302 comprises a front display screen 305.

Figure 60:
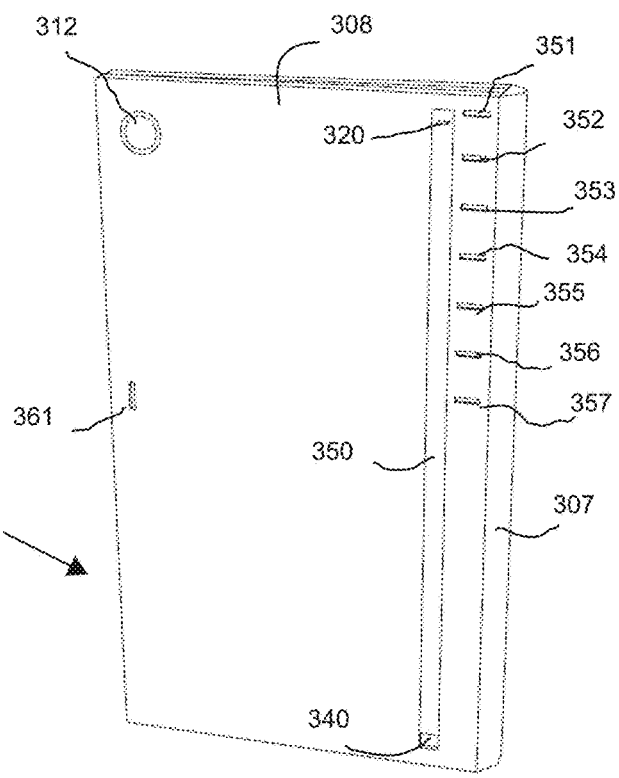
FIG. 60 illustrates a three-dimensional perspective back view of the non-limiting exemplary folding smart phone of FIG. 59.

FIG. 60 illustrates a three-dimensional perspective back view of the exemplary folding smart phone 300 of FIG. 59 with a non-limiting exemplary implementation of the disclosed invention on the back side of its back panel 308. Back panel 308 illustrates the addition of a support stand 350 which may be stowed magnetically in open recession 340. Support stand 350 comprises a notch 320 located at the top of the support stand. The notch 320 may be used to displace support stand 350 from the open recession 340. In addition, back panel 308 comprises a plurality of horizontal slits 351, 352, 353, 354, 355, 356, and 357 which may be used to position the device to multiple angles in one orientation and a vertical slit 361 which may be used to position the device to an alternative orientation. The number of slits shown in FIG. 60 is arbitrary; any number of cavities, grooves, sockets, notches, or slits in either direction may have been used to match the shape of the included support element—which may also have consisted of a pointed stylus that could have doubled as a writing instrument.

Figure 61:
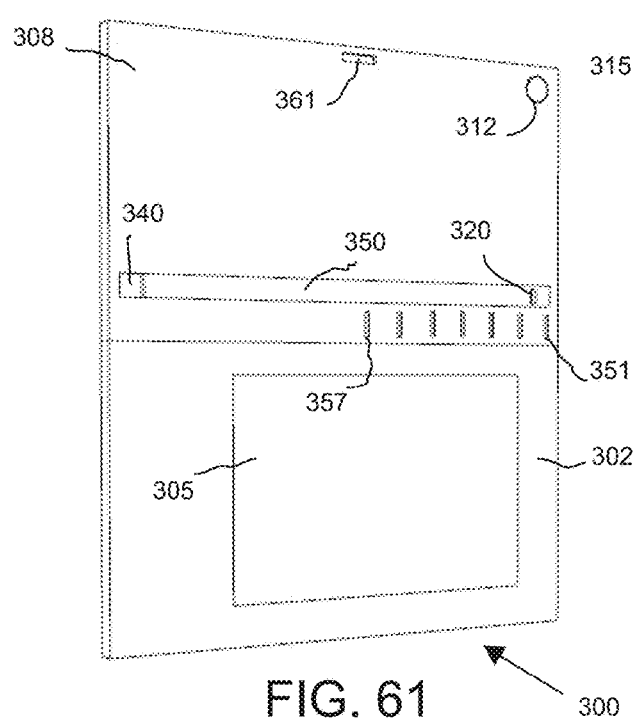
FIG. 61 illustrates an unfolded three-dimensional perspective view of the outer side of the exemplary folding smart phone of FIG. 59.

FIG. 61 illustrates an unfolded three-dimensional perspective view of the outer side of the exemplary folding smart phone of FIG. 59 with both panels 302 and 308 aligned vertically.

Figure 62:
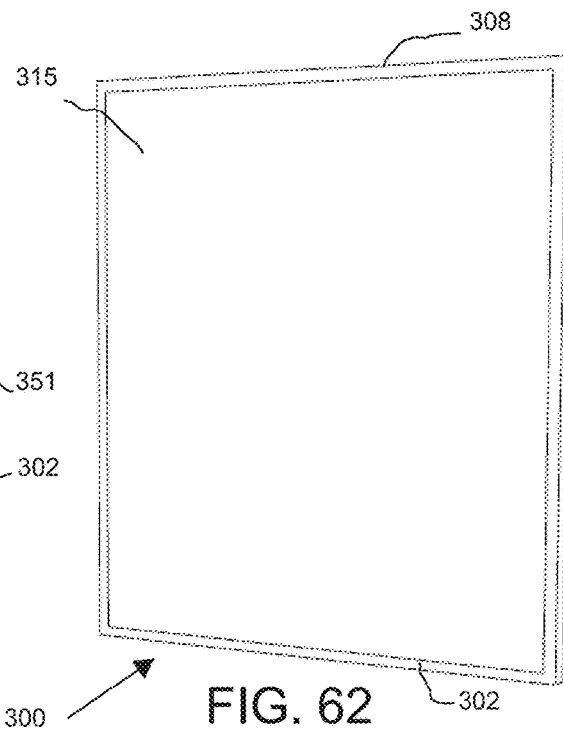
FIG. 62 illustrates an unfolded three-dimensional perspective view of the inner side of the exemplary folding smart phone of FIG. 59.

FIG. 62 illustrates an unfolded three-dimensional perspective view of the inner side of the exemplary folding smart phone of FIG. 59 with both panels 302 and 308 aligned vertically and showing a seamlessly integrated display screen 315 that consist of the inner sides of folding panels 302 and 308.

Figure 63:
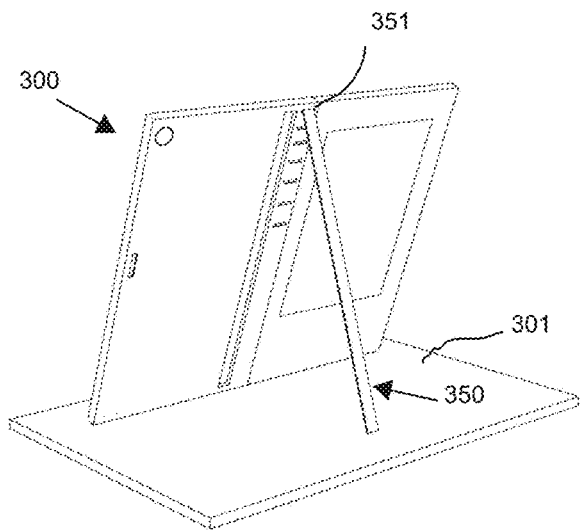
FIGS. 63 and 64 illustrate three-dimensional perspective views of the front and back sides of the unfolded smart phone of FIG. 59 being propped up by a flat support element inserted into a slit on one side of the device.
Figure 64:
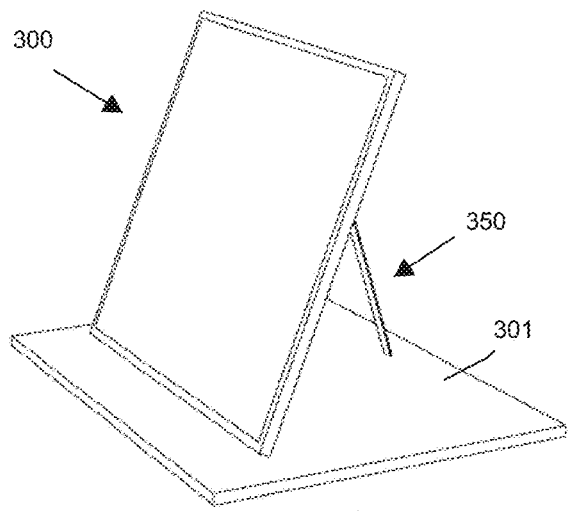

FIGS. 63 and 64 illustrate three-dimensional perspective views of the front and back sides of the unfolded smart phone 300 of FIG. 59 being propped up on flat surface 301 by inserting flat support element 350 into slit 351 of folding smart phone 300.

Figure 65:
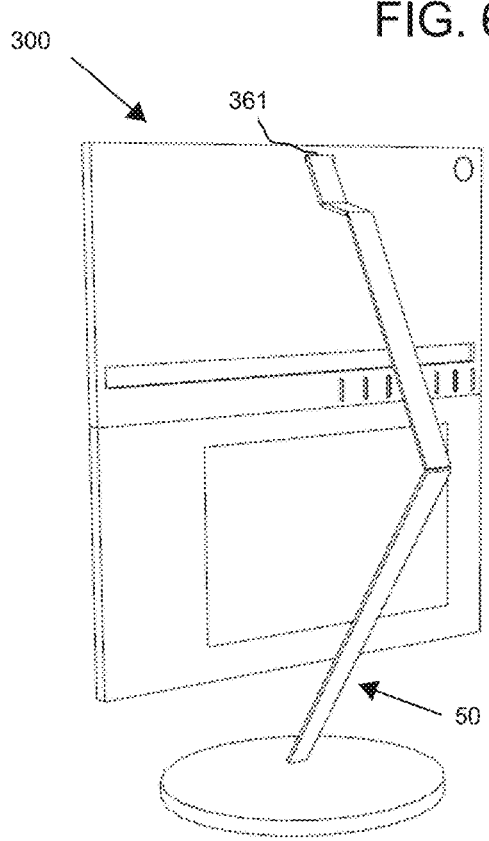
FIGS. 65 and 66 illustrate three-dimensional perspective views of the font and back sides of the unfolded smart phone of FIG. 59 being hung from a desktop stand inserted into a slit on another side of the device.
Figure 66:
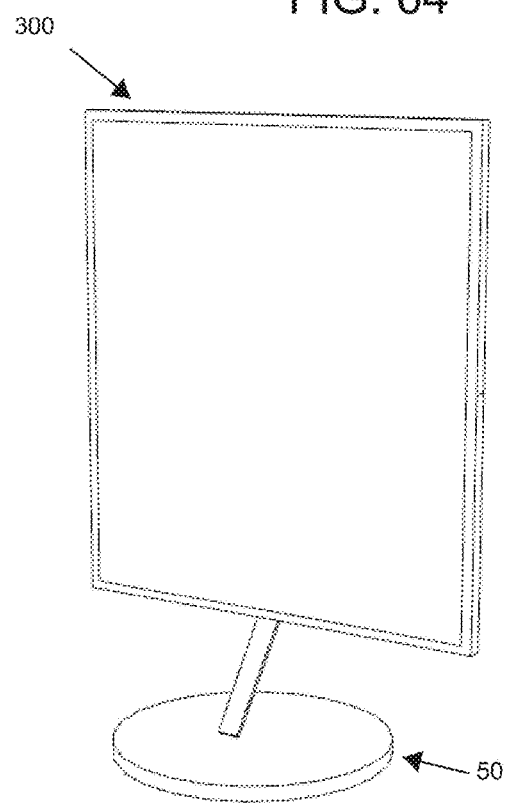

FIGS. 65 and 66 illustrate three-dimensional perspective views of the font and back sides of the unfolded smart phone 300 of FIG. 59 being suspended from a desktop stand 50 by inserting and end of desktop stand 50 into slit 361 of folding smart phone 300.

FIGS. 67 to 77 illustrate three-dimensional perspective views of the implementation of the invention on a non-limiting exemplary tablet holder.

Figure 67:
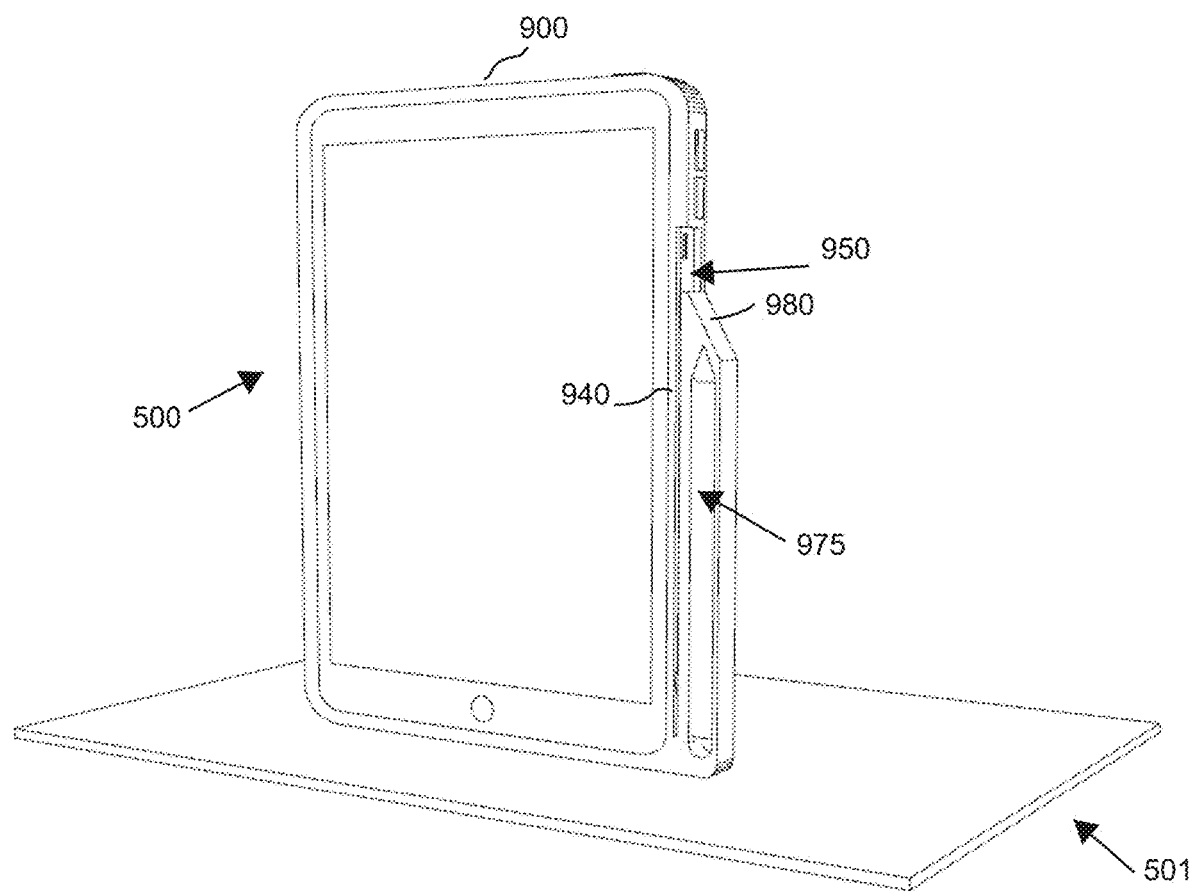
FIG. 67 illustrates a three-dimensional perspective view of a mobile computing device encased in a protective cover or case with an electronic stylus and a flat support element stored at one side of the device.

FIG. 67 illustrates a three-dimensional perspective view of a tablet computer 500 encased in a protective case 900 with an electronic stylus 975 and a flat support element 950 stored at one side of the device. The electronic stylus 975 is stored in enclosure 980 which may or may not be intrinsically connected to protective case 900.

Figure 68:
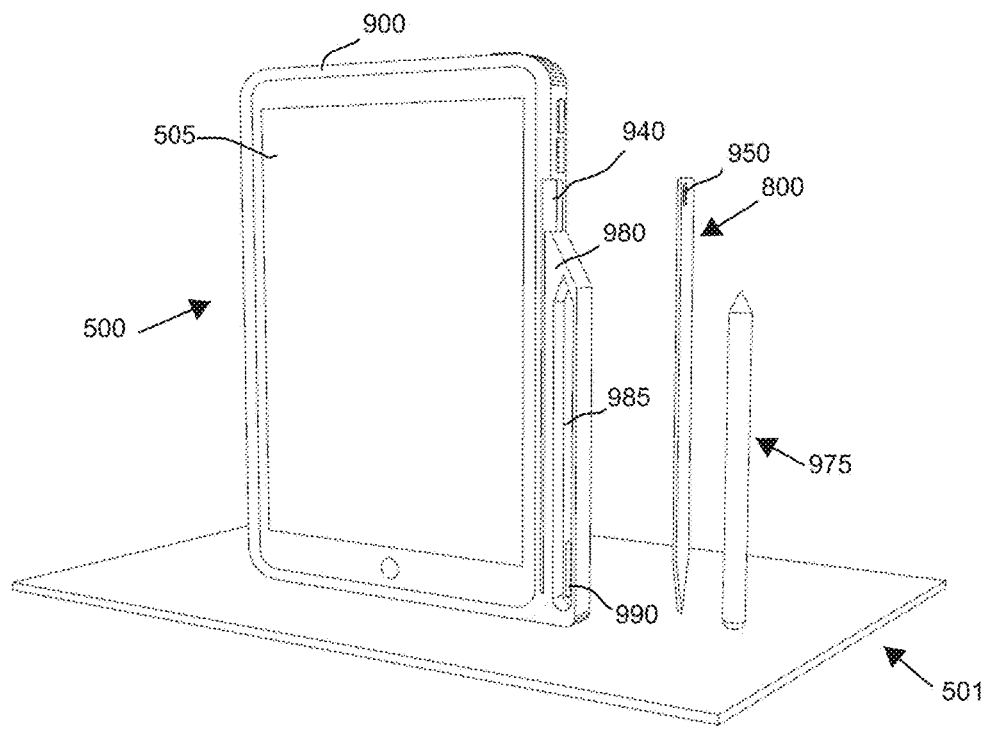
FIGS. 68 and 69 illustrate front and back three-dimensional perspective views of the encased mobile computing device of FIG. 67 with the electronic stylus and the flat support element pulled to the side of the device.

FIG. 68 illustrates a three-dimensional perspective front view of tablet computer 500 encased in protective cover 900 with its electronic stylus 975 and flat support element 950 to the side. The figure also illustrates longitudinal recess 940, that is used for the storage of support element 950 and enclosure 980 with its open recession 985 that is used for storing electronic stylus 975.

Figure 69:
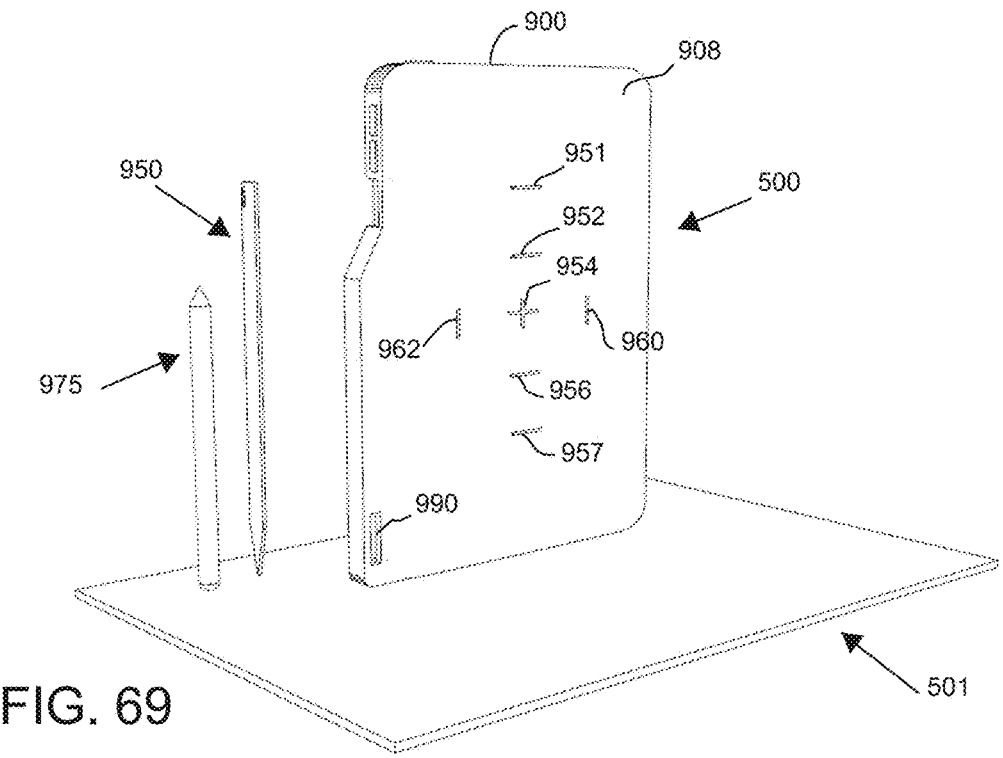

FIG. 69 illustrates a three-dimensional perspective back view of tablet computer 500 with strategically located cavities, sockets, grooves, notches, or slits 951, 952, 954, 956, 957, 960 and 962 that are used to couple with support element 950 to set tablet computer 500 to multiple angles and orientation with respect to a resting surface or base.

Figure 70:
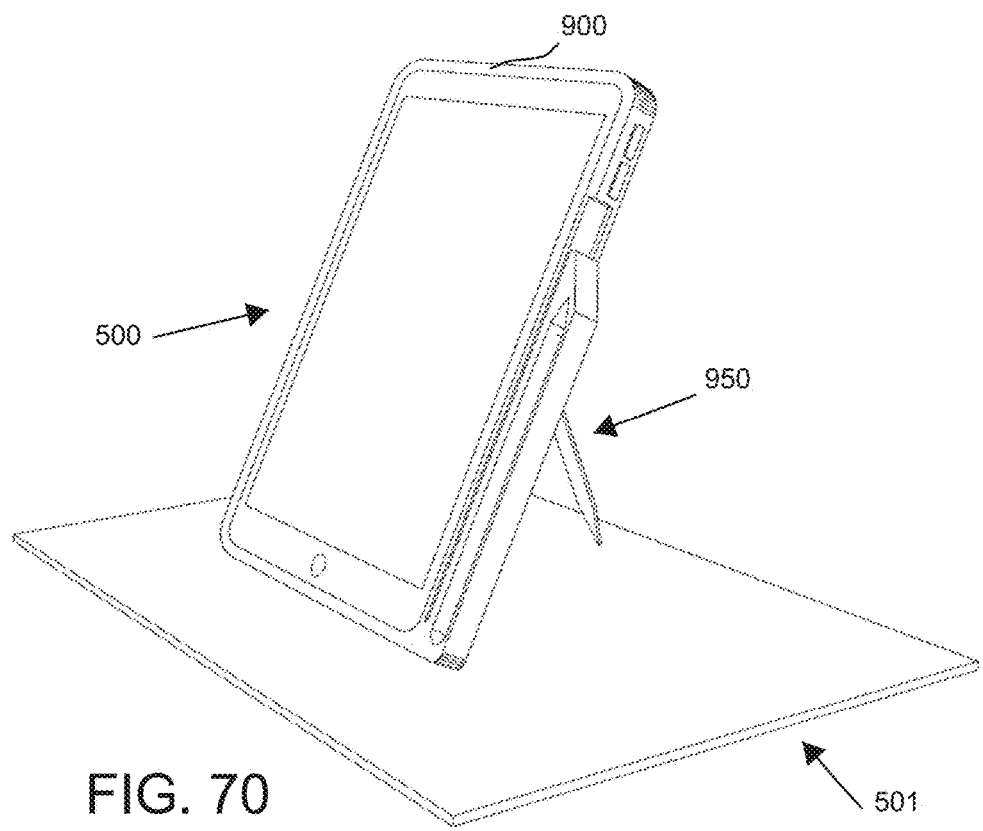
FIGS. 70 and 71 illustrate front and back three-dimensional perspective views of the encased mobile computing device of FIG. 67 with the flat support element propping the device to a specific angle in the portrait orientation, with respect to a resting surface or base.

FIG. 70 illustrates a three-dimensional perspective front view of tablet computer 500 encased in protective case 900 propped up to a specific angle and orientation by support element 950.

Figure 71:
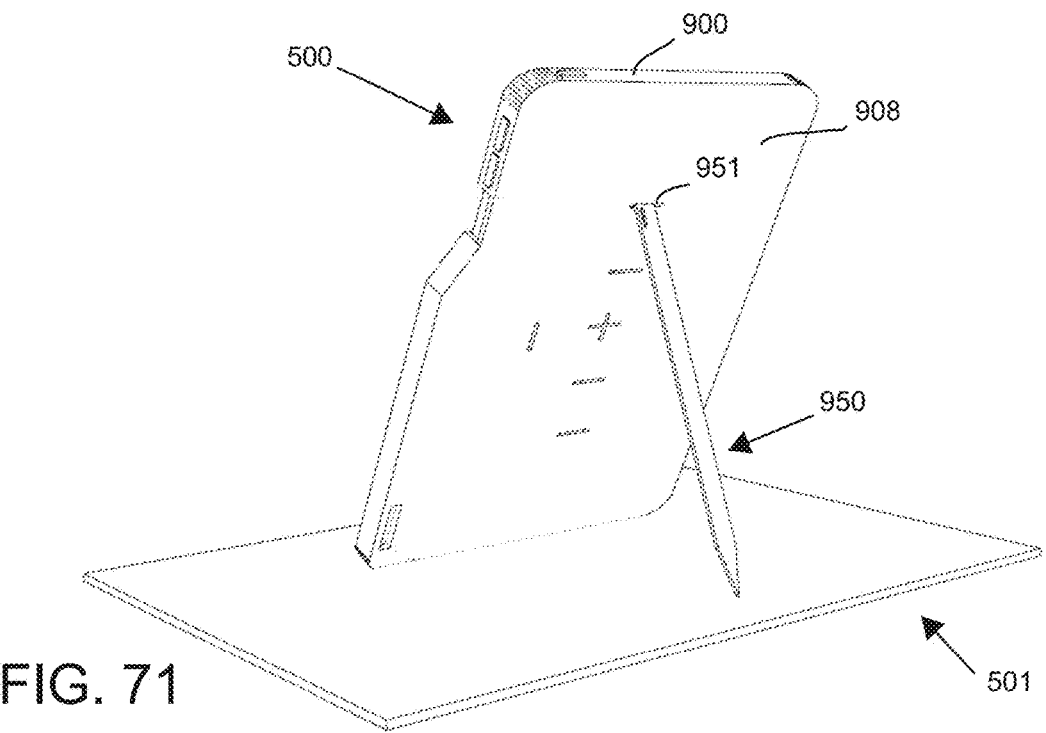

FIG. 71 illustrates a three-dimensional perspective back view of how tablet computer 500 encased in protective case 900 can be propped up to a specific angle and orientation through the insertion of the top end of support element 950 into matching slit 951 located on the back plate 908 of protective case 900.

Figure 72:
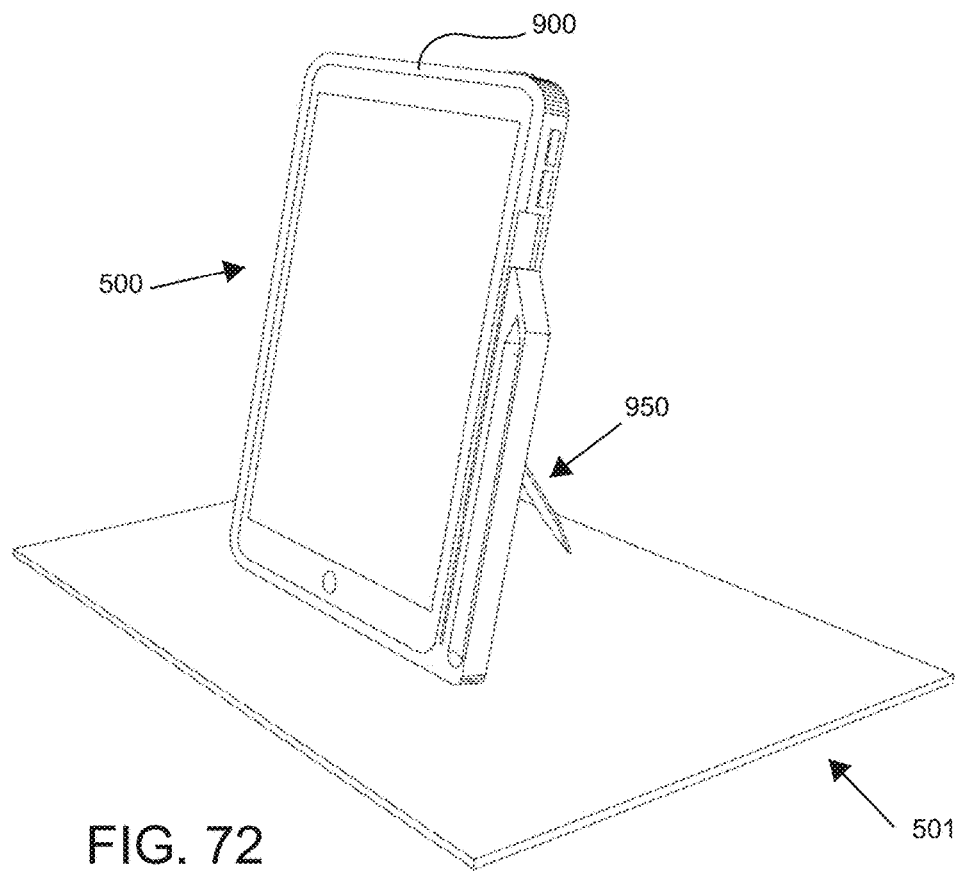
FIGS. 72 and 73 illustrate front and back three-dimensional perspective views of the encased mobile computing device of FIG. 67 with the flat support element propping the device to an alternative specific angle in the portrait orientation, with respect to a resting surface or base.
Figure 73:
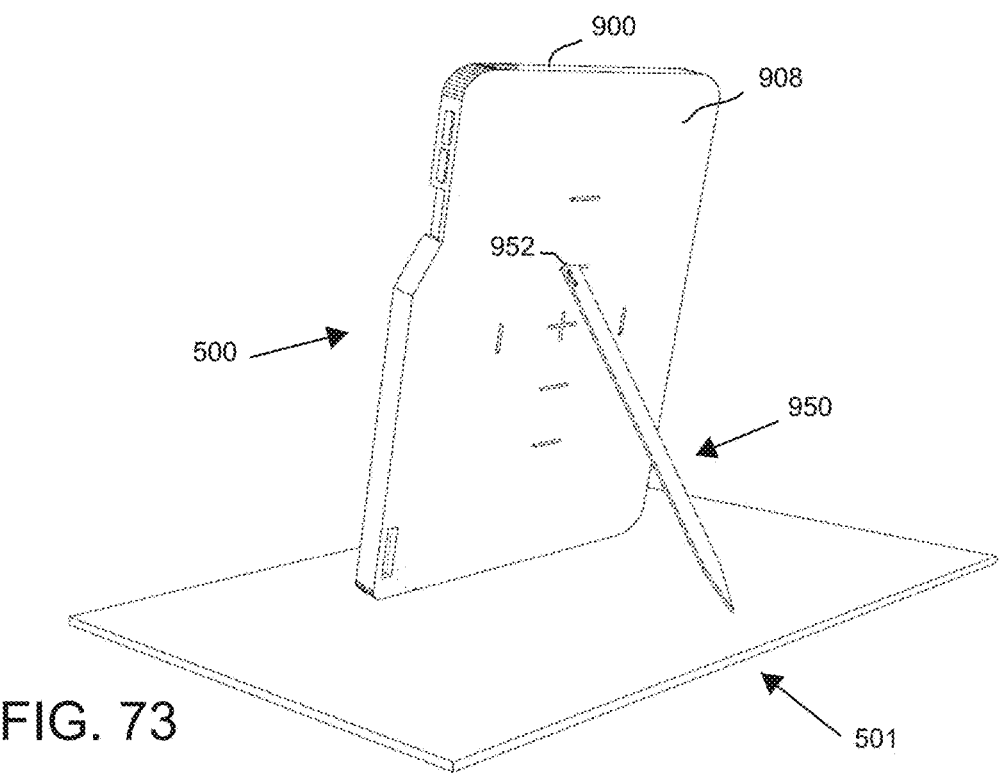

FIGS. 72 and 73 illustrate three-dimensional perspective front and back views of tablet computer 500 encased in protective case 900 being propped up by support element 950 into an alternative angle in the portrait orientation by inserting the top end of support element 950 into slit 952 located on the back plate 908 of protective cover 900.

Figure 74:
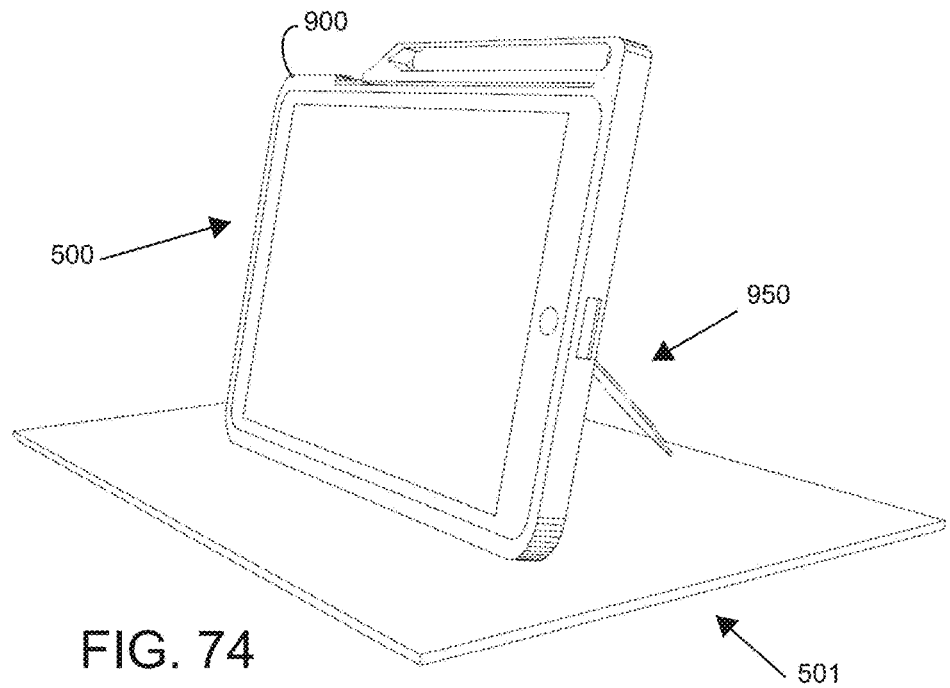
FIGS. 74 and 75 illustrate front and back three-dimensional perspective views of the encased mobile computing device of FIG. 67 with the flat support element propping the device to a specific angle in the landscape orientation, with respect to a resting surface or base.
Figure 75:
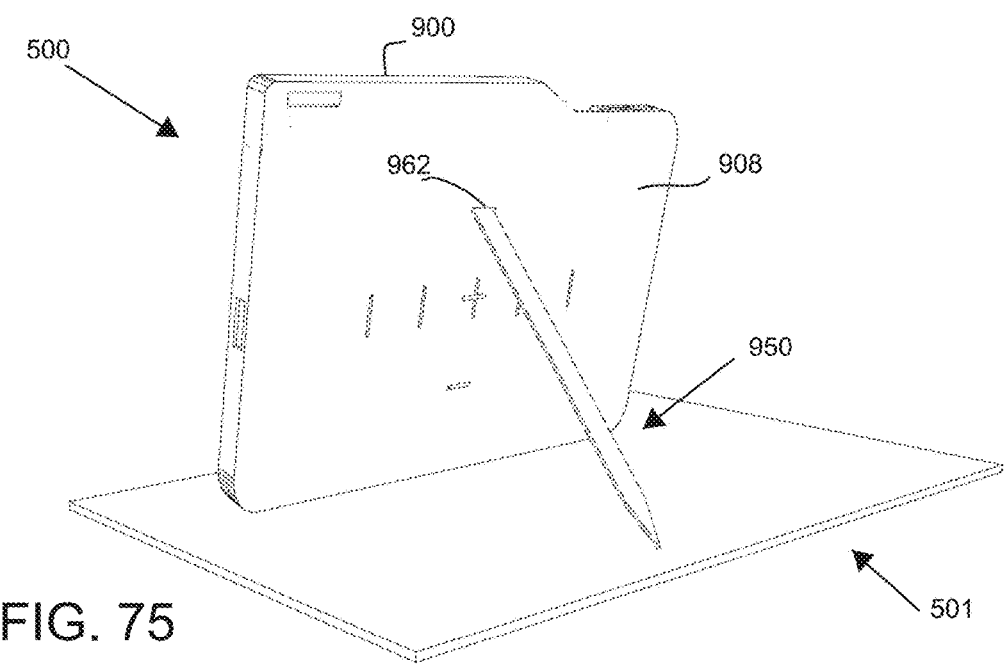

FIGS. 74 and 75 illustrate front and back three-dimensional perspective views of how support element 950 can prop tablet computer 500 that is encased in protective case 900 to a specific angle in the landscape orientation by inserting the top end of support element 950 into slit 962 located on the back plate 908 of protective cover 900.

Figure 76:
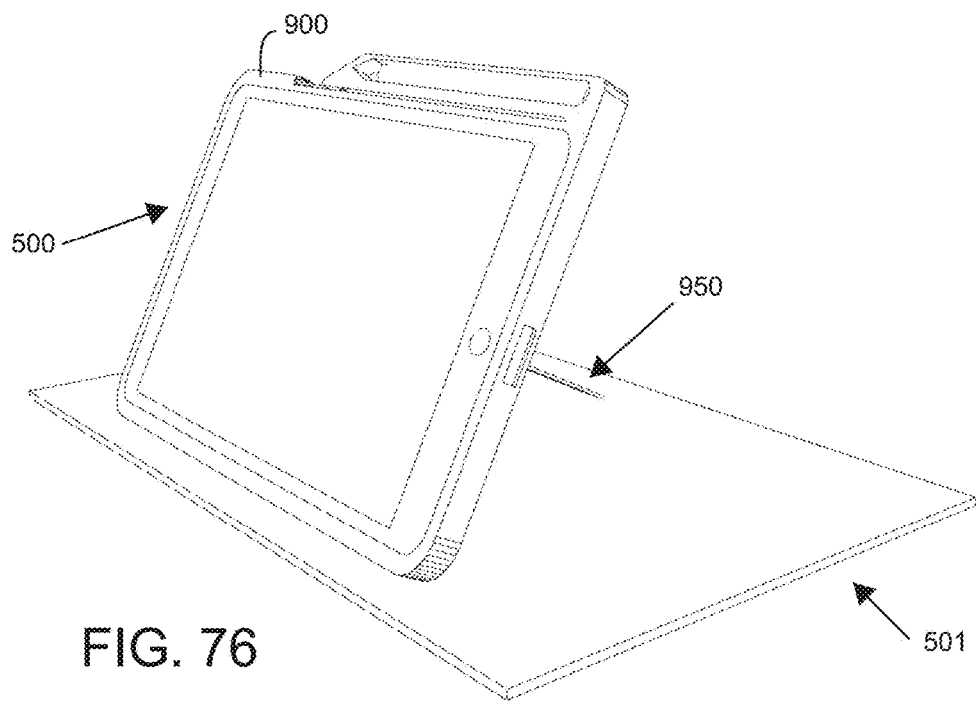
FIGS. 76 and 77 illustrate front and back three-dimensional perspective views of the encased mobile computing device of FIG. 67 with the flat support element propping the device to an alternative specific angle in the landscape orientation, with respect to a resting surface or base.
Figure 77:
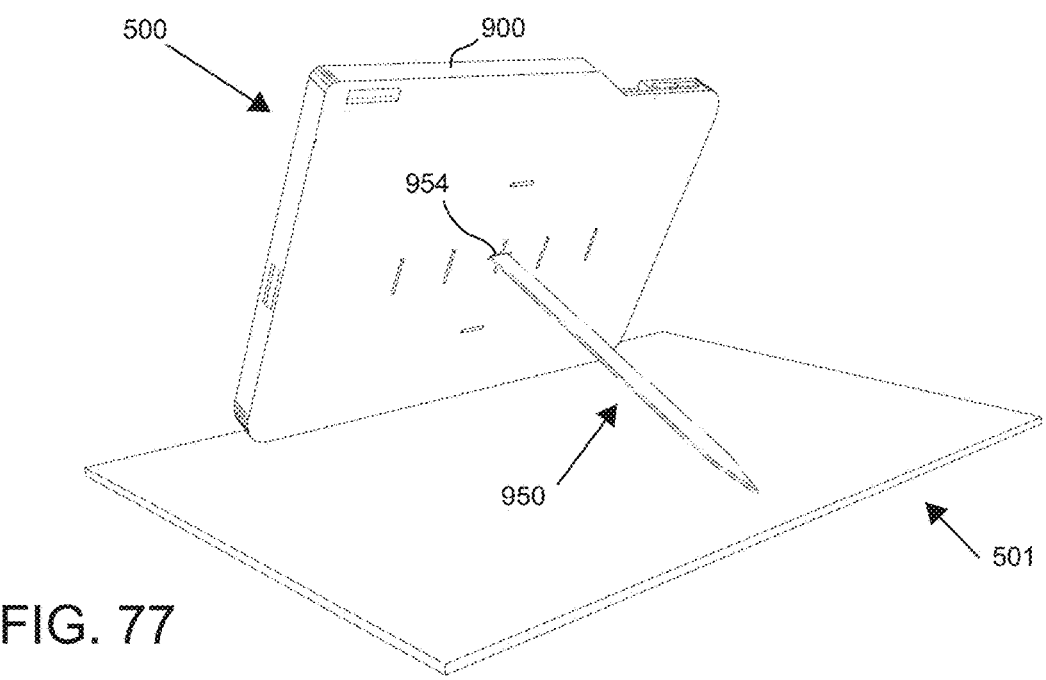

FIGS. 76 and 77 illustrate front and back three-dimensional perspective views of how support element 950 can prop tablet computer 500 that is encased in protective case 900 to an alternative specific angle in the landscape orientation by inserting the top end of support element 950 into groove 954 located on the back plate 908 of protective cover 900.

FIGS. 78 to 95 illustrate three-dimensional perspective views of the implementation of the invention on yet another non-limiting exemplary tablet holder for contemporary mobile computing devices.

FIG. 78 illustrates a three-dimensional perspective view of the front side of a tablet holder 800 with mounting plate 801. This illustration displays how mounting plate 801 provides a tablet computer with protection from knocks and drops using four contoured rubber bumpers 890, 891, 892, and 893 located at each corner of tablet holder 800.

FIG. 79 illustrates a three-dimensional perspective view of the back side of tablet holder 800 with mounting plate 801 and four contoured rubber bumpers 890, 891, 892, and 893 located at each corner of the mounting plate. This illustration displays three elements situated on mounting plate 801 that may substantially enhance the functionality of tablet computers. The first element comprises strategically located cavities, grooves, sockets, notches, or slits that are positioned in vertical and horizontal rows; 820, 821, 822. 860, 861, 862, 830, 831, and 832; the second element consists of support element 850 that is stored in slot 840 of mounting plate 801; and the third element comprises two load-bearing hinged support elements 805 and 810 that are stored in slots 806 and 811 of mounting plate 801. Hinged support elements 805 and 810 are load bearing and can revolve and lock rotationally around shafts 807 and 812 respectively to orient the tablet computer to the portrait and landscape orientations. Hinged elements 805 and 810 have been disclosed in U.S. patent application Ser. No. 15/230,165 to Zaloom (the same applicant of this patent application).

Figure 80:
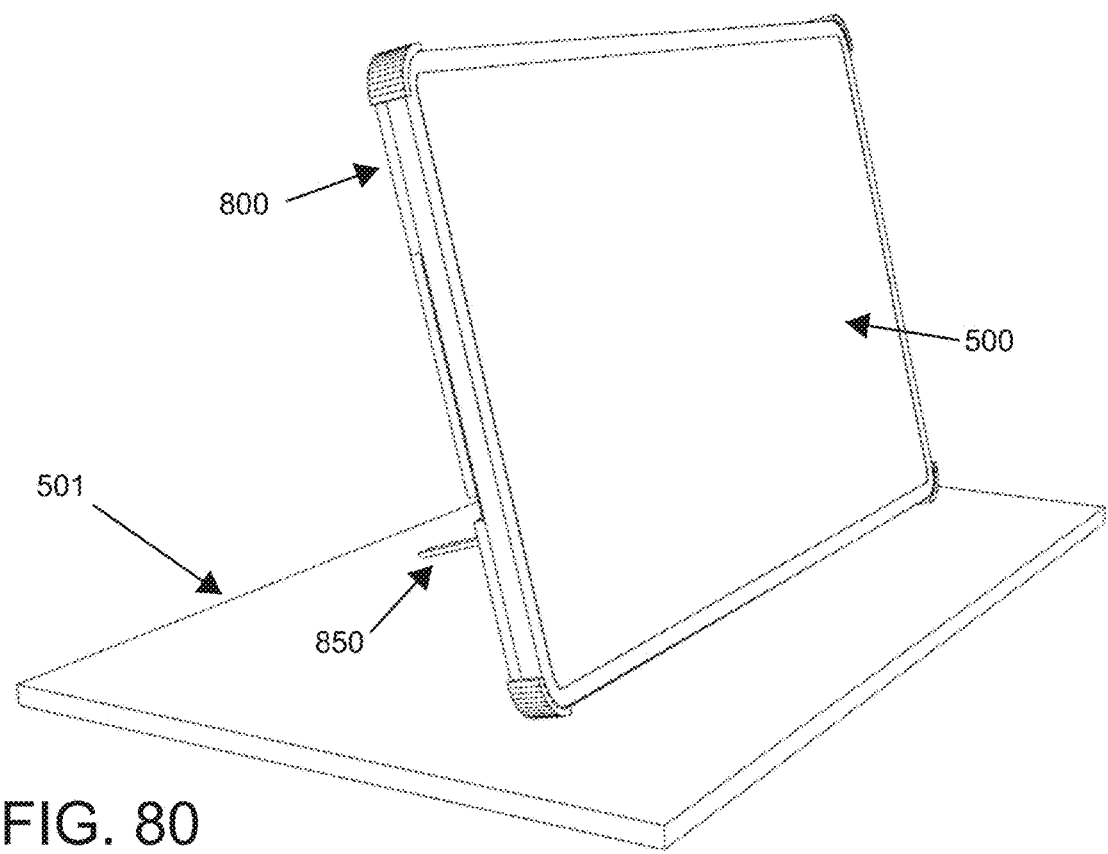
FIGS. 80 and 81 illustrate three-dimensional perspective views of the front and back sides of a contemporary tablet computer held in the exemplary tablet holder of FIGS. 78 and 79 with its support element deployed to position the device to the landscape orientation with respect to a resting surface or base.
Figure 81:
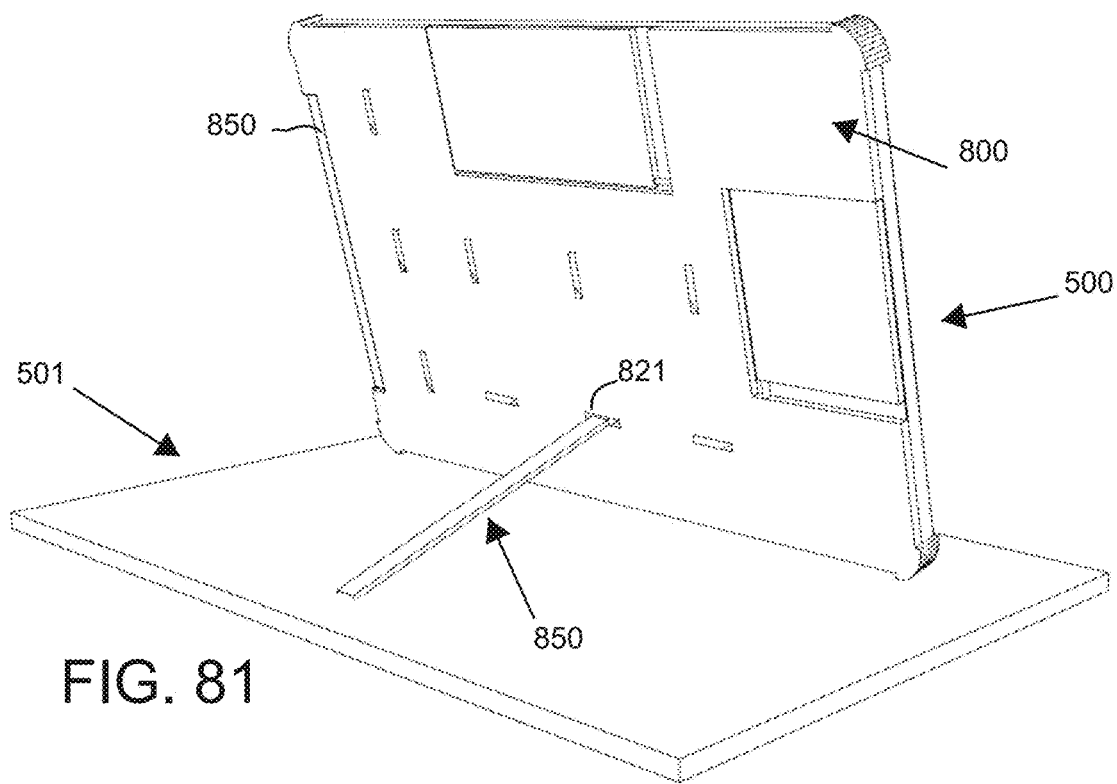

FIGS. 80 and 81 illustrate three-dimensional perspective views of the front and back sides of a contemporary tablet computer 500 held in the exemplary tablet holder 800 of FIGS. 78 and 79 with its support element 850 inserted into angled slit 821 to position tablet computer 500 to a landscape orientation.

Figure 82:
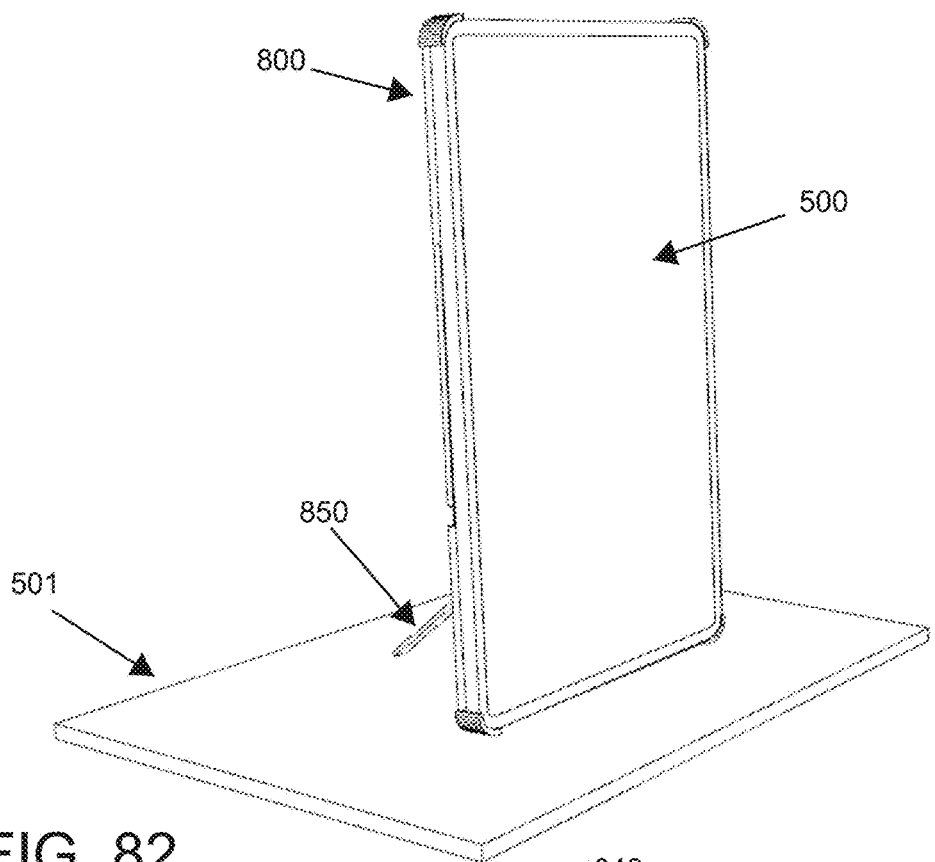
FIGS. 82 and 83 illustrate three-dimensional perspective views of the front and back sides of a contemporary tablet computer held in the exemplary tablet holder of FIGS. 78 and 79 with its support element deployed to position the device to the portrait orientation with respect to a resting surface or base.
Figure 83:
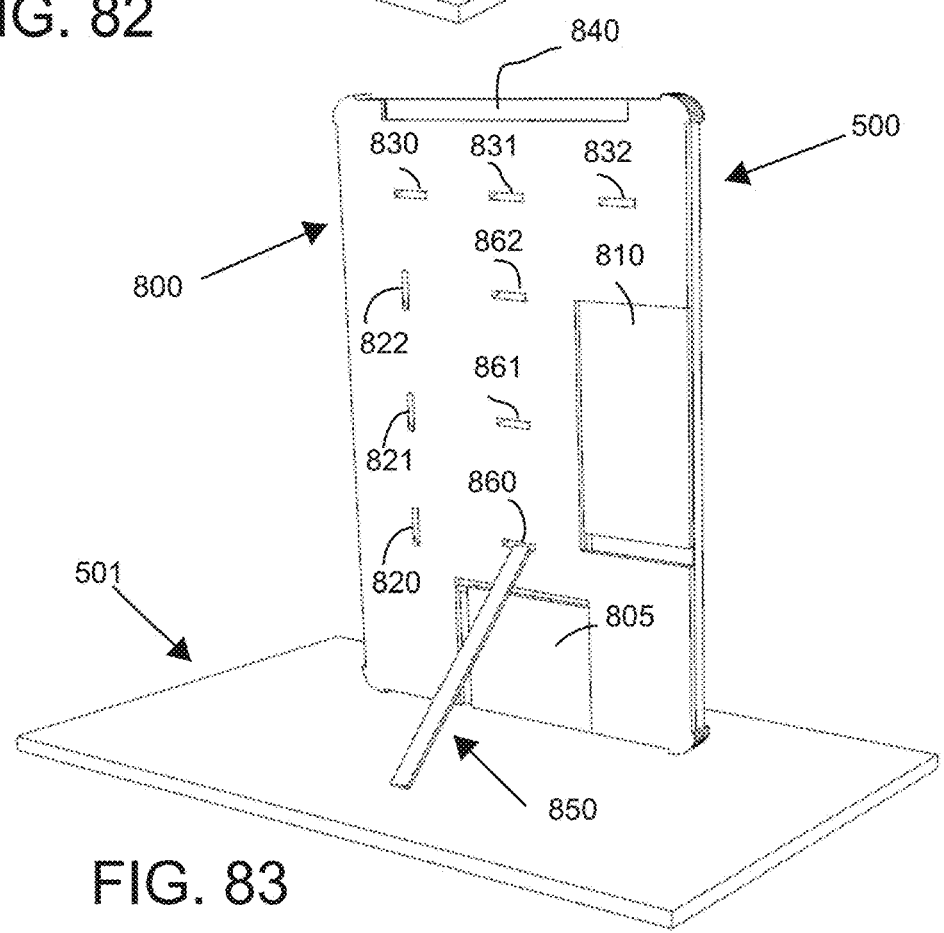

FIGS. 82 and 83 illustrate the front and back sides of a contemporary tablet computer 500 held in the tablet holder 800 of FIGS. 78 and 79 with its support element 850 inserted into angled slit 860 to position the tablet to a portrait orientation.

FIGS. 84 and 85 illustrate the front and back sides of a contemporary tablet computer 500 held in tablet holder 800 and suspended from an exemplary desktop stand 50 in the landscape orientation by inserting prongs 51 and 52 of desktop stand 50 into slits 820 and 822 of the tablet holder.

FIGS. 86 and 87 illustrate the front and back sides of a contemporary tablet computer 500 held in tablet holder 800 and suspended from an exemplary desktop stand 50 in the portrait orientation by inserting prongs 51 and 52 of desktop stand 50 into slits 830 and 832 of the tablet holder.

FIGS. 88 and 89 illustrate the front and back sides of a contemporary tablet computer 500 held in tablet holder 800 and suspended on exemplary floor stand 400 in the landscape orientation by inserting prongs 401 and 402 of floor stand 400 into slits 820 and 822 of the tablet holder.

FIGS. 90 and 91 illustrate the front and back sides of a contemporary tablet computer 500 held in tablet holder 800 and suspended on exemplary floor stand 400 in the portrait orientation by inserting prongs 401 and 402 of floor stand 400 into slits 830 and 832 of the tablet holder.

FIGS. 92 and 93 illustrate the front and back sides of a contemporary tablet computer 500 held in tablet holder 800 and suspended on an exemplary wall hook 75 in the landscape orientation by inserting prongs 76 and 77 of wall hook 75 into slits 820 and 822 of the tablet holder.

FIGS. 94 and 95 illustrate the front and back sides of a contemporary tablet computer 500 held in tablet holder 800 and suspended on exemplary wall hook 75 in the portrait orientation by inserting prongs 76 and 77 of wall hook 75 into slits 830 and 832 of the tablet holder.

FIGS. 96A to 99D are used to demonstrate that the essence of the invention is angled cavities that comprise straight, curved, slanted, horizontal, or vertical walls or any combination thereof where each cavity is configured to receive an end of a support element or a suspension structure at a single specific angle and orientation with respect to the back plate of the mobile computing device to which it is connected—and that the shape of the cavity, the kind of walls that it comprises, the shape of the support element, and where it is stored are irrelevant for the proper functioning of the invention.

FIGS. 96A to 96D are a sequence of drawings that illustrate a non-limiting exemplary demonstration of the concept of the invention as it relates to attaching an exemplary cylindrical support element 320 to the back plate 310 of an exemplary mobile computing device 330 by inserting one end of the exemplary cylindrical support element 320 into a round cavity 305 with a curved wall 307 and straight wall 309 in the back plate 310 of the exemplary mobile computing device 330 and leaning the device backward in order to position it to a specific angle and orientation with respect to a resting surface or base 301.

FIGS. 97A to 97D are a sequence of drawings that illustrate a non-limiting exemplary demonstration of the concept of the invention as it relates to attaching an exemplary rectangular support element 320 to the back plate 310 of an exemplary mobile computing device 330 by inserting one end of the exemplary rectangular support element 320 into a rectangular cavity 305 with a horizontal wall 307 and a vertical wall 309 in the back plate 310 of the exemplary mobile computing device 330 and leaning the device backward in order to position it to a specific angle and orientation with respect to a resting surface or base 301.

FIGS. 98A to 98D are a sequence of drawings that illustrate a non-limiting exemplary demonstration of the concept of the invention as it relates to attaching an exemplary rectangular support element 320 to the back plate 310 of an exemplary mobile computing device 330 by inserting one end of the exemplary rectangular support element 320 into a rectangular cavity 305 with slanted walls 307 and 309 in the back plate 310 of the exemplary mobile computing device 330 and leaning the device backward in order to position it to a specific angle and orientation with respect to a resting surface or base 301.

FIGS. 99A to 99D are a sequence of drawings that illustrate a non-limiting exemplary demonstration of the concept of the invention as it relates to attaching an exemplary rectangular support element with a curved end 320 to the back plate 310 of an exemplary mobile computing device 330 by inserting one end of the exemplary rectangular support element 320 into a rectangular cavity 305 with slanted wall 307 and curved wall 309 in the back plate 310 of the exemplary mobile computing device 330 and leaning the device backward in order to position it to a specific angle and orientation with respect to a resting surface or base 301.

FIGS. 100A to 100D illustrate three-dimensional perspective views of an alternative non-limiting exemplary latching structure with an "L-shaped" ending that may be used to suspend a tablet computer holder to a desktop stand, a floor stand, or wall hook to provide a more secure connection between hook and tablet holder. "L-shaped" or similar types of irregularly shaped cavities of the type illustrated in FIGS. 100A to 100D may be combined with cavities of the types illustrated in FIGS. 96A to 99D on the same tablet holder where the "L-shaped" cavities may be used to suspend the table holder from a desktop stand, a floor stand, or a hook, while the type of cavities used in FIGS. 96A to 99D may be used to prop the tablet holder on a flat surface or base.

Figure 100A:
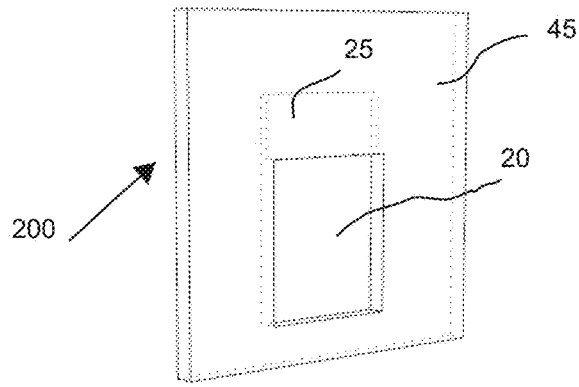

FIG. 100A illustrates a three-dimensional perspective view of a non-limiting exemplary support panel of a mobile computing device 200 with a back plate 45, an L-shaped cavity 25, and an opening 20.

Figure 100B:
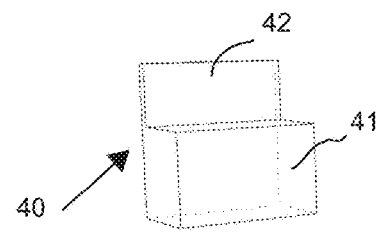

FIG. 100B illustrates a three-dimensional perspective view of an L-Shaped ending of a support element 40 with a thick end 41 and a protruding end 42.

Figure 100C:
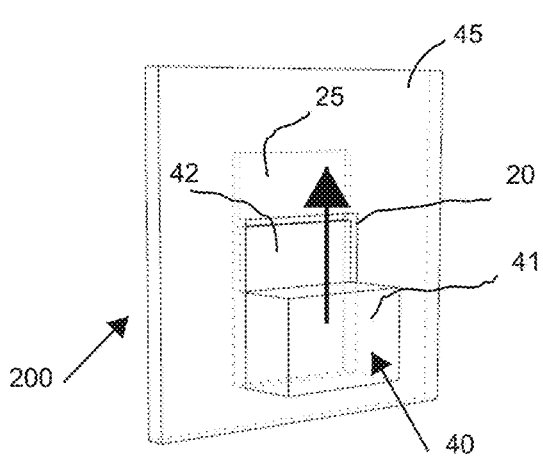

FIG. 100C illustrates a three-dimensional perspective view of the L-Shaped support element 40 being inserted into the L-Shaped cavity 25 of support panel 200.

Figure 100D:
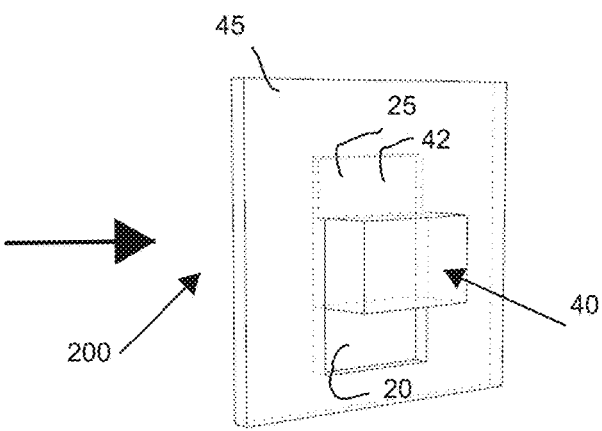
Figure 101:
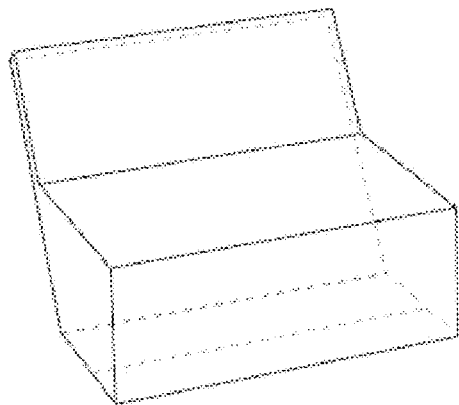
Figure 102:
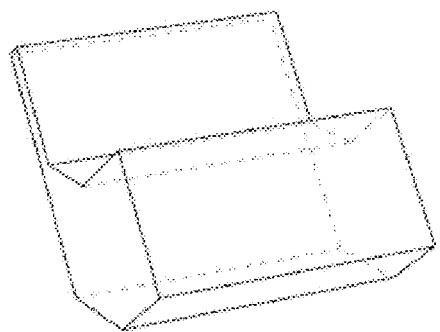
Figure 103:
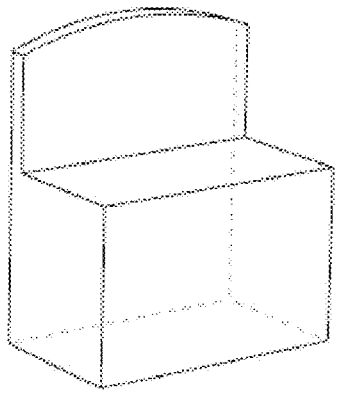
Figure 104:
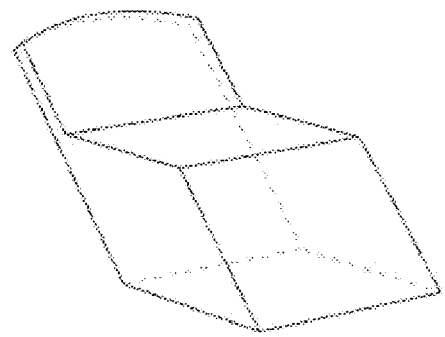

FIG. 100D illustrates a three-dimensional perspective view of the L-Shaped support element 40 fully engaged in the L-Shaped cavity 25 of support panel 200.

FIGS. 101 to 104 illustrate three-dimensional perspective views of non-limiting exemplary embodiments of various configurations of straight, curved, and sloped endings of suspension elements and hooks that may be used for latching a tablet computer holder to a desktop stand, floor stand, or wall hook.

FIGS. 105 to 112 illustrate three-dimensional perspective views of a non-limiting exemplary implementation of how the suspension aspect of the disclosed invention can be combined with a hinged angular propping element to provide angular propping and suspension for a smart phone using two independent and fundamentally different mechanisms—demonstrating that neither the integration of an independent support element nor defining its location vis-à-vis the mobile computing device, or smart phone, are essential for the proper functioning of the invention. These figures demonstrate that the essence of the invention is the internal structure of the cavities that may use any combination of straight, curved, slanted, horizontal, and vertical walls to receive fully or partially one end of a matching support element or structure at a single specific angle and orientation with respect to the back plate, protective cover or case, or panel to which the cavities are attached.

Figure 105:
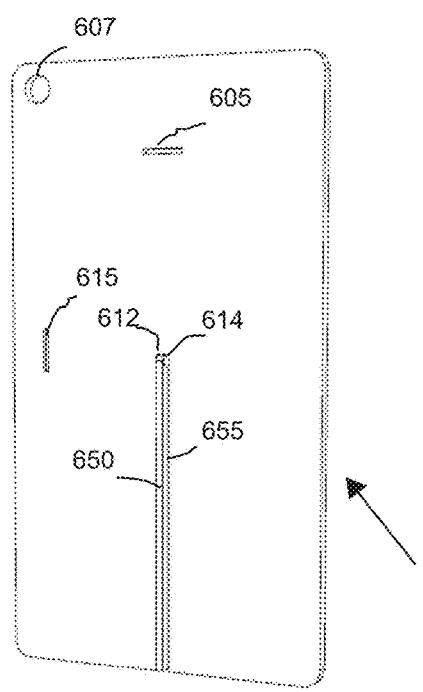

FIG. 105 illustrates a three-dimensional non-limiting exemplary back panel 600 that can be adhered to the back of a smart phone. Panel 600 comprises a support element 650 with a hollow multi-sided cylindrical ending that can slide across horizontal shaft 614. Horizontal shaft 614 includes a multi-sided locking region 612 that matches the hollow multi-sided cylindrical ending of support element 650. When support element 650 is positioned over the multi-sided locking region 612, its hollow multi-sided cylindrical ending interlocks with multi-sided locking region 612 and is prevented from rotating with respect to horizontal shaft 614; when support element 650 is positioned on the other end of horizontal shaft 614, which is cylindrical and smooth, it is free to pivot to a new angle with respect to support panel 600. Sliding a pivoted support element 650 over multi-sided locking region 612 fixes the angular position of support element 650 and enables panel 600 to be positioned to a new angle with respect to a resting surface or base 501 (See U.S. Pat. No. 9,933,009 to Zaloom). In addition to hinged support element 650, back panel 600 also includes one horizontal cavity or slit 605 and one vertical cavity or slit 615 to enable an attached smart phone to be suspended from a desktop stand in both the horizontal and the vertical orientations.

Figure 106:
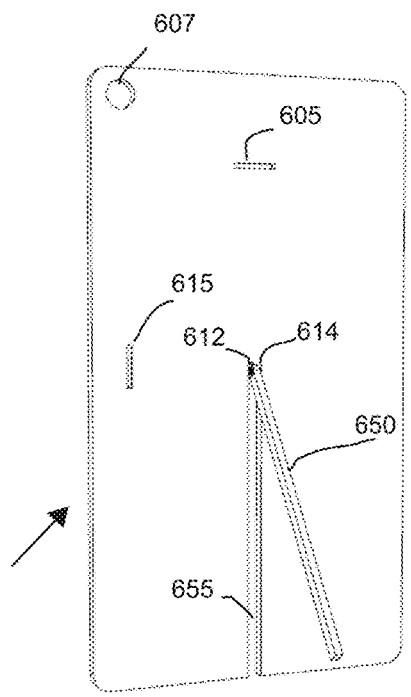

FIG. 106 illustrates the three-dimensional non-limiting exemplary back panel 600 of FIG. 105 with its support element 650 extended.

Figure 107:
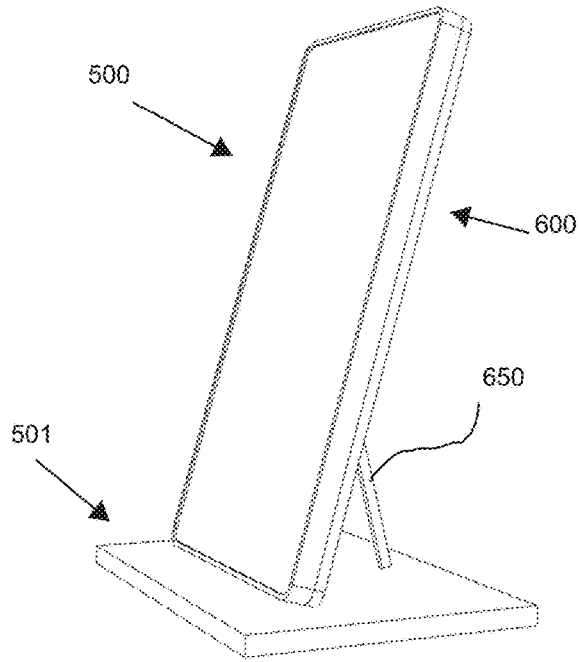
Figure 108:
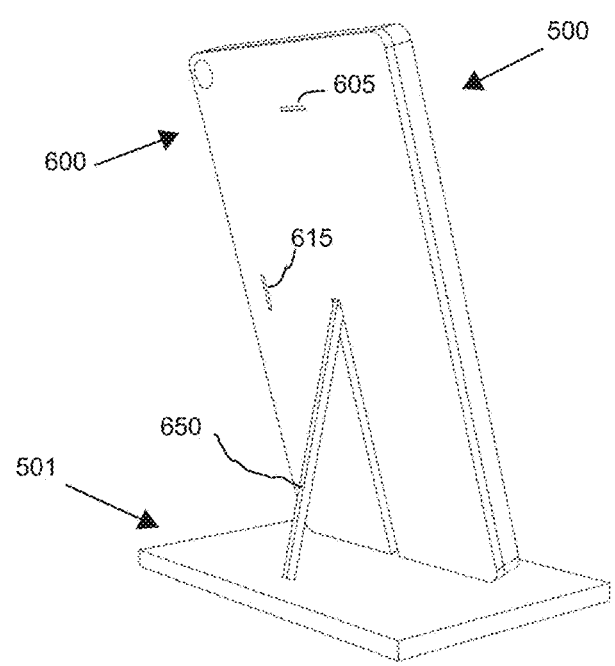

FIGS. 107 and 108 illustrate the three-dimensional non-limiting exemplary back panel 600 of FIG. 105 attached to an exemplary smart phone 500 and positioning the exemplary smart phone to a specific angle and orientation with respect to fixed surface or base 501.

Figure 109:
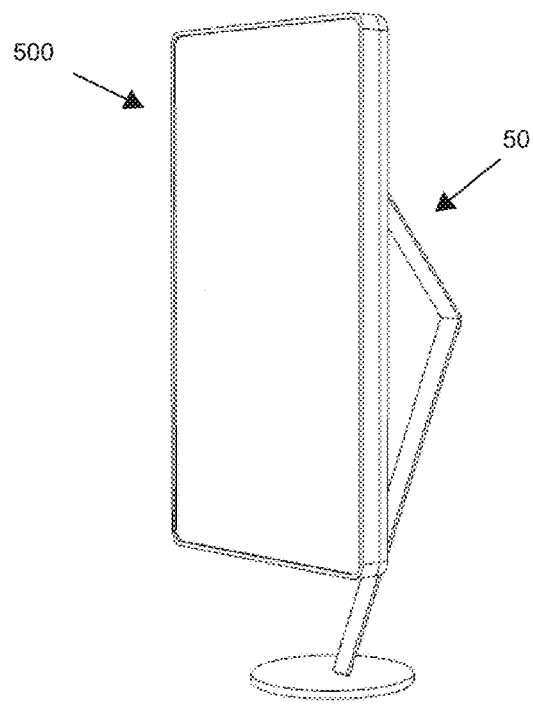
Figure 110:
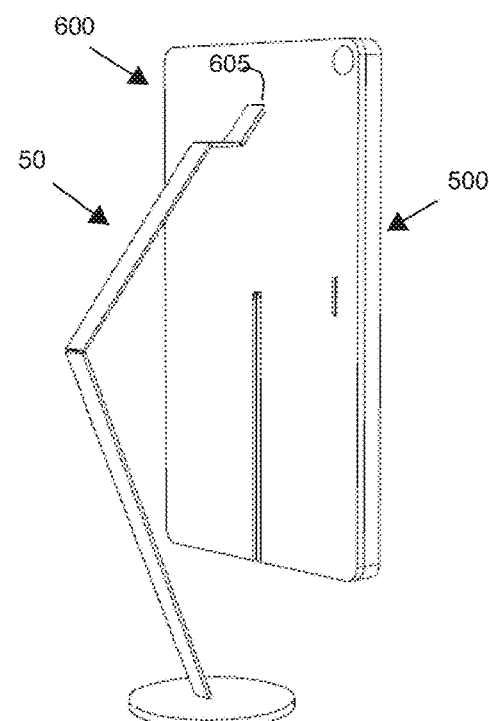

FIGS. 109 and 110 illustrate the three-dimensional non-limiting exemplary back panel 600 of FIG. 105 attached to an exemplary smart phone 500 and suspending the exemplary smart phone to the portrait orientation.

Figure 111:
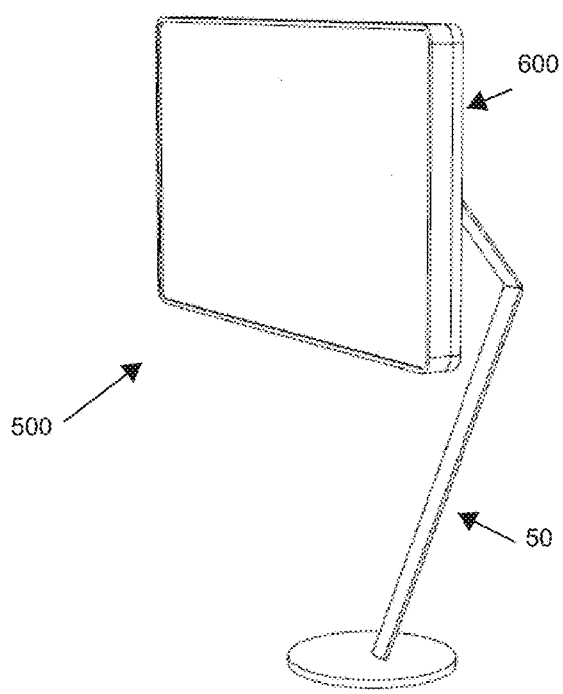
Figure 112:
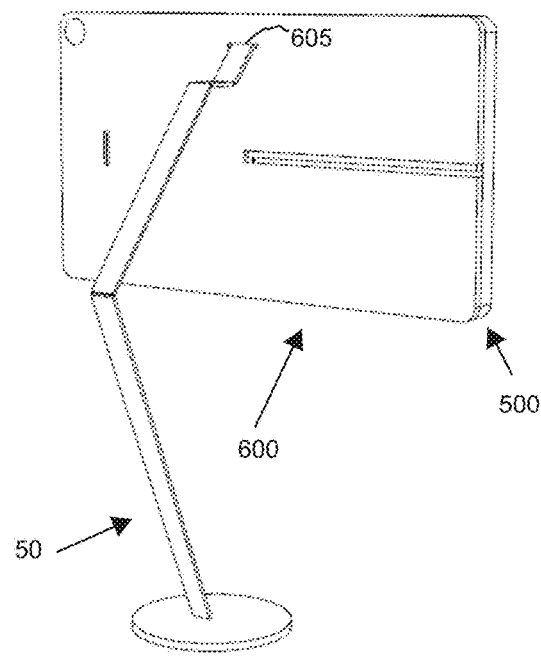

FIGS. 111 and 112 illustrate the three-dimensional non-limiting exemplary back panel 600 of FIG. 105 attached to an exemplary smart phone 500 and suspending the exemplary smart phone to the landscape orientation.

FIGS. 113 to 122 illustrate three-dimensional perspective views of a non-limiting exemplary implementation of how the suspension aspect of the disclosed invention can be combined with a hinged angular propping element to provide angular propping and suspension for a tablet computer using two independent and fundamentally different mechanisms—demonstrating once more that neither the integration of an independent support element nor defining its location vis-à-vis the mobile computing device, or tablet computer, are essential for the proper functioning of the invention. These figures provide additional proof that the essence of the invention is the internal structure of the angled cavities that that may use any combination of straight, curved, slanted, horizontal, and vertical walls to receive fully or partially one end of a matching support element or structure at a single specific angle and orientation with respect to the back plate, protective cover or case, or panel to which the cavities are attached.

Figure 113:
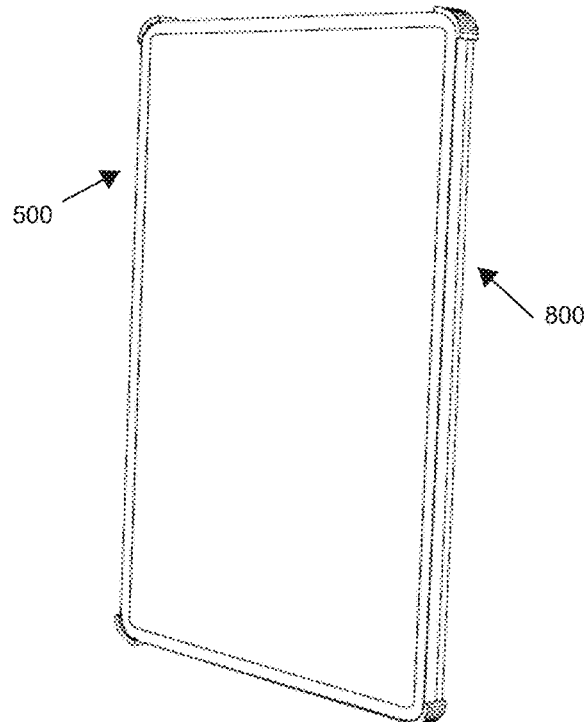
Figure 114:
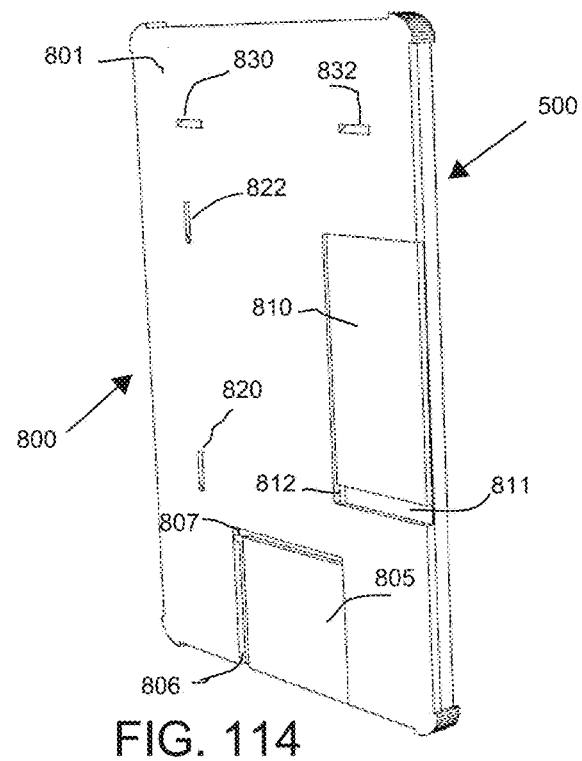

FIGS. 113 and 114 illustrate an alternative version of FIGS. 82 and 83 where support element 840 and cavities or slits 821, 831, 860, 861, and 862 have been eliminated because they were duplicating the function of flaps 805 and 810 with respect to positioning tablet holder 800 to multiple angles and orientations with respect to a resting surface or base. While cavities 820, 822, 830 and 832 are depicted as slits in this illustration, they could have been assigned any shape or form that would enable the tablet holder to be suspended from a desktop stand or a floor stand, such as the shape and form of the cavities depicted in FIGS. 100A to 100D.

Figure 115:
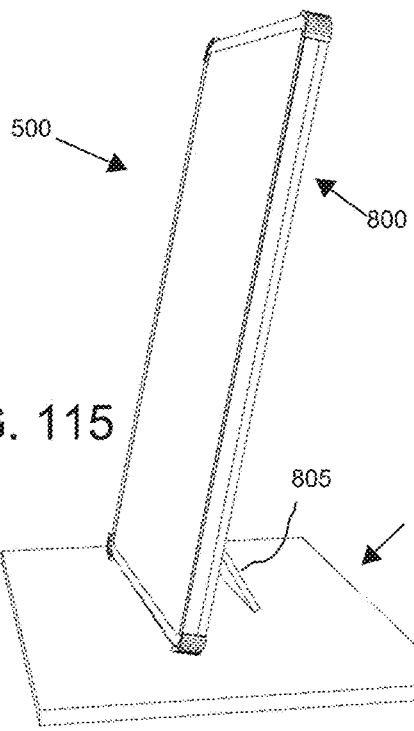
Figure 116:
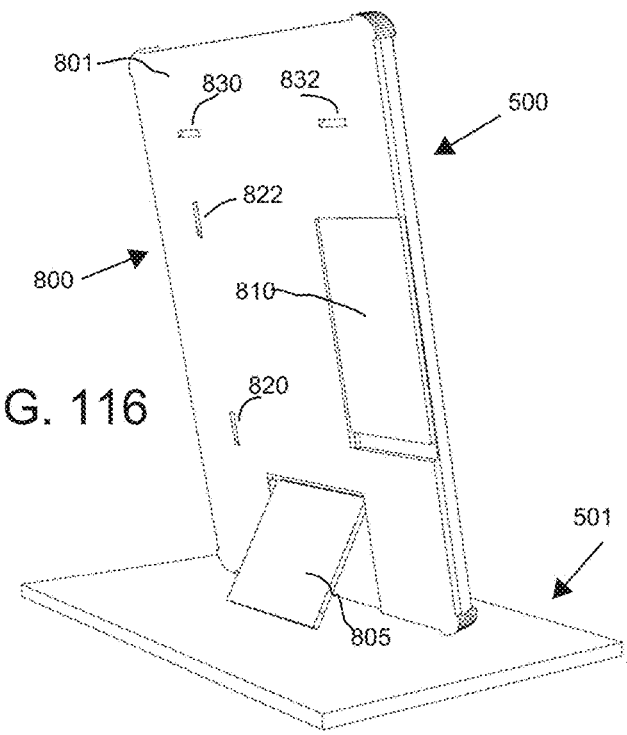

FIGS. 115 and 116 illustrate three-dimensional perspective views of tablet holder 800 of FIGS. 113 and 114 positioning tablet computer 500 to a specific angle in the portrait orientation using flap 805 instead of support element 850 of FIG. 79.

Figure 117:
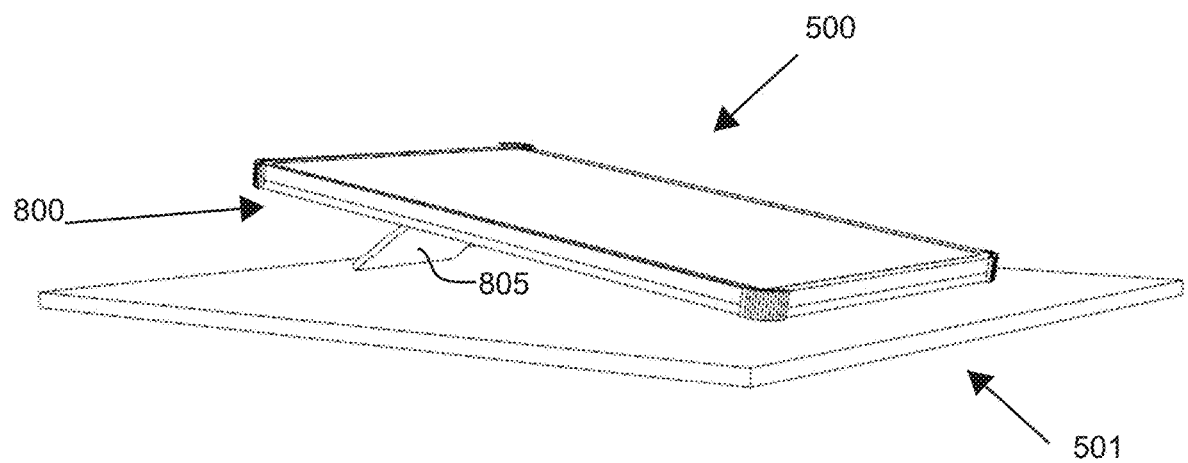
Figure 118:
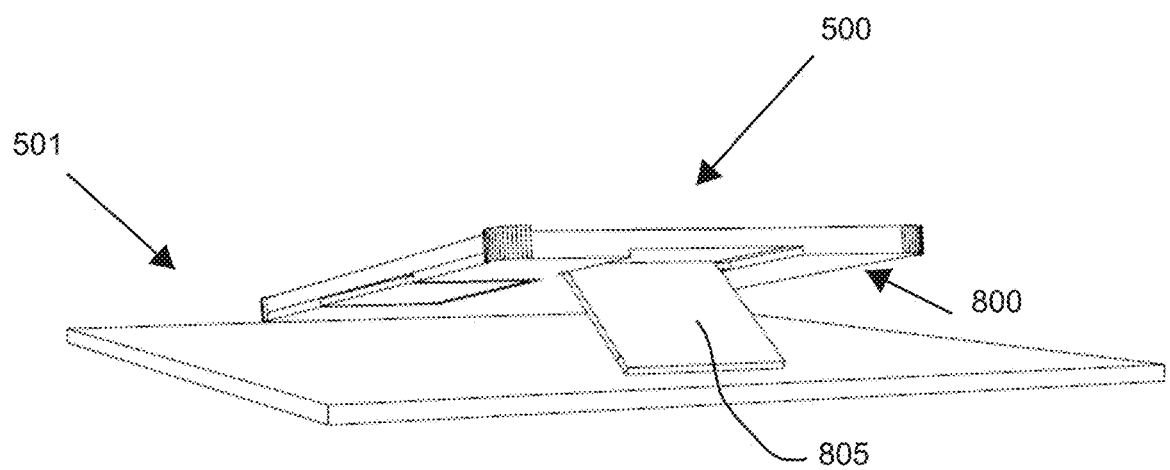

FIGS. 117 and 118 illustrate three-dimensional perspective views of tablet holder 800 positioning tablet computer 500 to an elevated writing position with respect to fixed surface 501 using load-bearing angular flap 805.

Figure 119:
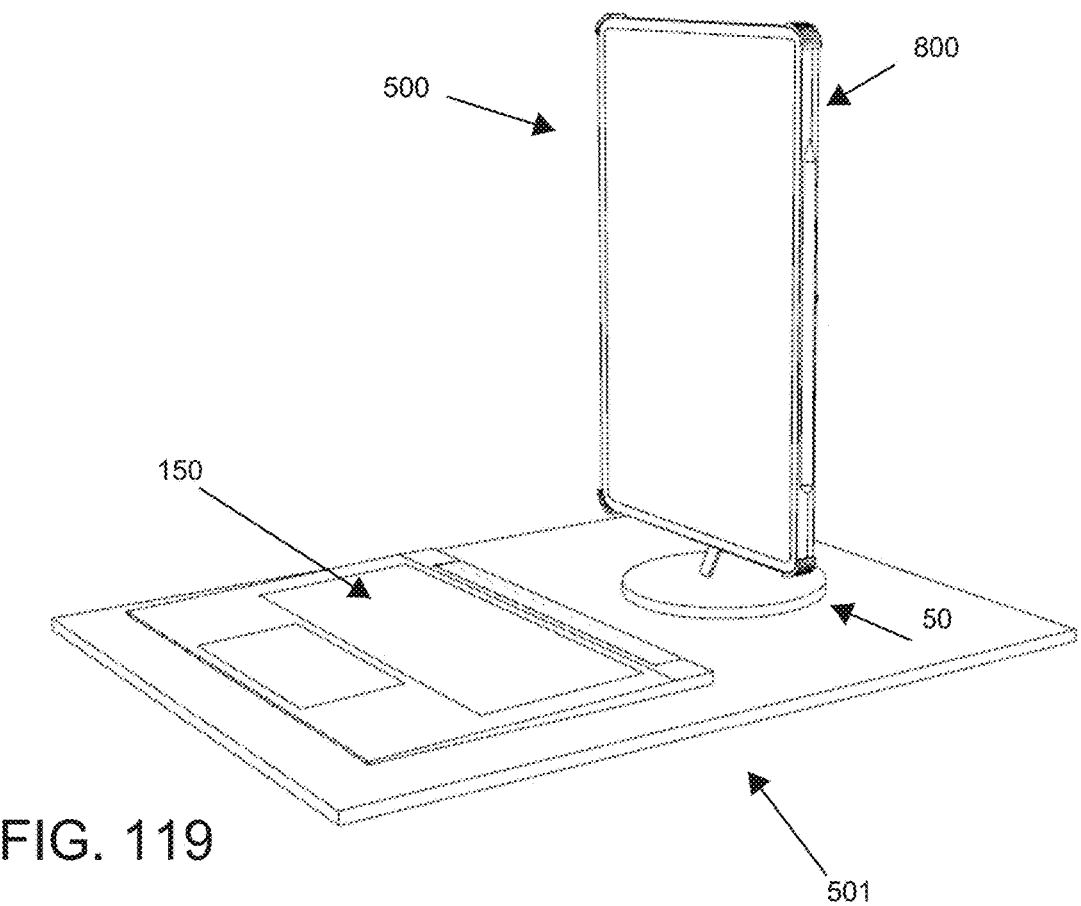
Figure 120:
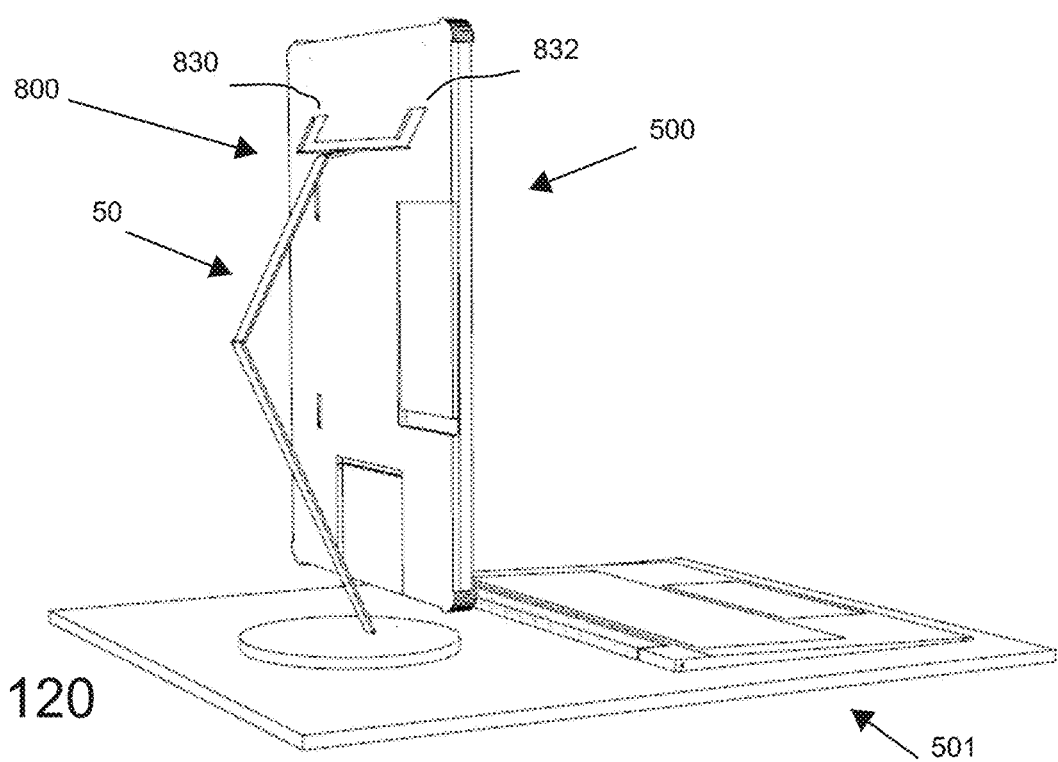

FIGS. 119 and 120 illustrate three-dimensional perspective views of tablet holder 800 positioning tablet computer 500 to a suspended portrait orientation with respect to fixed surface 501 using angled slits 830 and 832.

Figure 121:
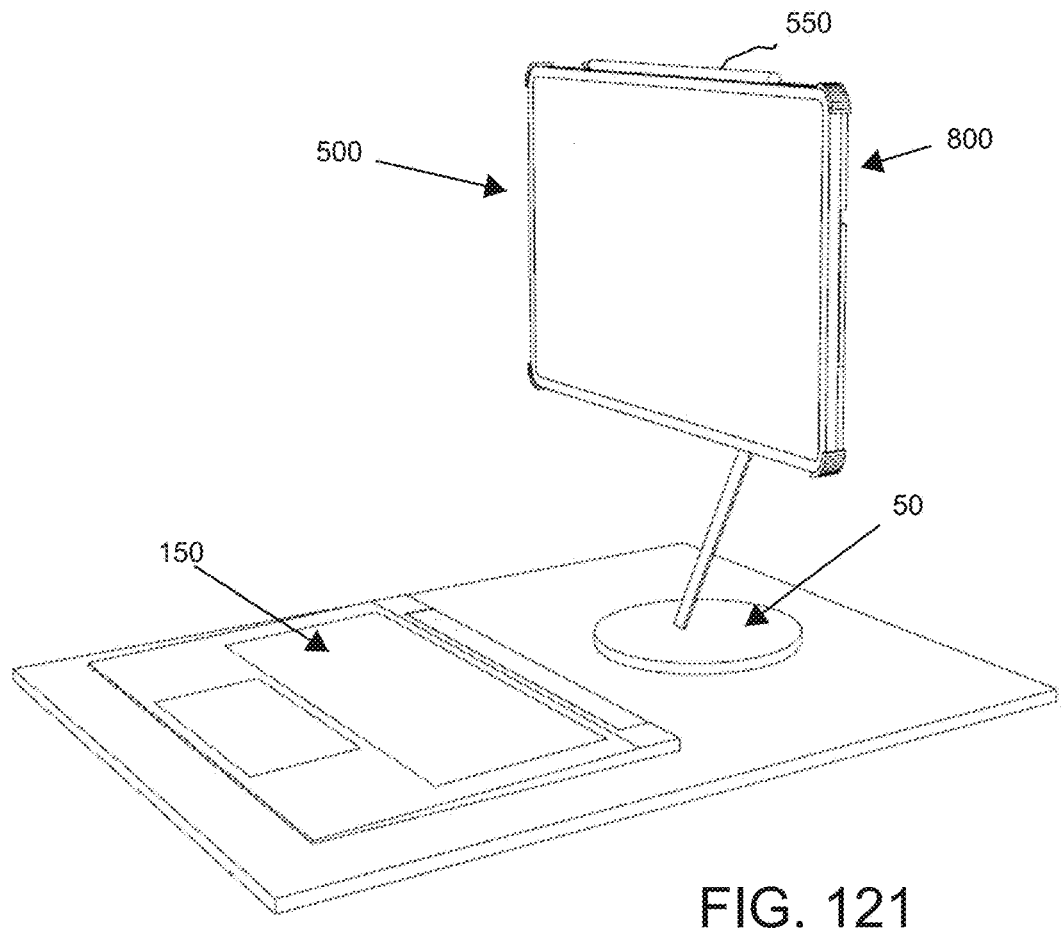
Figure 122:
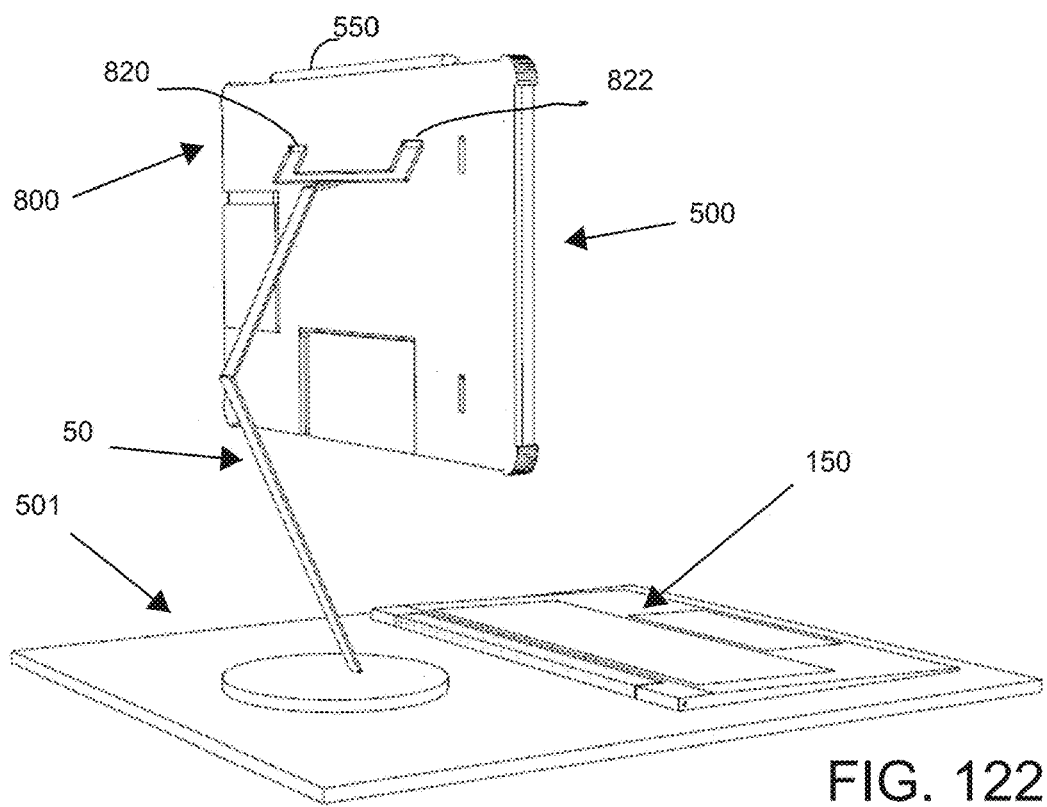

FIGS. 121 and 122 illustrate three-dimensional perspective views of tablet holder 800 positioning tablet computer 500 to a suspended landscape orientation with respect to fixed surface 501 using angled slits 820 and 822. The figures also show electronic pencil 550 being latched magnetically to the tablet computer in the same way Apple currently latches it electronic pencil to the iPad Pro version of its tablet computers.

While several exemplary embodiments of the present invention are disclosed herein, it should be understood that modifications, substitutions and alternatives that may be apparent to one of ordinary skill in the art can be made without departing from the scope of this disclosure. This disclosure is intended to cover any adaptations or variations of the exemplary embodiments. In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The claimed invention is:

1. An inconspicuous suspension system for suspending a personal computing device to discrete orientations with respect to a resting surface or base; the suspension system comprising a suspension structure and at least two support cavities; the suspension structure includes one of a desktop stand, a floor stand, a hook, or a plurality of hooks; and the support cavities include at least two sockets, grooves, notches, or slits; wherein each socket, groove, notch, or slit comprises a plurality of walls which may be straight, curved, slanted, horizontal, or vertical, or any combination thereof; and wherein at least one end of the suspension structure is configured to match fully or partially each support cavity of the at least two support cavities such that when a support cavity of the at least two support cavities is connected to a matching end of the suspension structure, the matching end of the suspension structure inserts fully or partially into the support cavity; and wherein the personal computing device includes one of a smart phone, a tablet computer, an electronic display panel, or an electronic book reader; and the resting surface or base includes a table, a floor, a wall, a car dashboard, or any other surface that can support the weight of the personal computing device; and wherein the at least two support cavities of the suspension system are integrated into the backplate of a protective cover or case of the personal computing device wherein at least one support cavity of the at least two support cavities is positioned at, or about, a 90-degree angle relative to the rest of the at least two support cavities; and wherein the suspension system is used to suspend the protective cover or case and the personal computing device which it is protecting to a discrete orientation with respect to the resting surface or base by placing or securing one end of the suspension structure on the resting surface or base and manually connecting at least one support cavity of the at least two support cavities of the protective cover or case to a matching end of the suspension structure; and wherein the suspension system is used to reposition the protective cover or case and the personal computing device which it is protecting to a different orientation with respect to the resting surface or base by manually disconnecting the at least one matching support cavity of the at least two support cavities of the protective cover or case from the suspension structure, rotating the protective cover or case and the personal computing device which it is protecting by, or about, a 90-degree angle, and manually reconnecting the protective cover or case and the personal computing device which it is protecting to the suspension structure by manually connecting at least one support cavity of the at least two support cavities of the protective cover or case to a matching end of the suspension structure.

2. The suspension system of claim 1 wherein the at least one matching end of the suspension structure is magnetized and the at least two support cavities comprise, or are layered by, a metallic substance.

3. The suspension system of claim 1 wherein the at least one matching end of the suspension structure is metallic and the at least two support cavities comprise, or are layered by, a magnetic substance.

4. An inconspicuous suspension system for suspending a personal computing device to discrete orientations with respect to a resting surface or base; the suspension system comprising a suspension structure and at least two support cavities; the suspension structure includes one of a desktop stand, a floor stand, a hook, or a plurality of hooks; and the support cavities include at least two sockets, grooves, notches, or slits; wherein each socket, groove, notch, or slit comprises a plurality of walls which may be straight, curved, slanted, horizontal, or vertical, or any combination thereof; and wherein at least one end of the suspension structure is configured to match fully or partially each support cavity of the at least two support cavities such that when a support cavity of the at least two support cavities is connected to a matching end of the suspension structure, the matching end of the suspension structure inserts fully or partially into the support cavity; and wherein the personal computing device includes one of a smart phone, a tablet computer, an electronic display panel, or an electronic book reader; and the resting surface or base includes a table, a floor, a wall, a car dashboard, or any other surface that can support the weight of the personal computing device; and wherein the at least two support cavities of the suspension system are integrated into a panel that is configured to be adhered to the backplate of the personal computing device wherein at least one support cavity of the at least two support cavities is positioned at, or about, a 90-degree angle relative to the rest of the at least two support cavities; and wherein the suspension system is used to suspend the panel and the personal computing device to which it is adhered to a discrete orientation with respect to the resting surface or base by placing or securing one end of the suspension structure on the resting surface or base and manually connecting at least one support cavity of the at least two support cavities of the panel to a matching end of the suspension structure; and wherein the suspension system is used to reposition the panel and the personal computing device to which it is adhered to a different orientation with respect to the resting surface or base by manually disconnecting the at least one matching support cavity of the at least two support cavities of the panel from the suspension structure, rotating the panel and the personal computing device to which it is adhered by, or about, a 90-degree angle, and manually reconnecting the panel and the personal computing device to which it is adhered to the suspension structure by manually connecting at least one support cavity of the at least two support cavities of the panel to a matching end of the suspension structure.

5. The suspension system of claim 4 wherein the at least one matching end of the suspension structure is magnetized and the at least two support cavities comprise, or are layered by, a metallic substance.

6. The suspension system of claim 4 wherein the at least one matching end of the suspension structure is metallic and the at least two support cavities comprise, or are layered by, a magnetic substance.

7. An inconspicuous suspension system for suspending a personal computing device to discrete orientations with respect to a resting surface or base; the suspension system comprising a suspension structure and at least two support cavities; the suspension structure includes one of a desktop stand, a floor stand, a hook, or a plurality of hooks; and the support cavities include at least two sockets, grooves, notches, or slits; wherein each socket, groove, notch, or slit comprises a plurality of walls which may be straight, curved, slanted, horizontal, or vertical, or any combination thereof; and wherein at least one end of the suspension structure is configured to match fully or partially each support cavity of the at least two support cavities such that when a support cavity of the at least two support cavities is connected to a matching end of the suspension structure, the matching end of the suspension structure inserts fully or partially into the support cavity; and wherein the personal computing device includes one of a smart phone, a tablet computer, an electronic display panel, or an electronic book reader; and the resting surface or base includes a table, a floor, a wall, a car dashboard, or any other surface that can support the weight of the personal computing device; and wherein the at least two support cavities of the suspension system are integrated into the backplate of the personal computing device wherein at least one support cavity of the at least two support cavities is positioned at, or about, a 90-degree angle relative to the rest of the at least two support cavities; and wherein the suspension system is used to suspend the personal computing device to a discrete orientation with respect to the resting surface or base by placing or securing one end of the suspension structure on the resting surface or base and manually connecting at least one support cavity of the at least two support cavities of the personal computing device to a matching end of the suspension structure; and wherein the suspension system is used to reposition the personal computing device to a different orientation with respect to the resting surface or base by manually disconnecting the at least one matching support cavity of the at least two support cavities of the personal computing device from the suspension structure, rotating the personal computing device by, or about, a 90-degree angle, and manually reconnecting the personal computing device to the suspension structure by manually connecting at least one support cavity of the at least two support cavities to a matching end of the suspension structure.

8. The suspension system of claim 7 wherein the at least one matching end of the suspension structure is magnetized and the at least two support cavities comprise, or are layered by, a metallic substance.

9. The suspension system of claim 7 wherein the at least one matching end of the suspension structure is metallic and the at least two support cavities comprise, or are layered by, a magnetic substance.

* * * * *